(12) United States Patent
Jaramaz et al.

(10) Patent No.: US 12,465,429 B2
(45) Date of Patent: Nov. 11, 2025

(54) MARKERLESS NAVIGATION SYSTEM

(71) Applicants: Smith & Nephew, Inc., Memphis, TN (US); Smith & Nephew Asia Pacific Pte. Limited, Sg (SG); Smith & Nephew Orthopaedics AG, Zug (CH)

(72) Inventors: Branislav Jaramaz, Pittsburgh, PA (US); Daniel Farley, Memphis, TN (US); Darren J. Wilson, Hull (GB); Carlos Rodriguez, Miami, FL (US); Constantinos Nikou, Monroeville, PA (US); Xuanye Wang, Reading, MA (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

(*) Notice: Subject to any disclaimer, the term of this patent is extended or adjusted under 35 U.S.C. 154(b) by 209 days.

(21) Appl. No.: 18/030,820

(22) PCT Filed: Oct. 8, 2021

(86) PCT No.: PCT/US2021/054126
§ 371 (c)(1),
(2) Date: Apr. 7, 2023

(87) PCT Pub. No.: WO2022/076790
PCT Pub. Date: Apr. 14, 2022

(65) Prior Publication Data
US 2023/0363831 A1 Nov. 16, 2023

Related U.S. Application Data

(60) Provisional application No. 63/209,067, filed on Jun. 10, 2021, provisional application No. 63/089,742, filed on Oct. 9, 2020.

(51) Int. Cl.
*A61B 34/20* (2016.01)
*A61B 34/00* (2016.01)
(Continued)

(52) U.S. Cl.
CPC .............. *A61B 34/20* (2016.02); *A61B 34/10* (2016.02); *A61B 34/25* (2016.02); *A61B 34/30* (2016.02);
(Continued)

(58) Field of Classification Search
CPC ......... A61B 34/20; A61B 34/10; A61B 34/25; A61B 34/30; A61B 2034/105;
(Continued)

(56) References Cited

U.S. PATENT DOCUMENTS 10,758,209 B2 * 9/2020 Boctor ................ A61B 5/0084
11,000,270 B2 * 5/2021 Scheib ................ A61B 1/0005
(Continued)

*Primary Examiner* — Vijay Shankar

(57) ABSTRACT

A surgical system and method for markerless intraoperative navigation is provided. The system can includes a structured light system that can be utilized to intraoperatively sense three-dimensional surface geometry. The computer system is configured to segment a depth image to obtain surface geometry data of an anatomical structure embodied within the depth image, register the surface geometry data of the anatomical structure to a model, and update the surgical plan according to the registered surface geometry data. The surgical system is an endoscopic surgical system.

20 Claims, 25 Drawing Sheets

(51) Int. Cl.
*A61B 34/10* (2016.01)
*A61B 34/30* (2016.01)
*G06T 7/10* (2017.01)
*A61B 90/00* (2016.01)

(52) U.S. Cl.
CPC .......... *G06T 7/10* (2017.01); *A61B 2034/105* (2016.02); *A61B 2034/107* (2016.02); *A61B 2034/254* (2016.02); *A61B 2034/301* (2016.02); *A61B 2090/365* (2016.02); *G06T 2207/10028* (2013.01)

(58) Field of Classification Search
CPC ........ A61B 2034/107; A61B 2034/254; A61B 2034/301; A61B 2090/365; A61B 1/000094; A61B 1/0005; A61B 1/0605; A61B 90/361; A61B 2090/378; A61B 2034/104; A61B 2034/2048; A61B 2034/2055; A61B 2034/2063; A61B 2090/371; A61B 2090/372; A61B 2090/502; A61B 2034/2051; A61B 2034/2065; A61B 2034/252; G06T 7/10; G06T 2207/10028; G06N 3/044; G06N 3/08; Y02A 90/10; G16H 20/40; G16H 30/40; G16H 40/67; G16H 70/20
See application file for complete search history.

(56) References Cited

U.S. PATENT DOCUMENTS

| | | | |
|---|---|---|---|
| 11,625,825 B2 * | 4/2023 | Cantrall | A61B 5/7225 600/117 |
| 11,786,106 B2 * | 10/2023 | Masaki | A61B 34/30 600/114 |
| 2020/0015923 A1 * | 1/2020 | Scheib | G01J 3/2803 |
| 2020/0237187 A1 * | 7/2020 | Cantrall | G06T 7/75 |

* cited by examiner

MARKERLESS NAVIGATION SYSTEM

PRIORITY

The present application is a national stage application of PCT Application No. PCT/US2021/054126, titled MARKERLESS NAVIGATION SYSTEM, filed Oct. 8, 2021, which claims priority to U.S. Provisional Patent Application No. 63/089,742, titled MARKERLESS ENDOSCOPIC NAVIGATION SYSTEM, filed Oct. 9, 2020 and U.S. Provisional Patent Application No. 63/209,067, titled MARKERLESS NAVIGATION SYSTEM, filed Jun. 10, 2021, each of which is hereby incorporated by reference herein in its entirety.

TECHNICAL FIELD

The present disclosure relates generally to methods, systems, and apparatuses related to a computer-assisted surgical system that includes various hardware and software components that work together to enhance surgical workflows. The disclosed techniques may be applied to, for example, shoulder, hip, and knee arthroplasties, as well as other surgical interventions such as arthroscopic procedures, spinal procedures, maxillofacial procedures, rotator cuff procedures, ligament repair and replacement procedures.

BACKGROUND

Conventional computer-assisted orthopedic surgical systems use markers that are rigidly fixed relative to the patient's bones to track the movement of the bones after an initial registration process is performed. Such surgical systems conventionally use markers that are affixed to the patient's bones either percutaneously or directly to an exposed portion of the bones. Once affixed to the patient's bones, the markers can then be identified by a tracking system (e.g., an optical tracking system) to monitor the movement of the bones throughout the surgical procedure.

However, there are several issues with such bone-mounted markers in both endoscopic procedures and open procedures. For example, the pins used to mount the markers to the bone are relatively invasive and can cause iatrogenic injuries, including pin-site infections, fractures, and vascular and nerve injuries. As another example, the markers are conventionally placed manually by the surgeon and suboptimal postoperative results have been observed due to poor positioning of the markers during the procedure. As yet another example, a significant amount of time and expertise is required in order to properly affix the markers to a patient's bones and intraoperatively register the patient's anatomy with preoperative 3D anatomical models. Bone markers also create additional issues in endoscopic procedures because the markers are difficult to place endoscopically and, once placed, the markers impinge upon the already limited amount of space within which the surgeon has to work to perform the procedure (e.g., within the patient's joint in arthroscopic procedures).

One potential solution to these issues for endoscopic procedures is the use of electromagnetic tracking for minimally invasive procedures. However, electromagnetic tracking systems are vulnerable to field distortions and thus suffer from intraoperative tracking inaccuracies. Therefore, an endoscopic surgical system that was configured to intraoperatively register and track the patient's anatomy without the use of bone-fixed markers and without relying upon electromagnetic tracking techniques would be beneficial. In particular, such a system would be beneficial because it would avoid iatrogenic injuries associated with pins and other bone fixation devices used to secure the markers, would streamline the surgical workflow by obviating the need to manually perform an initial registration of the patient's anatomy and the need to affix pins to the patient's bones (thereby reducing the time, cost, and complexity of the procedure), would provide the surgeon with additional space in which to operate under endoscopic conditions, and would not suffer from any field-distortion effects inherent in electromagnetic tracking systems. For example, an endoscopic visualization system that used optical tracking techniques to register and track the patient's anatomy at the surgical site would be beneficial.

Another benefit of an endoscopic visualization system that uses optical tracking techniques to track the patient's anatomy or other landmarks (e.g., surgical tools) is that such a system could leverage the tight spatial confines of the surgical site to assist in identifying and tracking the patient's anatomy and/or surgical tools during the surgical procedure. In particular, because the only source of light in an endoscopic surgical procedure is the endoscope itself, the visual characteristics of the surgical site are more readily predictable than in open procedures. Notably, images captured by the endoscope will feature shadows cast by the patient's rigid anatomy present at the surgical site. By analyzing the various visual characteristics (e.g., the length of shadows, shading patterns, or brightness or color gradients) associated with known landmarks (e.g., anatomical landmarks or surgical tools), an endoscopic visualization system could calculate the distance between the landmark and the light source and the angle or orientation of the landmark with respect to the light source. Navigating the tight spatial confines in endoscopic surgical procedures is generally regarded as a challenge. Therefore, an endoscopic visualization system configured to use the visual characteristics of the surgical site to assist in identifying and tracking landmarks is especially desirable because it derives a benefit from a challenge associated with performing endoscopic surgical procedures.

Regardless of the benefits of using optical tracking techniques specific for endoscopic surgical procedures, markerless surgical navigation is generally beneficial to endoscopic or open surgical procedures because it avoids the aforementioned issues with iatrogenic injuries, is more time-efficient because it avoids the need to affix the markers to the patient's bones, and reduces variability in the performance of the surgical procedure by not relying so heavily on surgeons' individual skills levels in placing the markers.

SUMMARY

There are provided systems and methods for tracking a patient's anatomy in endoscopic surgical procedures without the use of bone-affixed markers.

In some embodiments, there is provided a surgical system for an endoscopic surgical procedure. The surgical system may comprise an endoscope and a computer system coupled to the endoscope. The endoscope may comprise an emitter configured to project structured electromagnetic radiation (EMR) onto a surface and an image sensor configured to obtain a depth image of the surface based on the structured EMR. The computer system may be configured to: receive a surgical plan associated with the endoscopic surgical procedure, receive a model of an anatomical structure associated with the endoscopic surgical procedure, generate, via the image sensor, the depth image based on the structured EMR, segment the depth image to obtain surface geometry data of the anatomical structure embodied within the depth image, register the surface geometry data of the anatomical structure to the model, and update the surgical plan according to the registered surface geometry data.

In some embodiments, the computer system is configured to register the depth data of the anatomical structure to the model using an iterative closest point algorithm or a data aligned rigidity constrained exhaustive search algorithm.

In some embodiments, the endoscope comprises an arthroscope.

In some embodiments, the surgical system further comprises a display coupled to the computer system, wherein the endoscope further comprises an image sensor, wherein the computer system is further configured to cause the display to display a video feed obtained via the image sensor.

In some embodiments, the computer system is configured to cause the display to display at least one of the updated surgical plan or the registered surface geometry data in association with the video feed.

In some embodiments, the computer system is configured to cause the display to display the registered surface geometry data overlaid on the anatomical structure in the video feed.

In some embodiments, the endoscope further comprises a depth sensor selected from the group consisting of a time-of-flight sensor, a laser scanning device, and a combination thereof.

In some embodiments, the structured EMR comprises at least one of visible light or infrared.

In some embodiments, there is provided a surgical system for an endoscopic surgical procedure. The surgical system may comprise an endoscope and a computer system coupled to the endoscope. The endoscope may be configured to obtain a video feed. The computer system may be configured to: receive a surgical plan associated with the endoscopic surgical procedure, receive a model of an anatomical structure associated with the endoscopic surgical procedure, generate, from the video feed, a depth image based on shape-from-shading and other such depth image processing techniques, segment the depth image to obtain surface geometry data of the anatomical structure embodied within the depth image, register the surface geometry data of the anatomical structure to the model, and update the surgical plan according to the registered surface geometry data.

In some embodiments, the model could include a preoperative model.

In some embodiments, the computer system could be further configured to generate the model intraoperatively.

In some embodiments, there is provided a method of performing an endoscopic surgical procedure. The method may comprise receiving, by a computer system coupled to an endoscope, a surgical plan associated with the endoscopic surgical procedure, wherein the endoscope may comprise an emitter configured to project structured EMR onto a surface and an image sensor configured to obtain a depth image of the surface based on the structured EMR; receiving, by the computer system, a preoperative model of an anatomical structure associated with the endoscopic surgical procedure; generating, by the computer system, the depth image based on the structured EMR using the image sensor; segmenting, by the computer system, the depth image to obtain surface geometry data of the anatomical structure embodied within the depth image; registering, by the computer system, the surface geometry data of the anatomical structure to the preoperative model; and updating, by the computer system, the surgical plan according to the registered surface geometry data.

In some embodiments, there is provided a method of performing an endoscopic surgical procedure. The method may comprise receiving, by a computer system coupled to an endoscope, a surgical plan associated with the endoscopic surgical procedure, wherein the endoscope may comprise an emitter configured to project structured EMR onto a surface and an image sensor configured to obtain a depth image of the surface based on the structured EMR; intraoperatively determining, by the computer system, three-dimensional shape information of an anatomical structure associated with the endoscopic surgical procedure; generating, by the computer system, the depth image based on the structured EMR using the image sensor; segmenting, by the computer system, the depth image to obtain surface geometry data of the anatomical structure embodied within the depth image; registering, by the computer system, the surface geometry data of the anatomical structure to the three-dimensional shape information; and updating, by the computer system, the surgical plan according to the registered surface geometry data.

In some embodiments, the method may further comprise making an incision adjacent to a surgical site associated with the endoscopic surgical procedure and inserting the endoscope through the incision to access the surgical site and orient the endoscope towards the anatomical structure.

In some embodiments, the endoscope may comprise an arthroscope, and the anatomical structure may comprise a femoral joint surface or a tibial joint surface.

In some embodiments, there is provided a method of registering a surgical site during a surgical procedure. The method may comprise: receiving, by a computer system, a preoperative model associated with the surgical procedure; receiving, by the computer system, a selected landmark defined with respect to the preoperative model; receiving, from an endoscope coupled to the computer system, an image of the surgical site; identifying, by the computer system, a landmark in the received image that corresponds to the selected landmark; identifying, by the computer system, a visual characteristic associated with the identified landmark; performing, by the computer system, a simulation using the preoperative model to determine a virtual pose of a virtual light source that generates a simulated visual characteristic associated with the selected landmark that corresponds to the identified visual characteristic associated with the identified landmark; determining, by the computer system, a pose of the endoscope; and determining, by the computer system, a location of the identified landmark based on the determined virtual pose of the virtual light source and the determined pose of the endoscope.

In some embodiments, there is provided a surgical system for an open surgical procedure. The surgical system may comprise a depth-sensing system and a computer system coupled to the depth-sensing system. The depth-sensing system may comprise an emitter configured to project structured electromagnetic radiation (EMR) onto a surface and an image sensor configured to obtain a depth image of the surface based on the structured EMR. The computer system may be configured to: receive a surgical plan associated with the endoscopic surgical procedure, receive a model of an anatomical structure associated with the endoscopic surgical procedure, generate, via the image sensor, the depth image based on the structured EMR, segment the depth image to obtain surface geometry data of the anatomical structure embodied within the depth image, register the surface geometry data of the anatomical structure to the model, and update the surgical plan according to the registered surface geometry data.

In some embodiments, there is provided a method of performing an open surgical procedure. The method may comprise receiving, by a computer system coupled to a depth-sensing system, a surgical plan associated with the open surgical procedure, wherein the depth-sensing system may comprise an emitter configured to project structured EMR onto a surface and an image sensor configured to obtain a depth image of the surface based on the structured EMR; receiving, by the computer system, a preoperative model of an anatomical structure associated with the open surgical procedure; generating, by the computer system, the depth image based on the structured EMR using the image sensor; segmenting, by the computer system, the depth image to obtain surface geometry data of the anatomical structure embodied within the depth image; registering, by the computer system, the surface geometry data of the anatomical structure to the preoperative model; and updating, by the computer system, the surgical plan according to the registered surface geometry data.

In some embodiments, the open surgical procedure could include a shoulder procedure.

FIGURES

The accompanying drawings, which are incorporated in and form a part of the specification, illustrate the embodiments of the invention and together with the written description serve to explain the principles, characteristics, and features of the invention. In the drawings.

DESCRIPTION

Figure 1:
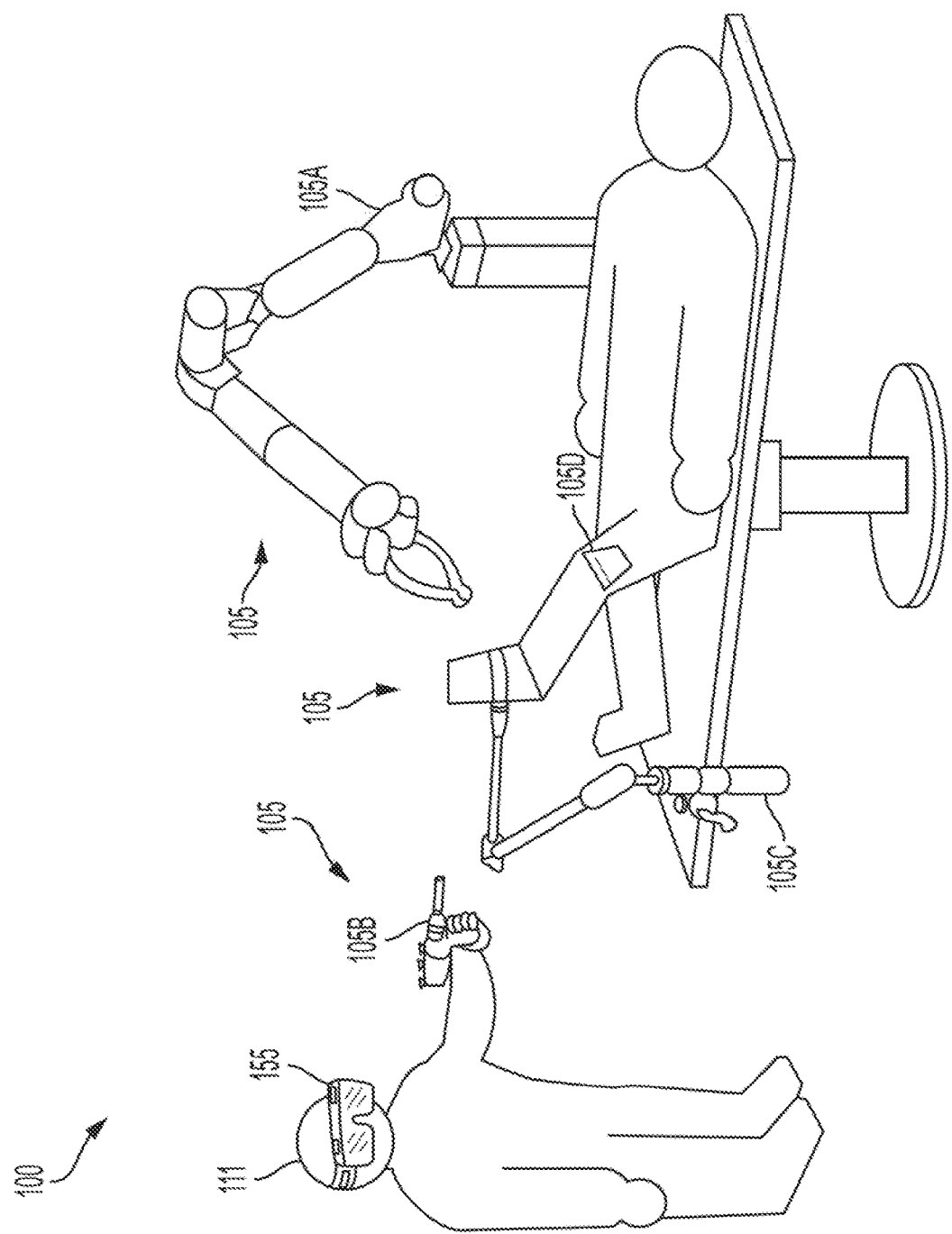
FIG. 1 depicts an operating theatre including an illustrative computer-assisted surgical system (CASS) in accordance with an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Although much of this disclosure refers to surgeons or other medical professionals by specific job title or role, nothing in this disclosure is intended to be limited to a specific job title or function. Surgeons or medical professionals can include any doctor, nurse, medical professional, or technician. Any of these terms or job titles can be used interchangeably with the user of the systems disclosed herein unless otherwise explicitly demarcated. For example, a reference to a surgeon also could apply, in some embodiments to a technician or nurse.

The systems, methods, and devices disclosed herein are particularly well adapted for surgical procedures that utilize surgical navigation systems, such as the NAVIO® surgical navigation system. NAVIO is a registered trademark of BLUE BELT TECHNOLOGIES, INC. of Pittsburgh, PA, which is a subsidiary of SMITH & NEPHEW, INC. of Memphis, TN.

Definitions

For the purposes of this disclosure, the term "implant" is used to refer to a prosthetic device or structure manufactured to replace or enhance a biological structure. For example, in a total hip replacement procedure a prosthetic acetabular cup (implant) is used to replace or enhance a patients worn or damaged acetabulum. While the term "implant" is generally considered to denote a man-made structure (as contrasted with a transplant), for the purposes of this specification an implant can include a biological tissue or material transplanted to replace or enhance a biological structure.

For the purposes of this disclosure, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Although much of this disclosure refers to surgeons or other medical professionals by specific job title or role, nothing in this disclosure is intended to be limited to a specific job title or function. Surgeons or medical professionals can include any doctor, nurse, medical professional, or technician. Any of these terms or job titles can be used interchangeably with the user of the systems disclosed herein unless otherwise explicitly demarcated. For example, a reference to a surgeon could also apply, in some embodiments to a technician or nurse.

CASS Ecosystem Overview

FIG. 1 provides an illustration of an example computer-assisted surgical system (CASS) 100, according to some embodiments. As described in further detail in the sections that follow, the CASS uses computers, robotics, and imaging technology to aid surgeons in performing orthopedic surgery procedures such as total knee arthroplasty (TKA) or total hip arthroplasty (THA). For example, surgical navigation systems can aid surgeons in locating patient anatomical structures, guiding surgical instruments, and implanting medical devices with a high degree of accuracy. Surgical navigation systems such as the CASS 100 often employ various forms of computing technology to perform a wide variety of standard and minimally invasive surgical procedures and techniques. Moreover, these systems allow surgeons to more accurately plan, track and navigate the placement of instruments and implants relative to the body of a patient, as well as conduct pre-operative and intra-operative body imaging.

An Effector Platform 105 positions surgical tools relative to a patient during surgery. The exact components of the Effector Platform 105 will vary, depending on the embodiment employed. For example, for a knee surgery, the Effector Platform 105 may include an End Effector 105B that holds surgical tools or instruments during their use. The End Effector 105B may be a handheld device or instrument used by the surgeon (e.g., a NAVIO® hand piece or a cutting guide or jig) or, alternatively, the End Effector 105B can include a device or instrument held or positioned by a Robotic Arm 105A. While one Robotic Arm 105A is illustrated in FIG. 1, in some embodiments there may be multiple devices. As examples, there may be one Robotic Arm 105A on each side of an operating table T or two devices on one side of the table T. The Robotic Arm 105A may be mounted directly to the table T, be located next to the table T on a floor platform (not shown), mounted on a floor-to-ceiling pole, or mounted on a wall or ceiling of an operating room. The floor platform may be fixed or moveable. In one particular embodiment, the robotic arm 105A is mounted on a floor-to-ceiling pole located between the patient's legs or feet. In some embodiments, the End Effector 105B may include a suture holder or a stapler to assist in closing wounds. Further, in the case of two robotic arms 105A, the surgical computer 150 can drive the robotic arms 105A to work together to suture the wound at closure. Alternatively, the surgical computer 150 can drive one or more robotic arms 105A to staple the wound at closure.

The Effector Platform 105 can include a Limb Positioner 105C for positioning the patient's limbs during surgery. One example of a Limb Positioner 105C is the SMITH AND NEPHEW SPIDER2 system. The Limb Positioner 105C may be operated manually by the surgeon or alternatively change limb positions based on instructions received from the Surgical Computer 150 (described below). While one Limb Positioner 105C is illustrated in FIG. 1, in some embodiments there may be multiple devices. As examples, there may be one Limb Positioner 105C on each side of the operating table T or two devices on one side of the table T. The Limb Positioner 105C may be mounted directly to the table T, be located next to the table T on a floor platform (not shown), mounted on a pole, or mounted on a wall or ceiling of an operating room. In some embodiments, the Limb Positioner 105C can be used in non-conventional ways, such as a retractor or specific bone holder. The Limb Positioner 105C may include, as examples, an ankle boot, a soft tissue clamp, a bone clamp, or a soft-tissue retractor spoon, such as a hooked, curved, or angled blade. In some embodiments, the Limb Positioner 105C may include a suture holder to assist in closing wounds.

The Effector Platform 105 may include tools, such as a screwdriver, light or laser, to indicate an axis or plane, bubble level, pin driver, pin puller, plane checker, pointer, finger, or some combination thereof.

Resection Equipment 110 (not shown in FIG. 1) performs bone or tissue resection using, for example, mechanical, ultrasonic, or laser techniques. Examples of Resection Equipment 110 include drilling devices, burring devices, oscillatory sawing devices, vibratory impaction devices, reamers, ultrasonic bone cutting devices, radio frequency ablation devices, reciprocating devices (such as a rasp or broach), and laser ablation systems. In some embodiments, the Resection Equipment 110 is held and operated by the surgeon during surgery. In other embodiments, the Effector Platform 105 may be used to hold the Resection Equipment 110 during use.

The Effector Platform 105 can also include a cutting guide or jig 105D that is used to guide saws or drills used to resect tissue during surgery. Such cutting guides 105D can be formed integrally as part of the Effector Platform 105 or Robotic Arm 105A, or cutting guides can be separate structures that can be matingly and/or removably attached to the Effector Platform 105 or Robotic Arm 105A. The Effector Platform 105 or Robotic Arm 105A can be controlled by the CASS 100 to position a cutting guide or jig 105D adjacent to the patient's anatomy in accordance with a pre-operatively or intraoperatively developed surgical plan such that the cutting guide or jig will produce a precise bone cut in accordance with the surgical plan.

The Tracking System 115 uses one or more sensors to collect real-time position data that locates the patient's anatomy and surgical instruments. For example, for TKA procedures, the Tracking System may provide a location and orientation of the End Effector 105B during the procedure. In addition to positional data, data from the Tracking System 115 can also be used to infer velocity/acceleration of anatomy/instrumentation, which can be used for tool control. In some embodiments, the Tracking System 115 may use a tracker array attached to the End Effector 105B to determine the location and orientation of the End Effector 105B. The position of the End Effector 105B may be inferred based on the position and orientation of the Tracking System 115 and a known relationship in three-dimensional space between the Tracking System 115 and the End Effector 105B. Various types of tracking systems may be used in various embodiments of the present invention including, without limitation, Infrared (IR) tracking systems, electromagnetic (EM) tracking systems, video or image based tracking systems, and ultrasound registration and tracking systems. Using the data provided by the tracking system 115, the surgical computer 150 can detect objects and prevent collision. For example, the surgical computer 150 can prevent the Robotic Arm 105A from colliding with soft tissue.

Any suitable tracking system can be used for tracking surgical objects and patient anatomy in the surgical theatre. For example, a combination of IR and visible light cameras can be used in an array. Various illumination sources, such as an IR LED light source, can illuminate the scene allowing three-dimensional imaging to occur. In some embodiments, this can include stereoscopic, tri-scopic, quad-scopic, etc. imaging. In addition to the camera array, which in some embodiments is affixed to a cart, additional cameras can be placed throughout the surgical theatre. For example, handheld tools or headsets worn by operators/surgeons can include imaging capability that communicates images back to a central processor to correlate those images with images captured by the camera array. This can give a more robust image of the environment for modeling using multiple perspectives. Furthermore, some imaging devices may be of suitable resolution or have a suitable perspective on the scene to pick up information stored in quick response (QR) codes or barcodes. This can be helpful in identifying specific objects not manually registered with the system. In some embodiments, the camera may be mounted on the Robotic Arm 105A.

Although, as discussed herein, the majority of tracking and/or navigation techniques utilize image-based tracking systems (e.g., IR tracking systems, video or image based tracking systems, etc.). However, electromagnetic (EM) based tracking systems are becoming more common for a variety of reasons. For example, implantation of standard optical trackers requires tissue resection (e.g., down to the cortex) as well as subsequent drilling and driving of cortical pins. Additionally, because optical trackers require a direct line of sight with a tracking system, the placement of such trackers may need to be far from the surgical site to ensure they do not restrict the movement of a surgeon or medical professional.

Figure 2:
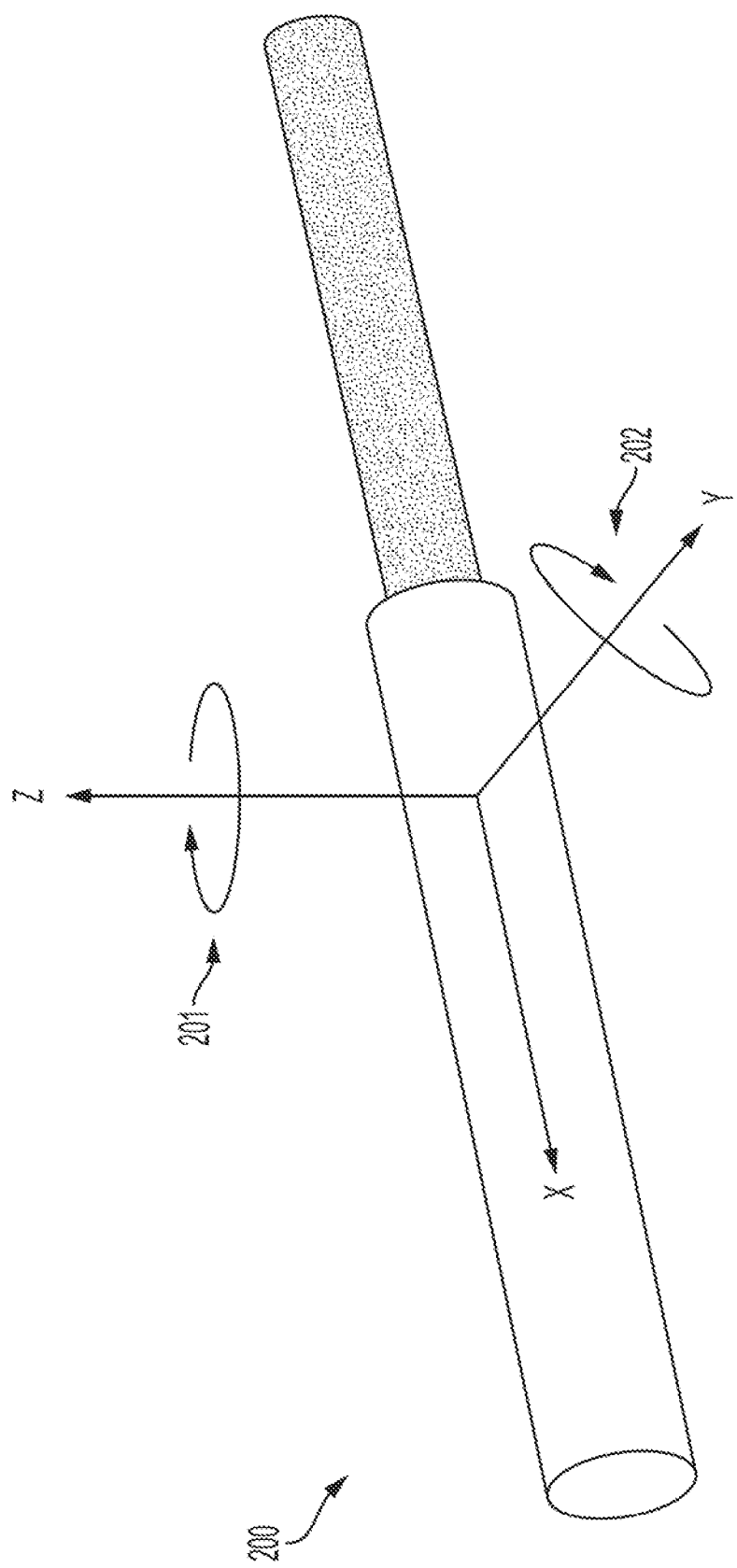
FIG. 2 depicts an example of an electromagnetic sensor device according to some embodiments.

Generally, EM based tracking devices include one or more wire coils and a reference field generator. The one or more wire coils may be energized (e.g., via a wired or wireless power supply). Once energized, the coil creates an electromagnetic field that can be detected and measured (e.g., by the reference field generator or an additional device) in a manner that allows for the location and orientation of the one or more wire coils to be determined. As should be understood by someone of ordinary skill in the art, a single coil, such as is shown in FIG. 2, is limited to detecting five (5) total degrees-of-freedom (DOF). For example, sensor 200 may be able to track/determine movement in the X, Y, or Z direction, as well as rotation around the Y-axis 202 or Z-axis 201. However, because of the electromagnetic properties of a coil, it is not possible to properly track rotational movement around the X axis.

Figure 3A:
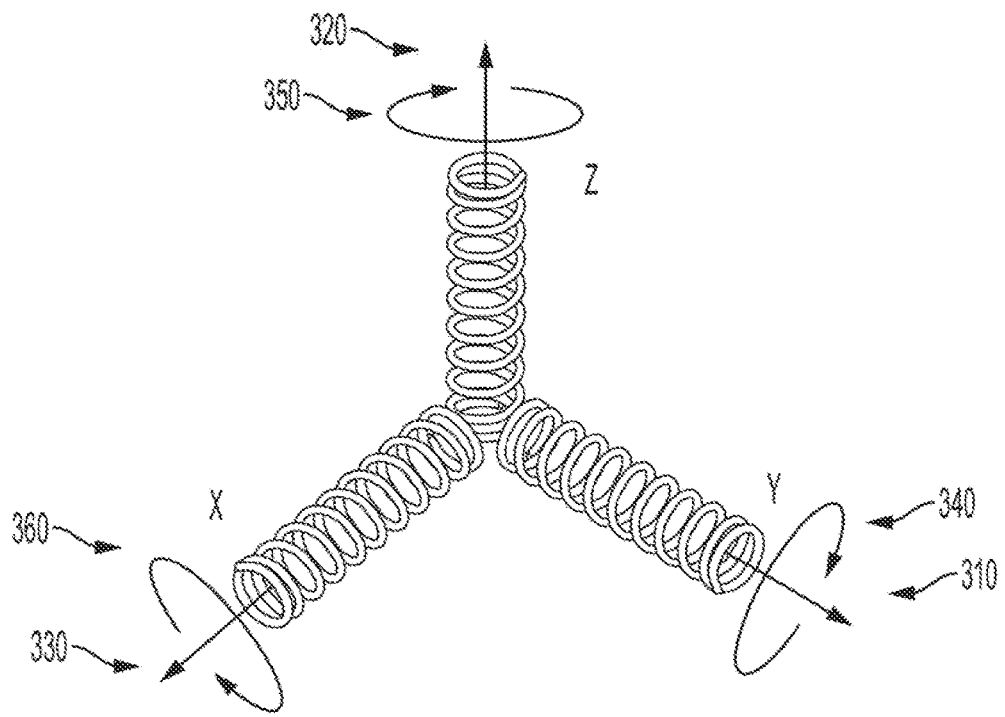
FIG. 3A depicts an alternative example of an electromagnetic sensor device, with three perpendicular coils, according to some embodiments.
Figure 3B:
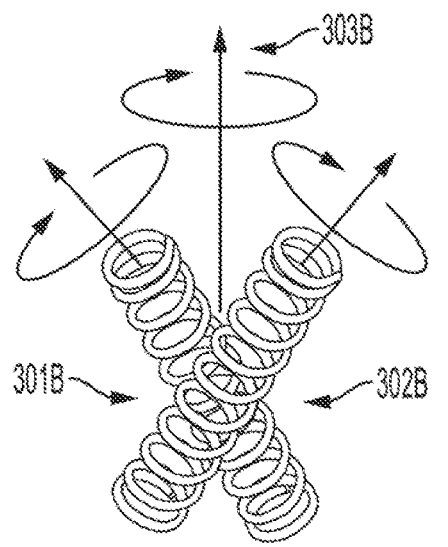
FIG. 3B depicts an alternative example of an electromagnetic sensor device, with two nonparallel, affixed coils, according to some embodiments.

Accordingly, in most electromagnetic tracking applications, a three coil system, such as that shown in FIG. 3A is used to enable tracking in all six degrees of freedom that are possible for a rigid body moving in a three-dimensional space (i.e., forward/backward 310, up/down 320, left/right 330, roll 340, pitch 350, and yaw 360). However, the inclusion of two additional coils and the 90° offset angles at which they are positioned may require the tracking device to be much larger. Alternatively, as one of skill in the art would know, less than three full coils may be used to track all 6DOF. In some EM based tracking devices, two coils may be affixed to each other, such as is shown in FIG. 3B. Because the two coils 301B and 302B are rigidly affixed to each other, not perfectly parallel, and have locations that are known relative to each other, it is possible to determine the sixth degree of freedom 303B with this arrangement.

Although the use of two affixed coils (e.g., 301B and 302B) allows for EM based tracking in 6DOF, the sensor device is substantially larger in diameter than a single coil because of the additional coil. Thus, the practical application of using an EM based tracking system in a surgical environment may require tissue resection and drilling of a portion of the patient bone to allow for insertion of a EM tracker. Alternatively, in some embodiments, it may be possible to implant/insert a single coil, or 5DOF EM tracking device, into a patient bone using only a pin (e.g., without the need to drill or carve out substantial bone).

Figure 3C:
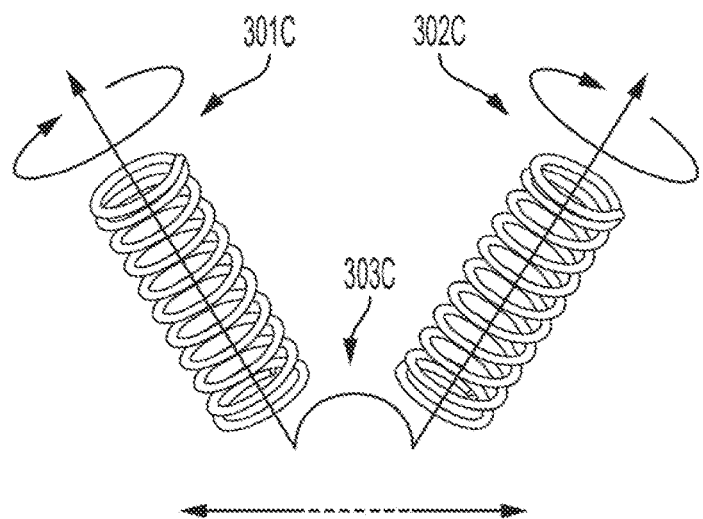
FIG. 3C depicts an alternative example of an electromagnetic sensor device, with two nonparallel, separate coils, according to some embodiments.

Thus, as described herein, a solution is needed for which the use of an EM tracking system can be restricted to devices small enough to be inserted/embedded using a small diameter needle or pin (i.e., without the need to create a new incision or large diameter opening in the bone). Accordingly, in some embodiments, a second 5DOF sensor, which is not attached to the first, and thus has a small diameter, is used to track all 6DOF. Referring now to FIG. 3C, in some embodiments, two 5DOF EM sensors (e.g., 301C and 302C) may be inserted into the patient (e.g., in a patient bone) at different locations and with different angular orientations (e.g., angle 303C is non-zero).

Figure 4:
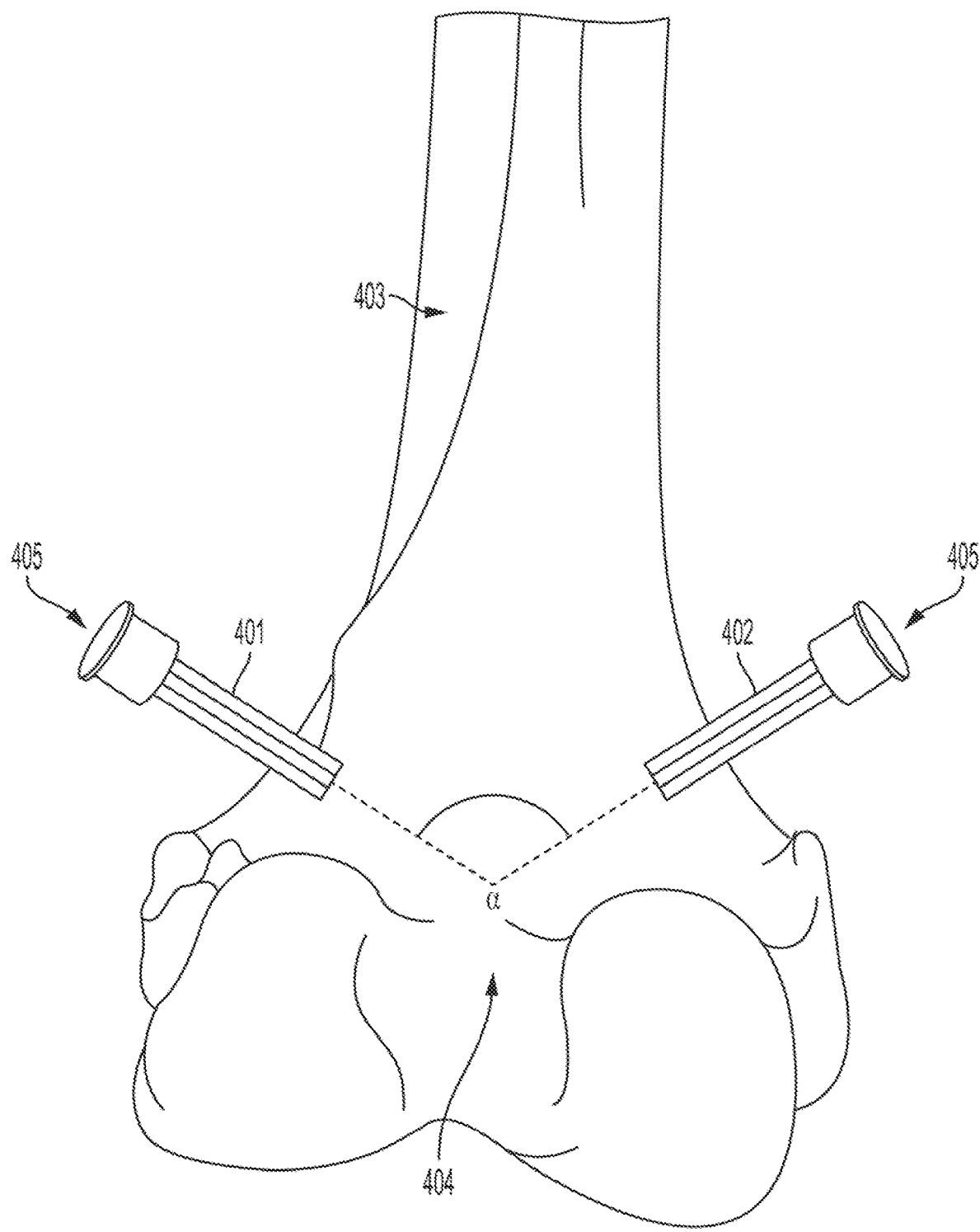
FIG. 4 depicts an example of electromagnetic sensor devices and a patient bone according to some embodiments

Referring now to FIG. 4, an example embodiment is shown in which a first 5DOF EM sensor 401 and a second 5DOF EM sensor 402 are inserted into the patient bone 403 using a standard hollow needle 405 that is typical in most OR(s). In a further embodiment, the first sensor 401 and the second sensor 402 may have an angle offset of "α" 404. In some embodiments, it may be necessary for the offset angle "α" 404 to be greater than a predetermined value (e.g., a minimum angle of 0.50°, 0.75°, etc.). This minimum value may, in some embodiments, be determined by the CASS and provided to the surgeon or medical professional during the surgical plan. In some embodiments, a minimum value may be based on one or more factors, such as, for example, the orientation accuracy of the tracking system, a distance between the first and second EM sensors. The location of the field generator, a location of the field detector, a type of EM sensor, a quality of the EM sensor, patient anatomy, and the like.

Accordingly, as discussed herein, in some embodiments, a pin/needle (e.g., a cannulated mounting needle, etc.) may be used to insert one or more EM sensors. Generally, the pin/needle would be a disposable component, while the sensors themselves may be reusable. However, it should be understood that this is only one potential system, and that various other systems may be used in which the pin/needle and/or EM sensors are independently disposable or reusable. In a further embodiment, the EM sensors may be affixed to the mounting needle/pin (e.g., using a luer-lock fitting or the like), which can allow for quick assembly and disassembly. In additional embodiments, the EM sensors may utilize an alternative sleeve and/or anchor system that allows for minimally invasive placement of the sensors.

In another embodiment, the above systems may allow for a multi-sensor navigation system that can detect and correct for field distortions that plague electromagnetic tracking systems. It should be understood that field distortions may result from movement of any ferromagnetic materials within the reference field. Thus, as one of ordinary skill in the art would know, a typical OR has a large number of devices (e.g., an operating table, LCD displays, lighting equipment, imaging systems, surgical instruments, etc.) that may cause interference. Furthermore, field distortions are notoriously difficult to detect. The use of multiple EM sensors enables the system to detect field distortions accurately, and/or to warn a user that the current position measurements may not be accurate. Because the sensors are rigidly fixed to the bony anatomy (e.g., via the pin/needle), relative measurement of sensor positions (X, Y, Z) may be used to detect field distortions. By way of non-limiting example, in some embodiments, after the EM sensors are fixed to the bone, the relative distance between the two sensors is known and should remain constant. Thus, any change in this distance could indicate the presence of a field distortion.

In some embodiments, specific objects can be manually registered by a surgeon with the system preoperatively or intraoperatively. For example, by interacting with a user interface, a surgeon may identify the starting location for a tool or a bone structure. By tracking fiducial marks associated with that tool or bone structure, or by using other conventional image tracking modalities, a processor may track that tool or bone as it moves through the environment in a three-dimensional model.

In some embodiments, certain markers, such as fiducial marks that identify individuals, important tools, or bones in the theater may include passive or active identifiers that can be picked up by a camera or camera array associated with the tracking system. For example, an IR LED can flash a pattern that conveys a unique identifier to the source of that pattern, providing a dynamic identification mark. Similarly, one or two dimensional optical codes (barcode, QR code, etc.) can be affixed to objects in the theater to provide passive identification that can occur based on image analysis. If these codes are placed asymmetrically on an object, they can also be used to determine an orientation of an object by comparing the location of the identifier with the extents of an object in an image. For example, a QR code may be placed in a corner of a tool tray, allowing the orientation and identity of that tray to be tracked. Other tracking modalities are explained throughout. For example, in some embodiments, augmented reality headsets can be worn by surgeons and other staff to provide additional camera angles and tracking capabilities.

In addition to optical tracking, certain features of objects can be tracked by registering physical properties of the object and associating them with objects that can be tracked, such as fiducial marks fixed to a tool or bone. For example, a surgeon may perform a manual registration process whereby a tracked tool and a tracked bone can be manipulated relative to one another. By impinging the tip of the tool against the surface of the bone, a three-dimensional surface can be mapped for that bone that is associated with a position and orientation relative to the frame of reference of that fiducial mark. By optically tracking the position and orientation (pose) of the fiducial mark associated with that bone, a model of that surface can be tracked with an environment through extrapolation.

The registration process that registers the CASS 100 to the relevant anatomy of the patient can also involve the use of anatomical landmarks, such as landmarks on a bone or cartilage. For example, the CASS 100 can include a 3D model of the relevant bone or joint and the surgeon can intraoperatively collect data regarding the location of bony landmarks on the patient's actual bone using a probe that is connected to the CASS. Bony landmarks can include, for example, the medial malleolus and lateral malleolus, the ends of the proximal femur and distal tibia, and the center of the hip joint. The CASS 100 can compare and register the location data of bony landmarks collected by the surgeon with the probe with the location data of the same landmarks in the 3D model. Alternatively, the CASS 100 can construct a 3D model of the bone or joint without pre-operative image data by using location data of bony landmarks and the bone surface that are collected by the surgeon using a CASS probe or other means. The registration process can also include determining various axes of a joint. For example, for a TKA the surgeon can use the CASS 100 to determine the anatomical and mechanical axes of the femur and tibia. The surgeon and the CASS 100 can identify the center of the hip joint by moving the patient's leg in a spiral direction (i.e., circumduction) so the CASS can determine where the center of the hip joint is located.

A Tissue Navigation System 120 (not shown in FIG. 1) provides the surgeon with intraoperative, real-time visualization for the patient's bone, cartilage, muscle, nervous, and/or vascular tissues surrounding the surgical area. Examples of systems that may be employed for tissue navigation include fluorescent imaging systems and ultrasound systems.

The Display 125 provides graphical user interfaces (GUIs) that display images collected by the Tissue Navigation System 120 as well other information relevant to the surgery. For example, in one embodiment, the Display 125 overlays image information collected from various modalities (e.g., CT, MRI, X-ray, fluorescent, ultrasound, etc.) collected pre-operatively or intra-operatively to give the surgeon various views of the patient's anatomy as well as real-time conditions. The Display 125 may include, for example, one or more computer monitors. As an alternative or supplement to the Display 125, one or more members of the surgical staff may wear an Augmented Reality (AR) Head Mounted Device (HMD). For example, in FIG. 1 the Surgeon 111 is wearing an AR HMD 155 that may, for example, overlay pre-operative image data on the patient or provide surgical planning suggestions. Various example uses of the AR HMD 155 in surgical procedures are detailed in the sections that follow.

Surgical Computer 150 provides control instructions to various components of the CASS 100, collects data from those components, and provides general processing for various data needed during surgery. In some embodiments, the Surgical Computer 150 is a general purpose computer. In other embodiments, the Surgical Computer 150 may be a parallel computing platform that uses multiple central processing units (CPUs) or graphics processing units (GPU) to perform processing. In some embodiments, the Surgical Computer 150 is connected to a remote server over one or more computer networks (e.g., the Internet). The remote server can be used, for example, for storage of data or execution of computationally intensive processing tasks.

Various techniques generally known in the art can be used for connecting the Surgical Computer 150 to the other components of the CASS 100. Moreover, the computers can connect to the Surgical Computer 150 using a mix of technologies. For example, the End Effector 105B may connect to the Surgical Computer 150 over a wired (i.e., serial) connection. The Tracking System 115, Tissue Navigation System 120, and Display 125 can similarly be connected to the Surgical Computer 150 using wired connections. Alternatively, the Tracking System 115, Tissue Navigation System 120, and Display 125 may connect to the Surgical Computer 150 using wireless technologies such as, without limitation, Wi-Fi, Bluetooth, Near Field Communication (NFC), or ZigBee.

Powered Impaction and Acetabular Reamer Devices

Part of the flexibility of the CASS design described above with respect to FIG. 1 is that additional or alternative devices can be added to the CASS 100 as necessary to support particular surgical procedures. For example, in the context of hip surgeries, the CASS 100 may include a powered impaction device. Impaction devices are designed to repeatedly apply an impaction force that the surgeon can use to perform activities such as implant alignment. For example, within a total hip arthroplasty (THA), a surgeon will often insert a prosthetic acetabular cup into the implant host's acetabulum using an impaction device. Although impaction devices can be manual in nature (e.g., operated by the surgeon striking an impactor with a mallet), powered impaction devices are generally easier and quicker to use in the surgical setting. Powered impaction devices may be powered, for example, using a battery attached to the device. Various attachment pieces may be connected to the powered impaction device to allow the impaction force to be directed in various ways as needed during surgery. Also in the context of hip surgeries, the CASS 100 may include a powered, robotically controlled end effector to ream the acetabulum to accommodate an acetabular cup implant.

In a robotically-assisted THA, the patient's anatomy can be registered to the CASS 100 using CT or other image data, the identification of anatomical landmarks, tracker arrays attached to the patient's bones, and one or more cameras. Tracker arrays can be mounted on the iliac crest using clamps and/or bone pins and such trackers can be mounted externally through the skin or internally (either posterolaterally or anterolaterally) through the incision made to perform the THA. For a THA, the CASS 100 can utilize one or more femoral cortical screws inserted into the proximal femur as checkpoints to aid in the registration process. The CASS 100 can also utilize one or more checkpoint screws inserted into the pelvis as additional checkpoints to aid in the registration process. Femoral tracker arrays can be secured to or mounted in the femoral cortical screws. The CASS 100 can employ steps where the registration is verified using a probe that the surgeon precisely places on key areas of the proximal femur and pelvis identified for the surgeon on the display 125. Trackers can be located on the robotic arm 105A or end effector 105B to register the arm and/or end effector to the CASS 100. The verification step can also utilize proximal and distal femoral checkpoints. The CASS 100 can utilize color prompts or other prompts to inform the surgeon that the registration process for the relevant bones and the robotic arm 105A or end effector 105B has been verified to a certain degree of accuracy (e.g., within 1 mm).

For a THA, the CASS 100 can include a broach tracking option using femoral arrays to allow the surgeon to intraoperatively capture the broach position and orientation and calculate hip length and offset values for the patient. Based on information provided about the patient's hip joint and the planned implant position and orientation after broach tracking is completed, the surgeon can make modifications or adjustments to the surgical plan.

For a robotically-assisted THA, the CASS 100 can include one or more powered reamers connected or attached to a robotic arm 105A or end effector 105B that prepares the pelvic bone to receive an acetabular implant according to a surgical plan. The robotic arm 105A and/or end effector 105B can inform the surgeon and/or control the power of the reamer to ensure that the acetabulum is being resected (reamed) in accordance with the surgical plan. For example, if the surgeon attempts to resect bone outside of the boundary of the bone to be resected in accordance with the surgical plan, the CASS 100 can power off the reamer or instruct the surgeon to power off the reamer. The CASS 100 can provide the surgeon with an option to turn off or disengage the robotic control of the reamer. The display 125 can depict the progress of the bone being resected (reamed) as compared to the surgical plan using different colors. The surgeon can view the display of the bone being resected (reamed) to guide the reamer to complete the reaming in accordance with the surgical plan. The CASS 100 can provide visual or audible prompts to the surgeon to warn the surgeon that resections are being made that are not in accordance with the surgical plan.

Following reaming, the CASS 100 can employ a manual or powered impactor that is attached or connected to the robotic arm 105A or end effector 105B to impact trial implants and final implants into the acetabulum. The robotic arm 105A and/or end effector 105B can be used to guide the impactor to impact the trial and final implants into the acetabulum in accordance with the surgical plan. The CASS 100 can cause the position and orientation of the trial and final implants vis-à-vis the bone to be displayed to inform the surgeon as to how the trial and final implant's orientation and position compare to the surgical plan, and the display 125 can show the implant's position and orientation as the surgeon manipulates the leg and hip. The CASS 100 can provide the surgeon with the option of re-planning and re-doing the reaming and implant impaction by preparing a new surgical plan if the surgeon is not satisfied with the original implant position and orientation.

Preoperatively, the CASS 100 can develop a proposed surgical plan based on a three dimensional model of the hip joint and other information specific to the patient, such as the mechanical and anatomical axes of the leg bones, the epicondylar axis, the femoral neck axis, the dimensions (e.g., length) of the femur and hip, the midline axis of the hip joint, the ASIS axis of the hip joint, and the location of anatomical landmarks such as the lesser trochanter landmarks, the distal landmark, and the center of rotation of the hip joint. The CASS-developed surgical plan can provide a recommended optimal implant size and implant position and orientation based on the three dimensional model of the hip joint and other information specific to the patient. The CASS-developed surgical plan can include proposed details on offset values, inclination and anteversion values, center of rotation, cup size, medialization values, superior-inferior fit values, femoral stem sizing and length.

For a THA, the CASS-developed surgical plan can be viewed preoperatively and intraoperatively, and the surgeon can modify CASS-developed surgical plan preoperatively or intraoperatively. The CASS-developed surgical plan can display the planned resection to the hip joint and superimpose the planned implants onto the hip joint based on the planned resections. The CASS 100 can provide the surgeon with options for different surgical workflows that will be displayed to the surgeon based on a surgeon's preference. For example, the surgeon can choose from different workflows based on the number and types of anatomical landmarks that are checked and captured and/or the location and number of tracker arrays used in the registration process.

According to some embodiments, a powered impaction device used with the CASS 100 may operate with a variety of different settings. In some embodiments, the surgeon adjusts settings through a manual switch or other physical mechanism on the powered impaction device. In other embodiments, a digital interface may be used that allows setting entry, for example, via a touchscreen on the powered impaction device. Such a digital interface may allow the available settings to vary based, for example, on the type of attachment piece connected to the power attachment device. In some embodiments, rather than adjusting the settings on the powered impaction device itself, the settings can be changed through communication with a robot or other computer system within the CASS 100. Such connections may be established using, for example, a Bluetooth or Wi-Fi networking module on the powered impaction device. In another embodiment, the impaction device and end pieces may contain features that allow the impaction device to be aware of what end piece (cup impactor, broach handle, etc.) is attached with no action required by the surgeon, and adjust the settings accordingly. This may be achieved, for example, through a QR code, barcode, RFID tag, or other method.

Examples of the settings that may be used include cup impaction settings (e.g., single direction, specified frequency range, specified force and/or energy range); broach impaction settings (e.g., dual direction/oscillating at a specified frequency range, specified force and/or energy range); femoral head impaction settings (e.g., single direction/single blow at a specified force or energy); and stem impaction settings (e.g., single direction at specified frequency with a specified force or energy). Additionally, in some embodiments, the powered impaction device includes settings related to acetabular liner impaction (e.g., single direction/single blow at a specified force or energy). There may be a plurality of settings for each type of liner such as poly, ceramic, oxinium, or other materials. Furthermore, the powered impaction device may offer settings for different bone quality based on preoperative testing/imaging/knowledge and/or intraoperative assessment by surgeon. In some embodiments, the powered impactor device may have a dual function. For example, the powered impactor device not only could provide reciprocating motion to provide an impact force, but also could provide reciprocating motion for a broach or rasp.

In some embodiments, the powered impaction device includes feedback sensors that gather data during instrument use, and send data to a computing device such as a controller within the device or the Surgical Computer 150. This computing device can then record the data for later analysis and use. Examples of the data that may be collected include, without limitation, sound waves, the predetermined resonance frequency of each instrument, reaction force or rebound energy from patient bone, location of the device with respect to imaging (e.g., fluoro, CT, ultrasound, MRI, etc.) registered bony anatomy, and/or external strain gauges on bones.

Once the data is collected, the computing device may execute one or more algorithms in real-time or near real-time to aid the surgeon in performing the surgical procedure. For example, in some embodiments, the computing device uses the collected data to derive information such as the proper final broach size (femur); when the stem is fully seated (femur side); or when the cup is seated (depth and/or orientation) for a THA. Once the information is known, it may be displayed for the surgeon's review, or it may be used to activate haptics or other feedback mechanisms to guide the surgical procedure.

Additionally, the data derived from the aforementioned algorithms may be used to drive operation of the device. For example, during insertion of a prosthetic acetabular cup with a powered impaction device, the device may automatically extend an impaction head (e.g., an end effector) moving the implant into the proper location, or turn the power off to the device once the implant is fully seated. In one embodiment, the derived information may be used to automatically adjust settings for quality of bone where the powered impaction device should use less power to mitigate femoral/acetabular/pelvic fracture or damage to surrounding tissues.

Robotic Arm

In some embodiments, the CASS 100 includes a robotic arm 105A that serves as an interface to stabilize and hold a variety of instruments used during the surgical procedure. For example, in the context of a hip surgery, these instruments may include, without limitation, retractors, a sagittal or reciprocating saw, the reamer handle, the cup impactor, the broach handle, and the stem inserter. The robotic arm 105A may have multiple degrees of freedom (like a Spider device), and have the ability to be locked in place (e.g., by a press of a button, voice activation, a surgeon removing a hand from the robotic arm, or other method).

In some embodiments, movement of the robotic arm 105A may be effectuated by use of a control panel built into the robotic arm system. For example, a display screen may include one or more input sources, such as physical buttons or a user interface having one or more icons, that direct movement of the robotic arm 105A. The surgeon or other healthcare professional may engage with the one or more input sources to position the robotic arm 105A when performing a surgical procedure.

A tool or an end effector 105B attached or integrated into a robotic arm 105A may include, without limitation, a burring device, a scalpel, a cutting device, a retractor, a joint tensioning device, or the like. In embodiments in which an end effector 105B is used, the end effector may be positioned at the end of the robotic arm 105A such that any motor control operations are performed within the robotic arm system. In embodiments in which a tool is used, the tool may be secured at a distal end of the robotic arm 105A, but motor control operation may reside within the tool itself.

The robotic arm 105A may be motorized internally to both stabilize the robotic arm, thereby preventing it from falling and hitting the patient, surgical table, surgical staff, etc., and to allow the surgeon to move the robotic arm without having to fully support its weight. While the surgeon is moving the robotic arm 105A, the robotic arm may provide some resistance to prevent the robotic arm from moving too fast or having too many degrees of freedom active at once. The position and the lock status of the robotic arm 105A may be tracked, for example, by a controller or the Surgical Computer 150.

In some embodiments, the robotic arm 105A can be moved by hand (e.g., by the surgeon) or with internal motors into its ideal position and orientation for the task being performed. In some embodiments, the robotic arm 105A may be enabled to operate in a "free" mode that allows the surgeon to position the arm into a desired position without being restricted. While in the free mode, the position and orientation of the robotic arm 105A may still be tracked as described above. In one embodiment, certain degrees of freedom can be selectively released upon input from user (e.g., surgeon) during specified portions of the surgical plan tracked by the Surgical Computer 150. Designs in which a robotic arm 105A is internally powered through hydraulics or motors or provides resistance to external manual motion through similar means can be described as powered robotic arms, while arms that are manually manipulated without power feedback, but which may be manually or automatically locked in place, may be described as passive robotic arms.

A robotic arm 105A or end effector 105B can include a trigger or other means to control the power of a saw or drill. Engagement of the trigger or other means by the surgeon can cause the robotic arm 105A or end effector 105B to transition from a motorized alignment mode to a mode where the saw or drill is engaged and powered on. Additionally, the CASS 100 can include a foot pedal (not shown) that causes the system to perform certain functions when activated. For example, the surgeon can activate the foot pedal to instruct the CASS 100 to place the robotic arm 105A or end effector 105B in an automatic mode that brings the robotic arm or end effector into the proper position with respect to the patient's anatomy in order to perform the necessary resections. The CASS 100 can also place the robotic arm 105A or end effector 105B in a collaborative mode that allows the surgeon to manually manipulate and position the robotic arm or end effector into a particular location. The collaborative mode can be configured to allow the surgeon to move the robotic arm 105A or end effector 105B medially or laterally, while restricting movement in other directions. As discussed, the robotic arm 105A or end effector 105B can include a cutting device (saw, drill, and burr) or a cutting guide or jig 105D that will guide a cutting device. In other embodiments, movement of the robotic arm 105A or robotically controlled end effector 105B can be controlled entirely by the CASS 100 without any, or with only minimal, assistance or input from a surgeon or other medical professional. In still other embodiments, the movement of the robotic arm 105A or robotically controlled end effector 105B can be controlled remotely by a surgeon or other medical professional using a control mechanism separate from the robotic arm or robotically controlled end effector device, for example using a joystick or interactive monitor or display control device.

The examples below describe uses of the robotic device in the context of a hip surgery; however, it should be understood that the robotic arm may have other applications for surgical procedures involving knees, shoulders, etc. One example of use of a robotic arm in the context of forming an anterior cruciate ligament (ACL) graft tunnel is described in WIPO Publication No. WO 2020/047051, filed Aug. 28, 2019, entitled "Robotic Assisted Ligament Graft Placement and Tensioning," the entirety of which is incorporated herein by reference.

A robotic arm 105A may be used for holding the retractor. For example in one embodiment, the robotic arm 105A may be moved into the desired position by the surgeon. At that point, the robotic arm 105A may lock into place. In some embodiments, the robotic arm 105A is provided with data regarding the patient's position, such that if the patient moves, the robotic arm can adjust the retractor position accordingly. In some embodiments, multiple robotic arms may be used, thereby allowing multiple retractors to be held or for more than one activity to be performed simultaneously (e.g., retractor holding & reaming).

The robotic arm 105A may also be used to help stabilize the surgeon's hand while making a femoral neck cut. In this application, control of the robotic arm 105A may impose certain restrictions to prevent soft tissue damage from occurring. For example, in one embodiment, the Surgical Computer 150 tracks the position of the robotic arm 105A as it operates. If the tracked location approaches an area where tissue damage is predicted, a command may be sent to the robotic arm 105A causing it to stop. Alternatively, where the robotic arm 105A is automatically controlled by the Surgical Computer 150, the Surgical Computer may ensure that the robotic arm is not provided with any instructions that cause it to enter areas where soft tissue damage is likely to occur. The Surgical Computer 150 may impose certain restrictions on the surgeon to prevent the surgeon from reaming too far into the medial wall of the acetabulum or reaming at an incorrect angle or orientation.

In some embodiments, the robotic arm 105A may be used to hold a cup impactor at a desired angle or orientation during cup impaction. When the final position has been achieved, the robotic arm 105A may prevent any further seating to prevent damage to the pelvis.

The surgeon may use the robotic arm 105A to position the broach handle at the desired position and allow the surgeon to impact the broach into the femoral canal at the desired orientation. In some embodiments, once the Surgical Computer 150 receives feedback that the broach is fully seated, the robotic arm 105A may restrict the handle to prevent further advancement of the broach.

The robotic arm 105A may also be used for resurfacing applications. For example, the robotic arm 105A may stabilize the surgeon while using traditional instrumentation and provide certain restrictions or limitations to allow for proper placement of implant components (e.g., guide wire placement, chamfer cutter, sleeve cutter, plan cutter, etc.). Where only a burr is employed, the robotic arm 105A may stabilize the surgeon's handpiece and may impose restrictions on the handpiece to prevent the surgeon from removing unintended bone in contravention of the surgical plan.

The robotic arm 105A may be a passive arm. As an example, the robotic arm 105A may be a CIRQ robot arm available from Brainlab AG. CIRQ is a registered trademark of Brainlab AG, Olof-Palme-Str. 9 81829, München, FED REP of GERMANY. In one particular embodiment, the robotic arm 105A is an intelligent holding arm as disclosed in U.S. patent application Ser. No. 15/525,585 to Krinninger et al., U.S. patent application Ser. No. 15/561,042 to Nowatschin et al., U.S. patent application Ser. No. 15/561,048 to Nowatschin et al., and U.S. Pat. No. 10,342,636 to Nowatschin et al., the entire contents of each of which is herein incorporated by reference.

Surgical Procedure Data Generation and Collection

The various services that are provided by medical professionals to treat a clinical condition are collectively referred to as an "episode of care." For a particular surgical intervention the episode of care can include three phases: pre-operative, intra-operative, and post-operative. During each phase, data is collected or generated that can be used to analyze the episode of care in order to understand various features of the procedure and identify patterns that may be used, for example, in training models to make decisions with minimal human intervention. The data collected over the episode of care may be stored at the Surgical Computer 150 or the Surgical Data Server 180 as a complete dataset. Thus, for each episode of care, a dataset exists that comprises all of the data collectively pre-operatively about the patient, all of the data collected or stored by the CASS 100 intra-operatively, and any post-operative data provided by the patient or by a healthcare professional monitoring the patient.

As explained in further detail, the data collected during the episode of care may be used to enhance performance of the surgical procedure or to provide a holistic understanding of the surgical procedure and the patient outcomes. For example, in some embodiments, the data collected over the episode of care may be used to generate a surgical plan. In one embodiment, a high-level, pre-operative plan is refined intra-operatively as data is collected during surgery. In this way, the surgical plan can be viewed as dynamically changing in real-time or near real-time as new data is collected by the components of the CASS 100. In other embodiments, pre-operative images or other input data may be used to develop a robust plan preoperatively that is simply executed during surgery. In this case, the data collected by the CASS 100 during surgery may be used to make recommendations that ensure that the surgeon stays within the pre-operative surgical plan. For example, if the surgeon is unsure how to achieve a certain prescribed cut or implant alignment, the Surgical Computer 150 can be queried for a recommendation. In still other embodiments, the pre-operative and intra-operative planning approaches can be combined such that a robust pre-operative plan can be dynamically modified, as necessary or desired, during the surgical procedure. In some embodiments, a biomechanics-based model of patient anatomy contributes simulation data to be considered by the CASS 100 in developing preoperative, intraoperative, and post-operative/rehabilitation procedures to optimize implant performance outcomes for the patient.

Aside from changing the surgical procedure itself, the data gathered during the episode of care may be used as an input to other procedures ancillary to the surgery. For example, in some embodiments, implants can be designed using episode of care data. Example data-driven techniques for designing, sizing, and fitting implants are described in U.S. patent application Ser. No. 13/814,531 filed Aug. 15, 2011 and entitled "Systems and Methods for Optimizing Parameters for Orthopaedic Procedures"; U.S. patent application Ser. No. 14/232,958 filed Jul. 20, 2012 and entitled "Systems and Methods for Optimizing Fit of an Implant to Anatomy"; and U.S. patent application Ser. No. 12/234,444 filed Sep. 19, 2008 and entitled "Operatively Tuning Implants for Increased Performance," the entire contents of each of which are hereby incorporated by reference into this patent application.

Furthermore, the data can be used for educational, training, or research purposes. For example, using the network-based approach described below in FIG. 5C, other doctors or students can remotely view surgeries in interfaces that allow them to selectively view data as it is collected from the various components of the CASS 100. After the surgical procedure, similar interfaces may be used to "playback" a surgery for training or other educational purposes, or to identify the source of any issues or complications with the procedure.

Data acquired during the pre-operative phase generally includes all information collected or generated prior to the surgery. Thus, for example, information about the patient may be acquired from a patient intake form or electronic medical record (EMR). Examples of patient information that may be collected include, without limitation, patient demographics, diagnoses, medical histories, progress notes, vital signs, medical history information, allergies, and lab results. The pre-operative data may also include images related to the anatomical area of interest. These images may be captured, for example, using Magnetic Resonance Imaging (MRI), Computed Tomography (CT), X-ray, ultrasound, or any other modality known in the art. The pre-operative data may also comprise quality of life data captured from the patient. For example, in one embodiment, pre-surgery patients use a mobile application ("app") to answer questionnaires regarding their current quality of life. In some embodiments, preoperative data used by the CASS 100 includes demographic, anthropometric, cultural, or other specific traits about a patient that can coincide with activity levels and specific patient activities to customize the surgical plan to the patient. For example, certain cultures or demographics may be more likely to use a toilet that requires squatting on a daily basis.

Figure 5A:
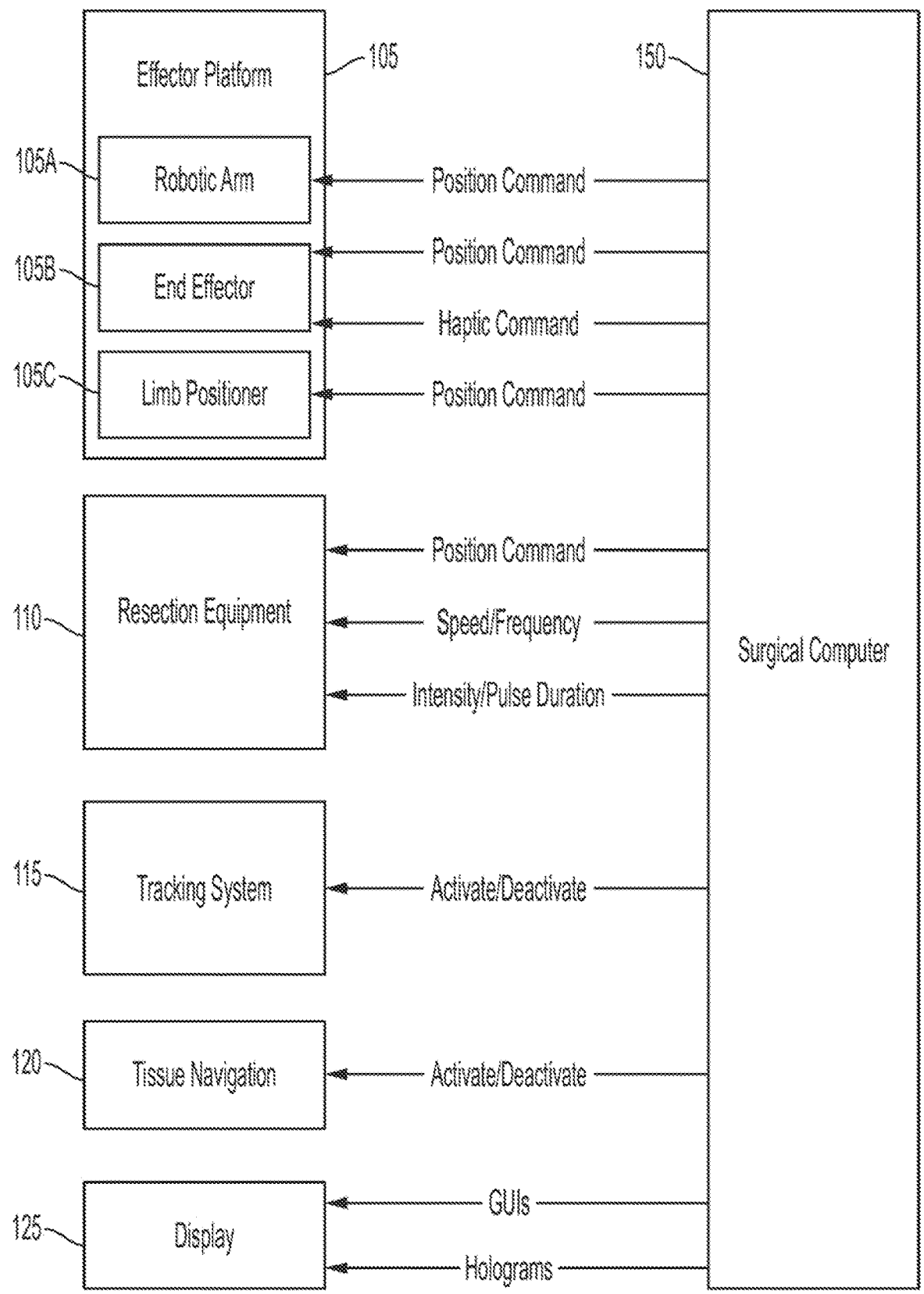
FIG. 5A depicts illustrative control instructions that a surgical computer provides to other components of a CASS in accordance with an embodiment.
Figure 5B:
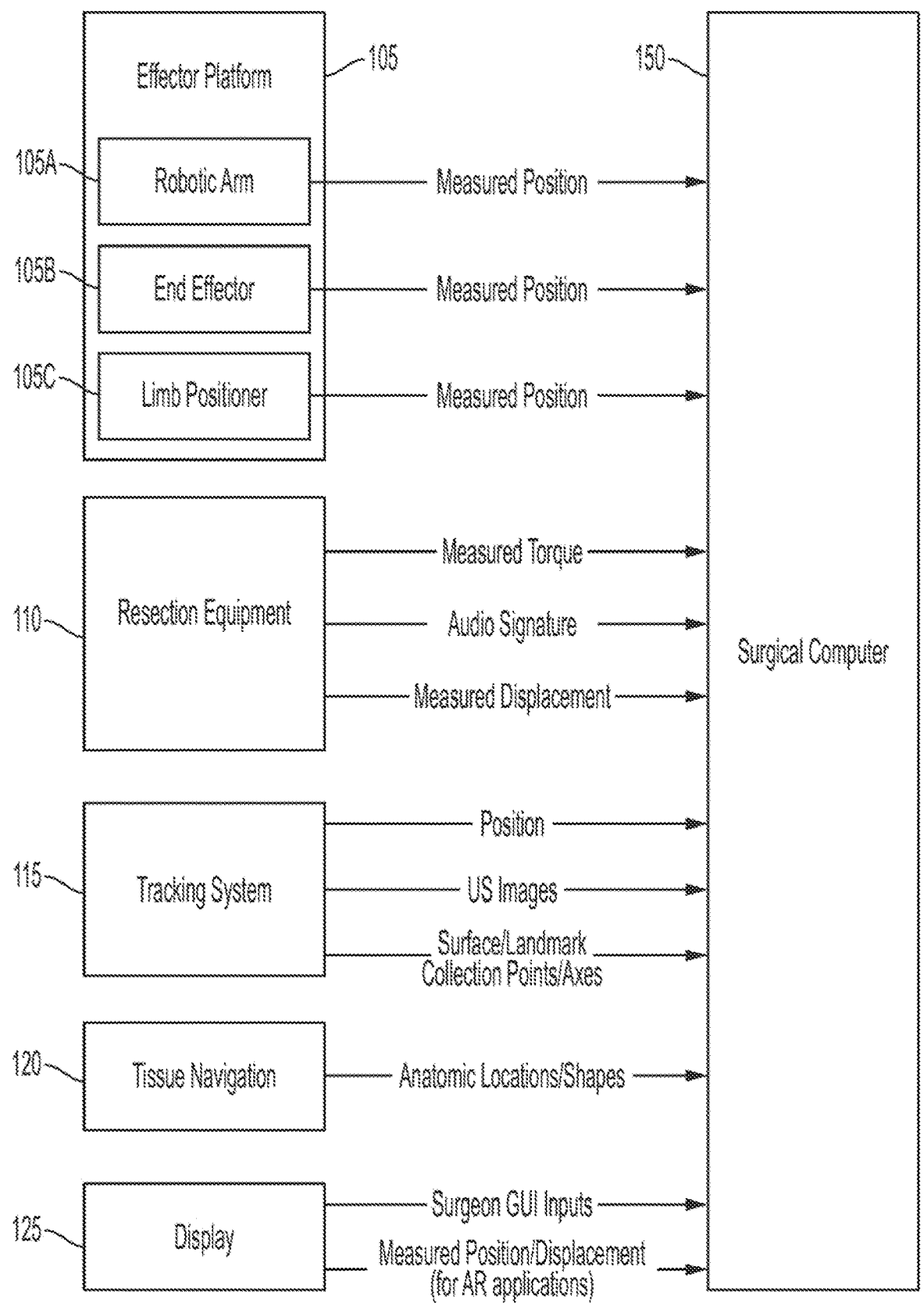
FIG. 5B depicts illustrative control instructions that components of a CASS provide to a surgical computer in accordance with an embodiment.

FIGS. 5A and 5B provide examples of data that may be acquired during the intra-operative phase of an episode of care. These examples are based on the various components of the CASS 100 described above with reference to FIG. 1; however, it should be understood that other types of data may be used based on the types of equipment used during surgery and their use.

FIG. 5A shows examples of some of the control instructions that the Surgical Computer 150 provides to other components of the CASS 100, according to some embodiments. Note that the example of FIG. 5A assumes that the components of the Effector Platform 105 are each controlled directly by the Surgical Computer 150. In embodiments where a component is manually controlled by the Surgeon 111, instructions may be provided on the Display 125 or AR HMD 155 instructing the Surgeon 111 how to move the component.

The various components included in the Effector Platform 105 are controlled by the Surgical Computer 150 providing position commands that instruct the component where to move within a coordinate system. In some embodiments, the Surgical Computer 150 provides the Effector Platform 105 with instructions defining how to react when a component of the Effector Platform 105 deviates from a surgical plan. These commands are referenced in FIG. 5A as "haptic" commands. For example, the End Effector 105B may provide a force to resist movement outside of an area where resection is planned. Other commands that may be used by the Effector Platform 105 include vibration and audio cues.

In some embodiments, the end effectors 105B of the robotic arm 105A are operatively coupled with cutting guide 105D. In response to an anatomical model of the surgical scene, the robotic arm 105A can move the end effectors 105B and the cutting guide 105D into position to match the location of the femoral or tibial cut to be performed in accordance with the surgical plan. This can reduce the likelihood of error, allowing the vision system and a processor utilizing that vision system to implement the surgical plan to place a cutting guide 105D at the precise location and orientation relative to the tibia or femur to align a cutting slot of the cutting guide with the cut to be performed according to the surgical plan. Then, a surgeon can use any suitable tool, such as an oscillating or rotating saw or drill to perform the cut (or drill a hole) with perfect placement and orientation because the tool is mechanically limited by the features of the cutting guide 105D. In some embodiments, the cutting guide 105D may include one or more pin holes that are used by a surgeon to drill and screw or pin the cutting guide into place before performing a resection of the patient tissue using the cutting guide. This can free the robotic arm 105A or ensure that the cutting guide 105D is fully affixed without moving relative to the bone to be resected. For example, this procedure can be used to make the first distal cut of the femur during a total knee arthroplasty. In some embodiments, where the arthroplasty is a hip arthroplasty, cutting guide 105D can be fixed to the femoral head or the acetabulum for the respective hip arthroplasty resection. It should be understood that any arthroplasty that utilizes precise cuts can use the robotic arm 105A and/or cutting guide 105D in this manner.

The Resection Equipment 110 is provided with a variety of commands to perform bone or tissue operations. As with the Effector Platform 105, position information may be provided to the Resection Equipment 110 to specify where it should be located when performing resection. Other commands provided to the Resection Equipment 110 may be dependent on the type of resection equipment. For example, for a mechanical or ultrasonic resection tool, the commands may specify the speed and frequency of the tool. For Radiofrequency Ablation (RFA) and other laser ablation tools, the commands may specify intensity and pulse duration.

Some components of the CASS 100 do not need to be directly controlled by the Surgical Computer 150; rather, the Surgical Computer 150 only needs to activate the component, which then executes software locally specifying the manner in which to collect data and provide it to the Surgical Computer 150. In the example of FIG. 5A, there are two components that are operated in this manner: the Tracking System 115 and the Tissue Navigation System 120.

The Surgical Computer 150 provides the Display 125 with any visualization that is needed by the Surgeon 111 during surgery. For monitors, the Surgical Computer 150 may provide instructions for displaying images, GUIs, etc. using techniques known in the art. The display 125 can include various portions of the workflow of a surgical plan. During the registration process, for example, the display 125 can show a preoperatively constructed 3D bone model and depict the locations of the probe as the surgeon uses the probe to collect locations of anatomical landmarks on the patient. The display 125 can include information about the surgical target area. For example, in connection with a TKA, the display 125 can depict the mechanical and anatomical axes of the femur and tibia. The display 125 can depict varus and valgus angles for the knee joint based on a surgical plan, and the CASS 100 can depict how such angles will be affected if contemplated revisions to the surgical plan are made. Accordingly, the display 125 is an interactive interface that can dynamically update and display how changes to the surgical plan would impact the procedure and the final position and orientation of implants installed on bone.

As the workflow progresses to preparation of bone cuts or resections, the display 125 can depict the planned or recommended bone cuts before any cuts are performed. The surgeon 111 can manipulate the image display to provide different anatomical perspectives of the target area and can have the option to alter or revise the planned bone cuts based on intraoperative evaluation of the patient. The display 125 can depict how the chosen implants would be installed on the bone if the planned bone cuts are performed. If the surgeon 111 choses to change the previously planned bone cuts, the display 125 can depict how the revised bone cuts would change the position and orientation of the implant when installed on the bone.

The display 125 can provide the surgeon 111 with a variety of data and information about the patient, the planned surgical intervention, and the implants. Various patient-specific information can be displayed, including real-time data concerning the patient's health such as heart rate, blood pressure, etc. The display 125 can also include information about the anatomy of the surgical target region including the location of landmarks, the current state of the anatomy (e.g., whether any resections have been made, the depth and angles of planned and executed bone cuts), and future states of the anatomy as the surgical plan progresses. The display 125 can also provide or depict additional information about the surgical target region. For a TKA, the display 125 can provide information about the gaps (e.g., gap balancing) between the femur and tibia and how such gaps will change if the planned surgical plan is carried out. For a TKA, the display 125 can provide additional relevant information about the knee joint such as data about the joint's tension (e.g., ligament laxity) and information concerning rotation and alignment of the joint. The display 125 can depict how the planned implants' locations and positions will affect the patient as the knee joint is flexed. The display 125 can depict how the use of different implants or the use of different sizes of the same implant will affect the surgical plan and preview how such implants will be positioned on the bone. The CASS 100 can provide such information for each of the planned bone resections in a TKA or THA. In a TKA, the CASS 100 can provide robotic control for one or more of the planned bone resections. For example, the CASS 100 can provide robotic control only for the initial distal femur cut, and the surgeon 111 can manually perform other resections (anterior, posterior and chamfer cuts) using conventional means, such as a 4-in-1 cutting guide or jig 105D.

The display 125 can employ different colors to inform the surgeon of the status of the surgical plan. For example, un-resected bone can be displayed in a first color, resected bone can be displayed in a second color, and planned resections can be displayed in a third color. Implants can be superimposed onto the bone in the display 125, and implant colors can change or correspond to different types or sizes of implants.

The information and options depicted on the display 125 can vary depending on the type of surgical procedure being performed. Further, the surgeon 111 can request or select a particular surgical workflow display that matches or is consistent with his or her surgical plan preferences. For example, for a surgeon 111 who typically performs the tibial cuts before the femoral cuts in a TKA, the display 125 and associated workflow can be adapted to take this preference into account. The surgeon 111 can also preselect that certain steps be included or deleted from the standard surgical workflow display. For example, if a surgeon 111 uses resection measurements to finalize an implant plan but does not analyze ligament gap balancing when finalizing the implant plan, the surgical workflow display can be organized into modules, and the surgeon can select which modules to display and the order in which the modules are provided based on the surgeon's preferences or the circumstances of a particular surgery. Modules directed to ligament and gap balancing, for example, can include pre- and post-resection ligament/gap balancing, and the surgeon 111 can select which modules to include in their default surgical plan workflow depending on whether they perform such ligament and gap balancing before or after (or both) bone resections are performed.

For more specialized display equipment, such as AR HMDs, the Surgical Computer 150 may provide images, text, etc. using the data format supported by the equipment. For example, if the Display 125 is a holography device such as the Microsoft HoloLens™ or Magic Leap One™, the Surgical Computer 150 may use the HoloLens Application Program Interface (API) to send commands specifying the position and content of holograms displayed in the field of view of the Surgeon 111.

In some embodiments, one or more surgical planning models may be incorporated into the CASS 100 and used in the development of the surgical plans provided to the surgeon 111. The term "surgical planning model" refers to software that simulates the biomechanics performance of anatomy under various scenarios to determine the optimal way to perform cutting and other surgical activities. For example, for knee replacement surgeries, the surgical planning model can measure parameters for functional activities, such as deep knee bends, gait, etc., and select cut locations on the knee to optimize implant placement. One example of a surgical planning model is the LIFEMOD™ simulation software from SMITH AND NEPHEW, INC. In some embodiments, the Surgical Computer 150 includes computing architecture that allows full execution of the surgical planning model during surgery (e.g., a GPU-based parallel processing environment). In other embodiments, the Surgical Computer 150 may be connected over a network to a remote computer that allows such execution, such as a Surgical Data Server 180 (see FIG. 5C). As an alternative to full execution of the surgical planning model, in some embodiments, a set of transfer functions are derived that simplify the mathematical operations captured by the model into one or more predictor equations. Then, rather than execute the full simulation during surgery, the predictor equations are used. Further details on the use of transfer functions are described in WIPO Publication No. 2020/037308, filed Aug. 19, 2019, entitled "Patient Specific Surgical Method and System," the entirety of which is incorporated herein by reference.

FIG. 5B shows examples of some of the types of data that can be provided to the Surgical Computer 150 from the various components of the CASS 100. In some embodiments, the components may stream data to the Surgical Computer 150 in real-time or near real-time during surgery. In other embodiments, the components may queue data and send it to the Surgical Computer 150 at set intervals (e.g., every second). Data may be communicated using any format known in the art. Thus, in some embodiments, the components all transmit data to the Surgical Computer 150 in a common format. In other embodiments, each component may use a different data format, and the Surgical Computer 150 is configured with one or more software applications that enable translation of the data.

In general, the Surgical Computer 150 may serve as the central point where CASS data is collected. The exact content of the data will vary depending on the source. For example, each component of the Effector Platform 105 provides a measured position to the Surgical Computer 150. Thus, by comparing the measured position to a position originally specified by the Surgical Computer 150 (see FIG. 5B), the Surgical Computer can identify deviations that take place during surgery.

The Resection Equipment 110 can send various types of data to the Surgical Computer 150 depending on the type of equipment used. Example data types that may be sent include the measured torque, audio signatures, and measured displacement values. Similarly, the Tracking Technology 115 can provide different types of data depending on the tracking methodology employed. Example tracking data types include position values for tracked items (e.g., anatomy, tools, etc.), ultrasound images, and surface or landmark collection points or axes. The Tissue Navigation System 120 provides the Surgical Computer 150 with anatomic locations, shapes, etc. as the system operates.

Although the Display 125 generally is used for outputting data for presentation to the user, it may also provide data to the Surgical Computer 150. For example, for embodiments where a monitor is used as part of the Display 125, the Surgeon 111 may interact with a GUI to provide inputs which are sent to the Surgical Computer 150 for further processing. For AR applications, the measured position and displacement of the HMD may be sent to the Surgical Computer 150 so that it can update the presented view as needed.

During the post-operative phase of the episode of care, various types of data can be collected to quantify the overall improvement or deterioration in the patient's condition as a result of the surgery. The data can take the form of, for example, self-reported information reported by patients via questionnaires. For example, in the context of a knee replacement surgery, functional status can be measured with an Oxford Knee Score questionnaire, and the post-operative quality of life can be measured with a EQ5D-5L questionnaire. Other examples in the context of a hip replacement surgery may include the Oxford Hip Score, Harris Hip Score, and WOMAC (Western Ontario and McMaster Universities Osteoarthritis index). Such questionnaires can be administered, for example, by a healthcare professional directly in a clinical setting or using a mobile app that allows the patient to respond to questions directly. In some embodiments, the patient may be outfitted with one or more wearable devices that collect data relevant to the surgery. For example, following a knee surgery, the patient may be outfitted with a knee brace that includes sensors that monitor knee positioning, flexibility, etc. This information can be collected and transferred to the patient's mobile device for review by the surgeon to evaluate the outcome of the surgery and address any issues. In some embodiments, one or more cameras can capture and record the motion of a patient's body segments during specified activities postoperatively. This motion capture can be compared to a biomechanics model to better understand the functionality of the patient's joints and better predict progress in recovery and identify any possible revisions that may be needed.

The post-operative stage of the episode of care can continue over the entire life of a patient. For example, in some embodiments, the Surgical Computer 150 or other components comprising the CASS 100 can continue to receive and collect data relevant to a surgical procedure after the procedure has been performed. This data may include, for example, images, answers to questions, "normal" patient data (e.g., blood type, blood pressure, conditions, medications, etc.), biometric data (e.g., gait, etc.), and objective and subjective data about specific issues (e.g., knee or hip joint pain). This data may be explicitly provided to the Surgical Computer 150 or other CASS component by the patient or the patient's physician(s). Alternatively or additionally, the Surgical Computer 150 or other CASS component can monitor the patient's EMR and retrieve relevant information as it becomes available. This longitudinal view of the patient's recovery allows the Surgical Computer 150 or other CASS component to provide a more objective analysis of the patient's outcome to measure and track success or lack of success for a given procedure. For example, a condition experienced by a patient long after the surgical procedure can be linked back to the surgery through a regression analysis of various data items collected during the episode of care. This analysis can be further enhanced by performing the analysis on groups of patients that had similar procedures and/or have similar anatomies.

In some embodiments, data is collected at a central location to provide for easier analysis and use. Data can be manually collected from various CASS components in some instances. For example, a portable storage device (e.g., USB stick) can be attached to the Surgical Computer 150 into order to retrieve data collected during surgery. The data can then be transferred, for example, via a desktop computer to the centralized storage. Alternatively, in some embodiments, the Surgical Computer 150 is connected directly to the centralized storage via a Network 175 as shown in FIG. 5C.

Figure 5C:
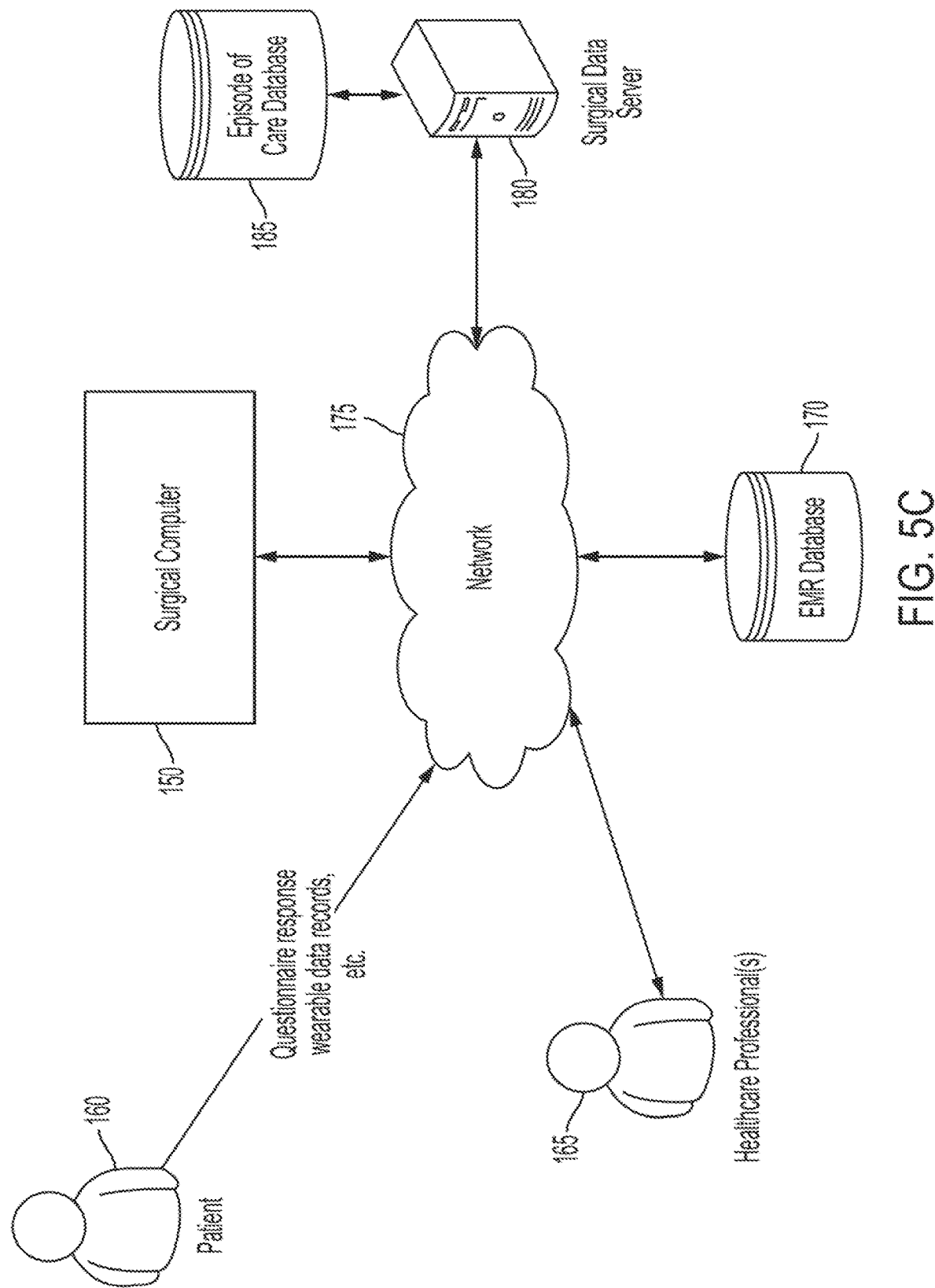
FIG. 5C depicts an illustrative implementation in which a surgical computer is connected to a surgical data server via a network in accordance with an embodiment.

FIG. 5C illustrates a "cloud-based" implementation in which the Surgical Computer 150 is connected to a Surgical Data Server 180 via a Network 175. This Network 175 may be, for example, a private intranet or the Internet. In addition to the data from the Surgical Computer 150, other sources can transfer relevant data to the Surgical Data Server 180. The example of FIG. 5C shows 3 additional data sources: the Patient 160, Healthcare Professional(s) 165, and an EMR Database 170. Thus, the Patient 160 can send pre-operative and post-operative data to the Surgical Data Server 180, for example, using a mobile app. The Healthcare Professional(s) 165 includes the surgeon and his or her staff as well as any other professionals working with Patient 160 (e.g., a personal physician, a rehabilitation specialist, etc.). It should also be noted that the EMR Database 170 may be used for both pre-operative and post-operative data. For example, assuming that the Patient 160 has given adequate permissions, the Surgical Data Server 180 may collect the EMR of the Patient pre-surgery. Then, the Surgical Data Server 180 may continue to monitor the EMR for any updates post-surgery.

At the Surgical Data Server 180, an Episode of Care Database 185 is used to store the various data collected over a patient's episode of care. The Episode of Care Database 185 may be implemented using any technique known in the art. For example, in some embodiments, a SQL-based database may be used where all of the various data items are structured in a manner that allows them to be readily incorporated in two SQL's collection of rows and columns. However, in other embodiments a No-SQL database may be employed to allow for unstructured data, while providing the ability to rapidly process and respond to queries. As is understood in the art, the term "No-SQL" is used to define a class of data stores that are non-relational in their design. Various types of No-SQL databases may generally be grouped according to their underlying data model. These groupings may include databases that use column-based data models (e.g., Cassandra), document-based data models (e.g., MongoDB), key-value based data models (e.g., Redis), and/or graph-based data models (e.g., Allego). Any type of No-SQL database may be used to implement the various embodiments described herein and, in some embodiments, the different types of databases may support the Episode of Care Database 185.

Data can be transferred between the various data sources and the Surgical Data Server 180 using any data format and transfer technique known in the art. It should be noted that the architecture shown in FIG. 5C allows transmission from the data source to the Surgical Data Server 180, as well as retrieval of data from the Surgical Data Server 180 by the data sources. For example, as explained in detail below, in some embodiments, the Surgical Computer 150 may use data from past surgeries, machine learning models, etc. to help guide the surgical procedure.

In some embodiments, the Surgical Computer 150 or the Surgical Data Server 180 may execute a de-identification process to ensure that data stored in the Episode of Care Database 185 meets Health Insurance Portability and Accountability Act (HIPAA) standards or other requirements mandated by law. HIPAA provides a list of certain identifiers that must be removed from data during de-identification. The aforementioned de-identification process can scan for these identifiers in data that is transferred to the Episode of Care Database 185 for storage. For example, in one embodiment, the Surgical Computer 150 executes the de-identification process just prior to initiating transfer of a particular data item or set of data items to the Surgical Data Server 180. In some embodiments, a unique identifier is assigned to data from a particular episode of care to allow for re-identification of the data if necessary.

Although FIGS. 5A-5C discuss data collection in the context of a single episode of care, it should be understood that the general concept can be extended to data collection from multiple episodes of care. For example, surgical data may be collected over an entire episode of care each time a surgery is performed with the CASS 100 and stored at the Surgical Computer 150 or at the Surgical Data Server 180. As explained in further detail below, a robust database of episode of care data allows the generation of optimized values, measurements, distances, or other parameters and other recommendations related to the surgical procedure. In some embodiments, the various datasets are indexed in the database or other storage medium in a manner that allows for rapid retrieval of relevant information during the surgical procedure. For example, in one embodiment, a patient-centric set of indices may be used so that data pertaining to a particular patient or a set of patients similar to a particular patient can be readily extracted. This concept can be similarly applied to surgeons, implant characteristics, CASS component versions, etc.

Further details of the management of episode of care data is described in U.S. Patent Application No. 62/783,858 filed Dec. 21, 2018 and entitled "Methods and Systems for Providing an Episode of Care," the entirety of which is incorporated herein by reference.

Open versus Closed Digital Ecosystems

In some embodiments, the CASS 100 is designed to operate as a self-contained or "closed" digital ecosystem. Each component of the CASS 100 is specifically designed to be used in the closed ecosystem, and data is generally not accessible to devices outside of the digital ecosystem. For example, in some embodiments, each component includes software or firmware that implements proprietary protocols for activities such as communication, storage, security, etc. The concept of a closed digital ecosystem may be desirable for a company that wants to control all components of the CASS 100 to ensure that certain compatibility, security, and reliability standards are met. For example, the CASS 100 can be designed such that a new component cannot be used with the CASS unless it is certified by the company.

In other embodiments, the CASS 100 is designed to operate as an "open" digital ecosystem. In these embodiments, components may be produced by a variety of different companies according to standards for activities, such as communication, storage, and security. Thus, by using these standards, any company can freely build an independent, compliant component of the CASS platform. Data may be transferred between components using publicly available application programming interfaces (APIs) and open, shareable data formats.

To illustrate one type of recommendation that may be performed with the CASS 100, a technique for optimizing surgical parameters is disclosed below. The term "optimization" in this context means selection of parameters that are optimal based on certain specified criteria. In an extreme case, optimization can refer to selecting optimal parameter(s) based on data from the entire episode of care, including any pre-operative data, the state of CASS data at a given point in time, and post-operative goals. Moreover, optimization may be performed using historical data, such as data generated during past surgeries involving, for example, the same surgeon, past patients with physical characteristics similar to the current patient, or the like.

The optimized parameters may depend on the portion of the patient's anatomy to be operated on. For example, for knee surgeries, the surgical parameters may include positioning information for the femoral and tibial component including, without limitation, rotational alignment (e.g., varus/valgus rotation, external rotation, flexion rotation for the femoral component, posterior slope of the tibial component), resection depths (e.g., varus knee, valgus knee), and implant type, size and position. The positioning information may further include surgical parameters for the combined implant, such as overall limb alignment, combined tibiofemoral hyperextension, and combined tibiofemoral resection. Additional examples of parameters that could be optimized for a given TKA femoral implant by the CASS 100 include the following:

| Parameter | Reference | Exemplary Recommendation(s) |
|---|---|---|
| Size | Posterior | The largest sized implant that does not overhang medial/lateral bone edges or overhang the anterior femur. A size that does not result in overstuffing the patella femoral joint |
| Implant Position - Medial Lateral | Medial/lateral cortical bone edges | Center the implant evenly between the medial/lateral cortical bone edges |
| Resection Depth - Varus Knee | Distal and posterior lateral | 6 mm of bone |
| Resection Depth - Valgus Knee | Distal and posterior medial | 7 mm of bone |
| Rotation - Varus/Valgus | Mechanical Axis | 1° varus |
| Rotation - External | Transepicondylar Axis | 1° external from the transepicondylar axis |
| Rotation - Flexion | Mechanical Axis | 3° flexed |

Additional examples of parameters that could be optimized for a given TKA tibial implant by the CASS 100 include the following:

| Parameter | Reference | Exemplary Recommendation(s) |
|---|---|---|
| Size | Posterior | The largest sized implant that does not overhang the medial, lateral, anterior, and posterior tibial edges |
| Implant Position | Medial/lateral and anterior/posterior cortical bone edges | Center the implant evenly between the medial/lateral and anterior/posterior cortical bone edges |
| Resection Depth - Varus Knee | Lateral/Medial | 4 mm of bone |
| Resection Depth - Valgus Knee | Lateral/Medial | 5 mm of bone |
| Rotation - Varus/Valgus | Mechanical Axis | 1° valgus |
| Rotation - External | Tibial Anterior Posterior Axis | 1° external from the tibial anterior paxis |
| Posterior Slope | Mechanical Axis | 3° posterior slope |

For hip surgeries, the surgical parameters may comprise femoral neck resection location and angle, cup inclination angle, cup anteversion angle, cup depth, femoral stem design, femoral stem size, fit of the femoral stem within the canal, femoral offset, leg length, and femoral version of the implant.

Shoulder parameters may include, without limitation, humeral resection depth/angle, humeral stem version, humeral offset, glenoid version and inclination, as well as reverse shoulder parameters such as humeral resection depth/angle, humeral stem version, Glenoid tilt/version, glenosphere orientation, glenosphere offset and offset direction.

Various conventional techniques exist for optimizing surgical parameters. However, these techniques are typically computationally intensive and, thus, parameters often need to be determined pre-operatively. As a result, the surgeon is limited in his or her ability to make modifications to optimized parameters based on issues that may arise during surgery. Moreover, conventional optimization techniques typically operate in a "black box" manner with little or no explanation regarding recommended parameter values. Thus, if the surgeon decides to deviate from a recommended parameter value, the surgeon typically does so without a full understanding of the effect of that deviation on the rest of the surgical workflow, or the impact of the deviation on the patient's post-surgery quality of life.

Operative Patient Care System

Figure 6:
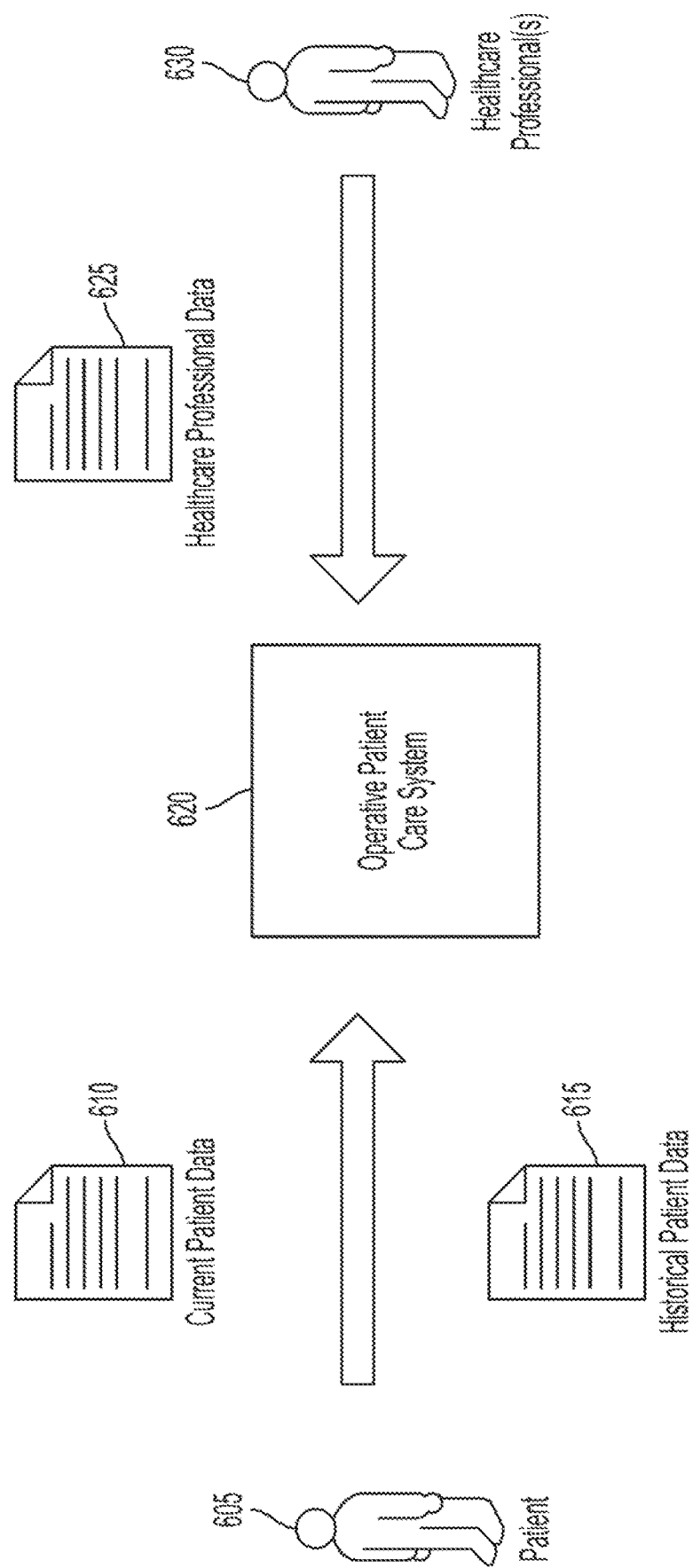
FIG. 6 depicts an operative patient care system and illustrative data sources in accordance with an embodiment.

The general concepts of optimization may be extended to the entire episode of care using an Operative Patient Care System 620 that uses the surgical data, and other data from the Patient 605 and Healthcare Professionals 630 to optimize outcomes and patient satisfaction as depicted in FIG. 6.

Conventionally, pre-operative diagnosis, pre-operative surgical planning, intra-operative execution of a prescribed plan, and post-operative management of total joint arthroplasty are based on individual experience, published literature, and training knowledge bases of surgeons (ultimately, tribal knowledge of individual surgeons and their 'network' of peers and journal publications) and their native ability to make accurate intra-operative tactile discernment of "balance" and accurate manual execution of planar resections using guides and visual cues. This existing knowledge base and execution is limited with respect to the outcomes optimization offered to patients needing care. For example, limits exist with respect to accurately diagnosing a patient to the proper, least-invasive prescribed care; aligning dynamic patient, healthcare economic, and surgeon preferences with patient-desired outcomes; executing a surgical plan resulting in proper bone alignment and balance, etc.; and receiving data from disconnected sources having different biases that are difficult to reconcile into a holistic patient framework. Accordingly, a data-driven tool that more accurately models anatomical response and guides the surgical plan can improve the existing approach.

The Operative Patient Care System 620 is designed to utilize patient specific data, surgeon data, healthcare facility data, and historical outcome data to develop an algorithm that suggests or recommends an optimal overall treatment plan for the patient's entire episode of care (preoperative, operative, and postoperative) based on a desired clinical outcome. For example, in one embodiment, the Operative Patient Care System 620 tracks adherence to the suggested or recommended plan, and adapts the plan based on patient/care provider performance. Once the surgical treatment plan is complete, collected data is logged by the Operative Patient Care System 620 in a historical database. This database is accessible for future patients and the development of future treatment plans. In addition to utilizing statistical and mathematical models, simulation tools (e.g., LIFEMOD®) can be used to simulate outcomes, alignment, kinematics, etc. based on a preliminary or proposed surgical plan, and reconfigure the preliminary or proposed plan to achieve desired or optimal results according to a patient's profile or a surgeon's preferences. The Operative Patient Care System 6320 ensures that each patient is receiving personalized surgical and rehabilitative care, thereby improving the chance of successful clinical outcomes and lessening the economic burden on the facility associated with near-term revision.

In some embodiments, the Operative Patient Care System 620 employs a data collecting and management method to provide a detailed surgical case plan with distinct steps that are monitored and/or executed using a CASS 100. The performance of the user(s) is calculated at the completion of each step and can be used to suggest changes to the subsequent steps of the case plan. Case plan generation relies on a series of input data that is stored on a local or cloud-storage database. Input data can be related to both the current patient undergoing treatment and historical data from patients who have received similar treatment(s).

A Patient 605 provides inputs such as Current Patient Data 610 and Historical Patient Data 615 to the Operative Patient Care System 620. Various methods generally known in the art may be used to gather such inputs from the Patient 605. For example, in some embodiments, the Patient 605 fills out a paper or digital survey that is parsed by the Operative Patient Care System 620 to extract patient data. In other embodiments, the Operative Patient Care System 620 may extract patient data from existing information sources, such as electronic medical records (EMRs), health history files, and payer/provider historical files. In still other embodiments, the Operative Patient Care System 620 may provide an application program interface (API) that allows the external data source to push data to the Operative Patient Care System. For example, the Patient 605 may have a mobile phone, wearable device, or other mobile device that collects data (e.g., heart rate, pain or discomfort levels, exercise or activity levels, or patient-submitted responses to the patient's adherence with any number of pre-operative plan criteria or conditions) and provides that data to the Operative Patient Care System 620. Similarly, the Patient 605 may have a digital application on his or her mobile or wearable device that enables data to be collected and transmitted to the Operative Patient Care System 620.

Current Patient Data 610 can include, but is not limited to, activity level, preexisting conditions, comorbidities, prehab performance, health and fitness level, pre-operative expectation level (relating to hospital, surgery, and recovery), a Metropolitan Statistical Area (MSA) driven score, genetic background, prior injuries (sports, trauma, etc.), previous joint arthroplasty, previous trauma procedures, previous sports medicine procedures, treatment of the contralateral joint or limb, gait or biomechanical information (back and ankle issues), levels of pain or discomfort, care infrastructure information (payer coverage type, home health care infrastructure level, etc.), and an indication of the expected ideal outcome of the procedure.

Historical Patient Data 615 can include, but is not limited to, activity level, preexisting conditions, comorbidities, prehab performance, health and fitness level, pre-operative expectation level (relating to hospital, surgery, and recovery), a MSA driven score, genetic background, prior injuries (sports, trauma, etc.), previous joint arthroplasty, previous trauma procedures, previous sports medicine procedures, treatment of the contralateral joint or limb, gait or biomechanical information (back and ankle issues), levels or pain or discomfort, care infrastructure information (payer coverage type, home health care infrastructure level, etc.), expected ideal outcome of the procedure, actual outcome of the procedure (patient reported outcomes [PROs], survivorship of implants, pain levels, activity levels, etc.), sizes of implants used, position/orientation/alignment of implants used, soft-tissue balance achieved, etc.

Healthcare Professional(s) 630 conducting the procedure or treatment may provide various types of data 625 to the Operative Patient Care System 620. This Healthcare Professional Data 625 may include, for example, a description of a known or preferred surgical technique (e.g., Cruciate Retaining (CR) vs Posterior Stabilized (PS), up- vs downsizing, tourniquet vs tourniquet-less, femoral stem style, preferred approach for THA, etc.), the level of training of the Healthcare Professional(s) 630 (e.g., years in practice, fellowship trained, where they trained, whose techniques they emulate), previous success level including historical data (outcomes, patient satisfaction), and the expected ideal outcome with respect to range of motion, days of recovery, and survivorship of the device. The Healthcare Professional Data 625 can be captured, for example, with paper or digital surveys provided to the Healthcare Professional 630, via inputs to a mobile application by the Healthcare Professional, or by extracting relevant data from EMRs. In addition, the CASS 100 may provide data such as profile data (e.g., a Patient Specific Knee Instrument Profile) or historical logs describing use of the CASS during surgery.

Information pertaining to the facility where the procedure or treatment will be conducted may be included in the input data. This data can include, without limitation, the following: Ambulatory Surgery Center (ASC) vs hospital, facility trauma level, Comprehensive Care for Joint Replacement Program (CJR) or bundle candidacy, a MSA driven score, community vs metro, academic vs non-academic, postoperative network access (Skilled Nursing Facility [SNF] only, Home Health, etc.), availability of medical professionals, implant availability, and availability of surgical equipment.

These facility inputs can be captured by, for example and without limitation, Surveys (Paper/Digital), Surgery Scheduling Tools (e.g., apps, Websites, Electronic Medical Records [EMRs], etc.), Databases of Hospital Information (on the Internet), etc. Input data relating to the associated healthcare economy including, but not limited to, the socioeconomic profile of the patient, the expected level of reimbursement the patient will receive, and if the treatment is patient specific may also be captured.

These healthcare economic inputs can be captured by, for example and without limitation, Surveys (Paper/Digital), Direct Payer Information, Databases of Socioeconomic status (on the Internet with zip code), etc. Finally, data derived from simulation of the procedure is captured. Simulation inputs include implant size, position, and orientation. Simulation can be conducted with custom or commercially available anatomical modeling software programs (e.g., LIFE-MOD®, AnyBody, or OpenSIM). It is noted that the data inputs described above may not be available for every patient, and the treatment plan will be generated using the data that is available.

Prior to surgery, the Patient Data 610, 615 and Healthcare Professional Data 625 may be captured and stored in a cloud-based or online database (e.g., the Surgical Data Server 180 shown in FIG. 5C). Information relevant to the procedure is supplied to a computing system via wireless data transfer or manually with the use of portable media storage. The computing system is configured to generate a case plan for use with a CASS 100. Case plan generation will be described hereinafter. It is noted that the system has access to historical data from previous patients undergoing treatment, including implant size, placement, and orientation as generated by a computer-assisted, patient-specific knee instrument (PSKI) selection system, or automatically by the CASS 100 itself. To achieve this, case log data is uploaded to the historical database by a surgical sales rep or case engineer using an online portal. In some embodiments, data transfer to the online database is wireless and automated.

Historical data sets from the online database are used as inputs to a machine learning model such as, for example, a recurrent neural network (RNN) or other form of artificial neural network. As is generally understood in the art, an artificial neural network functions similar to a biologic neural network and is comprised of a series of nodes and connections. The machine learning model is trained to predict one or more values based on the input data. For the sections that follow, it is assumed that the machine learning model is trained to generate predictor equations. These predictor equations may be optimized to determine the optimal size, position, and orientation of the implants to achieve the best outcome or satisfaction level.

Once the procedure is complete, all patient data and available outcome data, including the implant size, position and orientation determined by the CASS 100, are collected and stored in the historical database. Any subsequent calculation of the target equation via the RNN will include the data from the previous patient in this manner, allowing for continuous improvement of the system.

In addition to, or as an alternative to determining implant positioning, in some embodiments, the predictor equation and associated optimization can be used to generate the resection planes for use with a PSKI system. When used with a PSKI system, the predictor equation computation and optimization are completed prior to surgery. Patient anatomy is estimated using medical image data (x-ray, CT, MRI). Global optimization of the predictor equation can provide an ideal size and position of the implant components. Boolean intersection of the implant components and patient anatomy is defined as the resection volume. PSKI can be produced to remove the optimized resection envelope. In this embodiment, the surgeon cannot alter the surgical plan intraoperatively.

The surgeon may choose to alter the surgical case plan at any time prior to or during the procedure. If the surgeon elects to deviate from the surgical case plan, the altered size, position, and/or orientation of the component(s) is locked, and the global optimization is refreshed based on the new size, position, and/or orientation of the component(s) (using the techniques previously described) to find the new ideal position of the other component(s) and the corresponding resections needed to be performed to achieve the newly optimized size, position and/or orientation of the component(s). For example, if the surgeon determines that the size, position and/or orientation of the femoral implant in a TKA needs to be updated or modified intraoperatively, the femoral implant position is locked relative to the anatomy, and the new optimal position of the tibia will be calculated (via global optimization) considering the surgeon's changes to the femoral implant size, position and/or orientation. Furthermore, if the surgical system used to implement the case plan is robotically assisted (e.g., as with NAVIO® or the MAKO Rio), bone removal and bone morphology during the surgery can be monitored in real time. If the resections made during the procedure deviate from the surgical plan, the subsequent placement of additional components may be optimized by the processor taking into account the actual resections that have already been made.

Figure 7A:
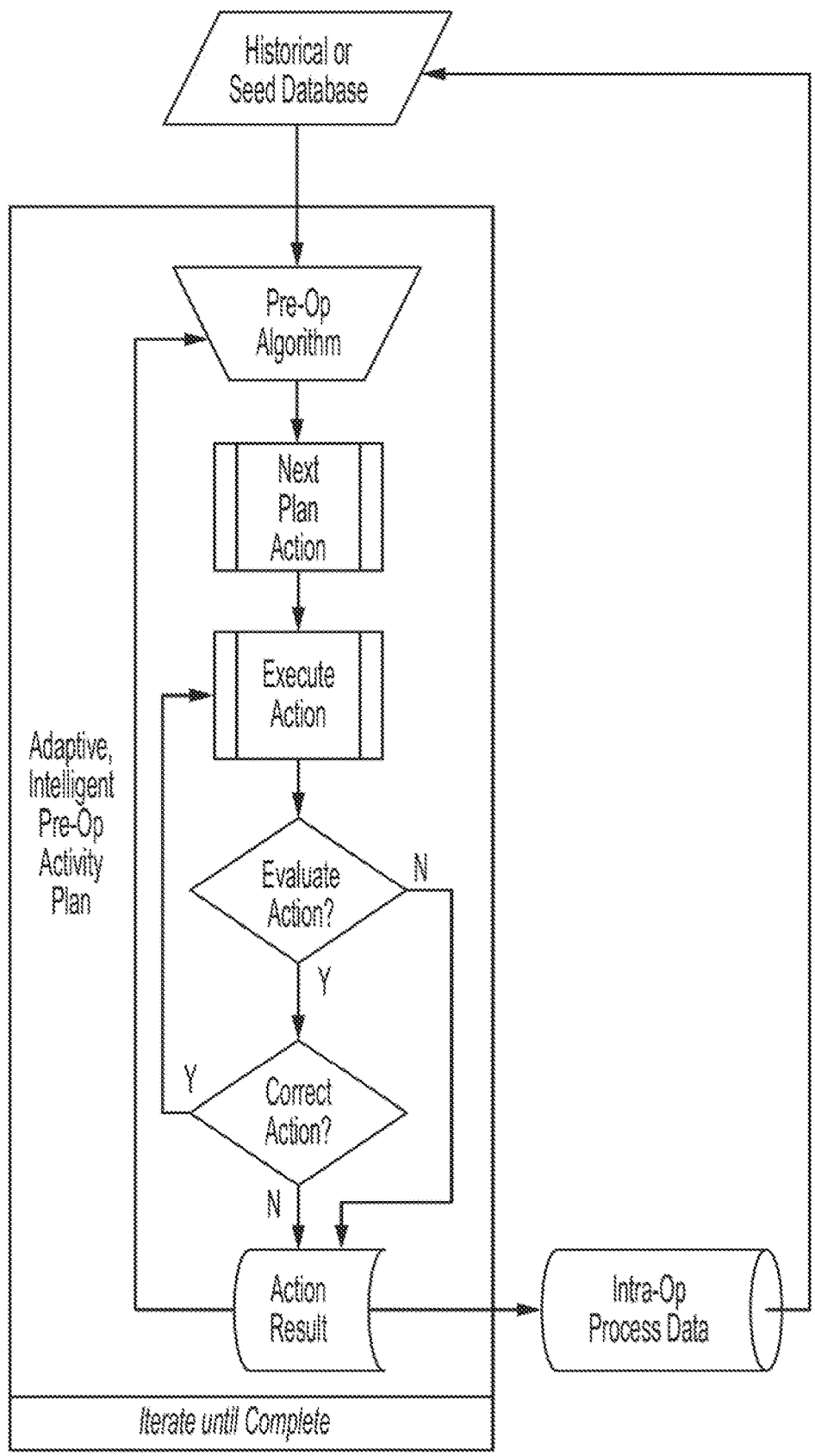
FIG. 7A depicts an illustrative flow diagram for determining a pre-operative surgical plan in accordance with an embodiment.
Figure 7B:
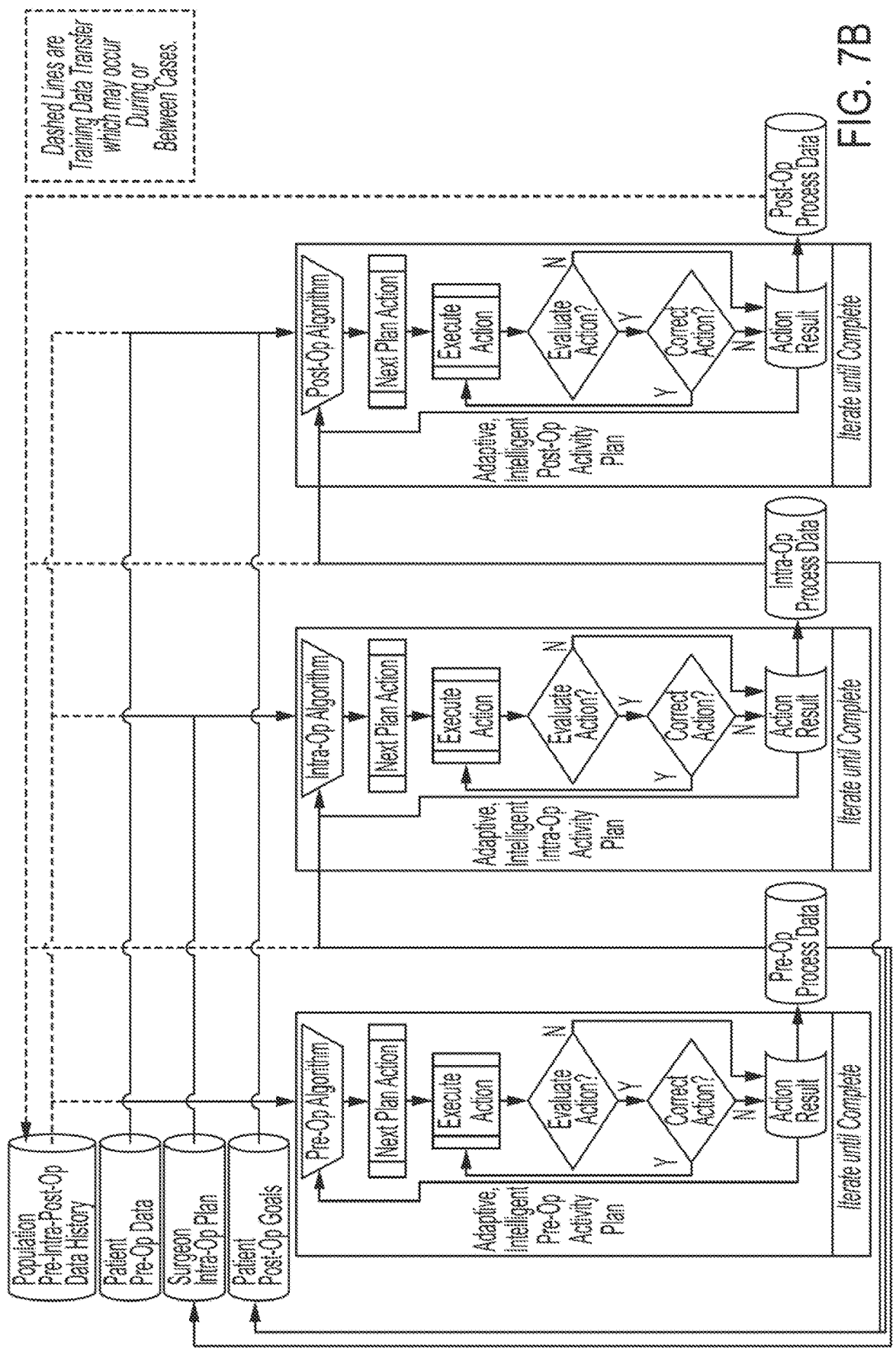
FIG. 7B depicts an illustrative flow diagram for determining an episode of care including pre-operative, intraoperative, and post-operative actions in accordance with an embodiment.

FIG. 7A illustrates how the Operative Patient Care System 620 may be adapted for performing case plan matching services. In this example, data is captured relating to the current patient 610 and is compared to all or portions of a historical database of patient data and associated outcomes 615. For example, the surgeon may elect to compare the plan for the current patient against a subset of the historical database. Data in the historical database can be filtered to include, for example, only data sets with favorable outcomes, data sets corresponding to historical surgeries of patients with profiles that are the same or similar to the current patient profile, data sets corresponding to a particular surgeon, data sets corresponding to a particular element of the surgical plan (e.g., only surgeries where a particular ligament is retained), or any other criteria selected by the surgeon or medical professional. If, for example, the current patient data matches or is correlated with that of a previous patient who experienced a good outcome, the case plan from the previous patient can be accessed and adapted or adopted for use with the current patient. The predictor equation may be used in conjunction with an intra-operative algorithm that identifies or determines the actions associated with the case plan. Based on the relevant and/or preselected information from the historical database, the intra-operative algorithm determines a series of recommended actions for the surgeon to perform. Each execution of the algorithm produces the next action in the case plan. If the surgeon performs the action, the results are evaluated. The results of the surgeon's performing the action are used to refine and update inputs to the intra-operative algorithm for generating the next step in the case plan. Once the case plan has been fully executed all data associated with the case plan, including any deviations performed from the recommended actions by the surgeon, are stored in the database of historical data. In some embodiments, the system utilizes preoperative, intraoperative, or postoperative modules in a piecewise fashion, as opposed to the entire continuum of care. In other words, caregivers can prescribe any permutation or combination of treatment modules including the use of a single module. These concepts are illustrated in FIG. 7B and can be applied to any type of surgery utilizing the CASS 100.

Surgery Process Display

As noted above with respect to FIGS. 1 and 5A-5C, the various components of the CASS 100 generate detailed data records during surgery. The CASS 100 can track and record various actions and activities of the surgeon during each step of the surgery and compare actual activity to the pre-operative or intraoperative surgical plan. In some embodiments, a software tool may be employed to process this data into a format where the surgery can be effectively "played-back." For example, in one embodiment, one or more GUIs may be used that depict all of the information presented on the Display 125 during surgery. This can be supplemented with graphs and images that depict the data collected by different tools. For example, a GUI that provides a visual depiction of the knee during tissue resection may provide the measured torque and displacement of the resection equipment adjacent to the visual depiction to better provide an understanding of any deviations that occurred from the planned resection area. The ability to review a playback of the surgical plan or toggle between different phases of the actual surgery vs. the surgical plan could provide benefits to the surgeon and/or surgical staff, allowing such persons to identify any deficiencies or challenging phases of a surgery so that they can be modified in future surgeries. Similarly, in academic settings, the aforementioned GUIs can be used as a teaching tool for training future surgeons and/or surgical staff. Additionally, because the data set effectively records many elements of the surgeon's activity, it may also be used for other reasons (e.g., legal or compliance reasons) as evidence of correct or incorrect performance of a particular surgical procedure.

Over time, as more and more surgical data is collected, a rich library of data may be acquired that describes surgical procedures performed for various types of anatomy (knee, shoulder, hip, etc.) by different surgeons for different patients. Moreover, information such as implant type and dimension, patient demographics, etc. can further be used to enhance the overall dataset. Once the dataset has been established, it may be used to train a machine learning model (e.g., RNN) to make predictions of how surgery will proceed based on the current state of the CASS 100.

Training of the machine learning model can be performed as follows. The overall state of the CASS 100 can be sampled over a plurality of time periods for the duration of the surgery. The machine learning model can then be trained to translate a current state at a first time period to a future state at a different time period. By analyzing the entire state of the CASS 100 rather than the individual data items, any causal effects of interactions between different components of the CASS 100 can be captured. In some embodiments, a plurality of machine learning models may be used rather than a single model. In some embodiments, the machine learning model may be trained not only with the state of the CASS 100, but also with patient data (e.g., captured from an EMR) and an identification of members of the surgical staff. This allows the model to make predictions with even greater specificity. Moreover, it allows surgeons to selectively make predictions based only on their own surgical experiences if desired.

Figure 7C:
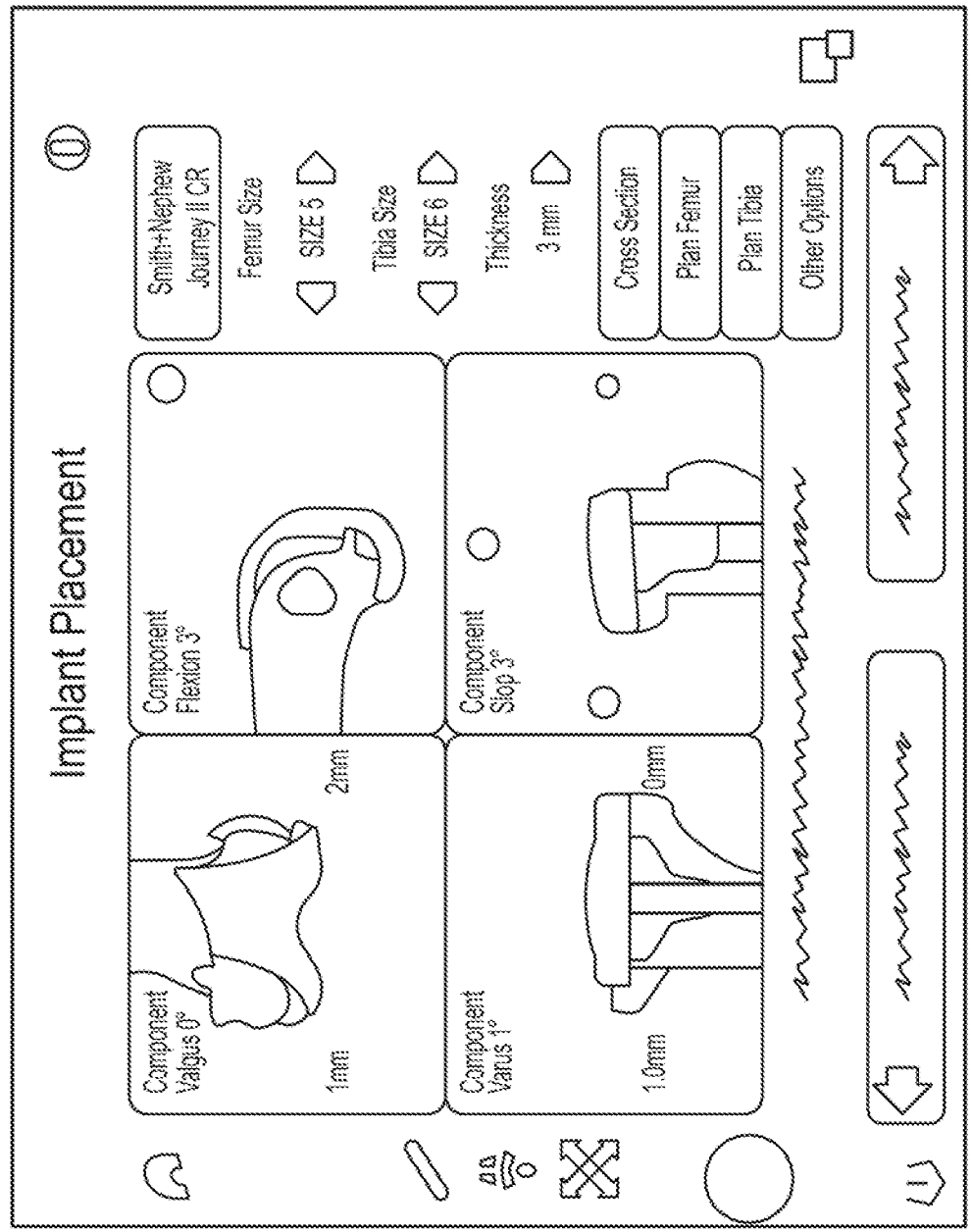
FIG. 7C depicts illustrative graphical user interfaces including images depicting an implant placement in accordance with an embodiment.
Figure 7C:
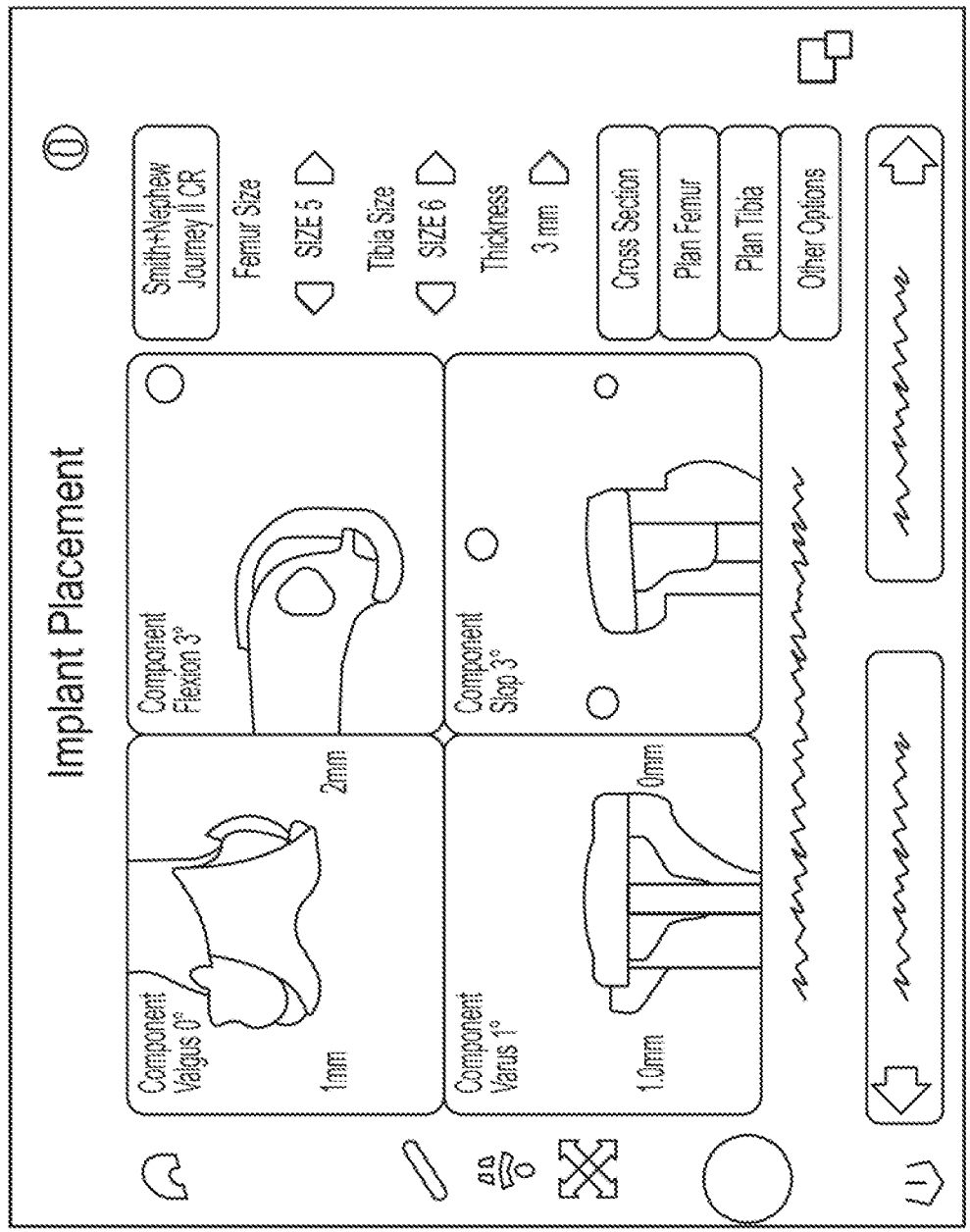
Figure 7C:
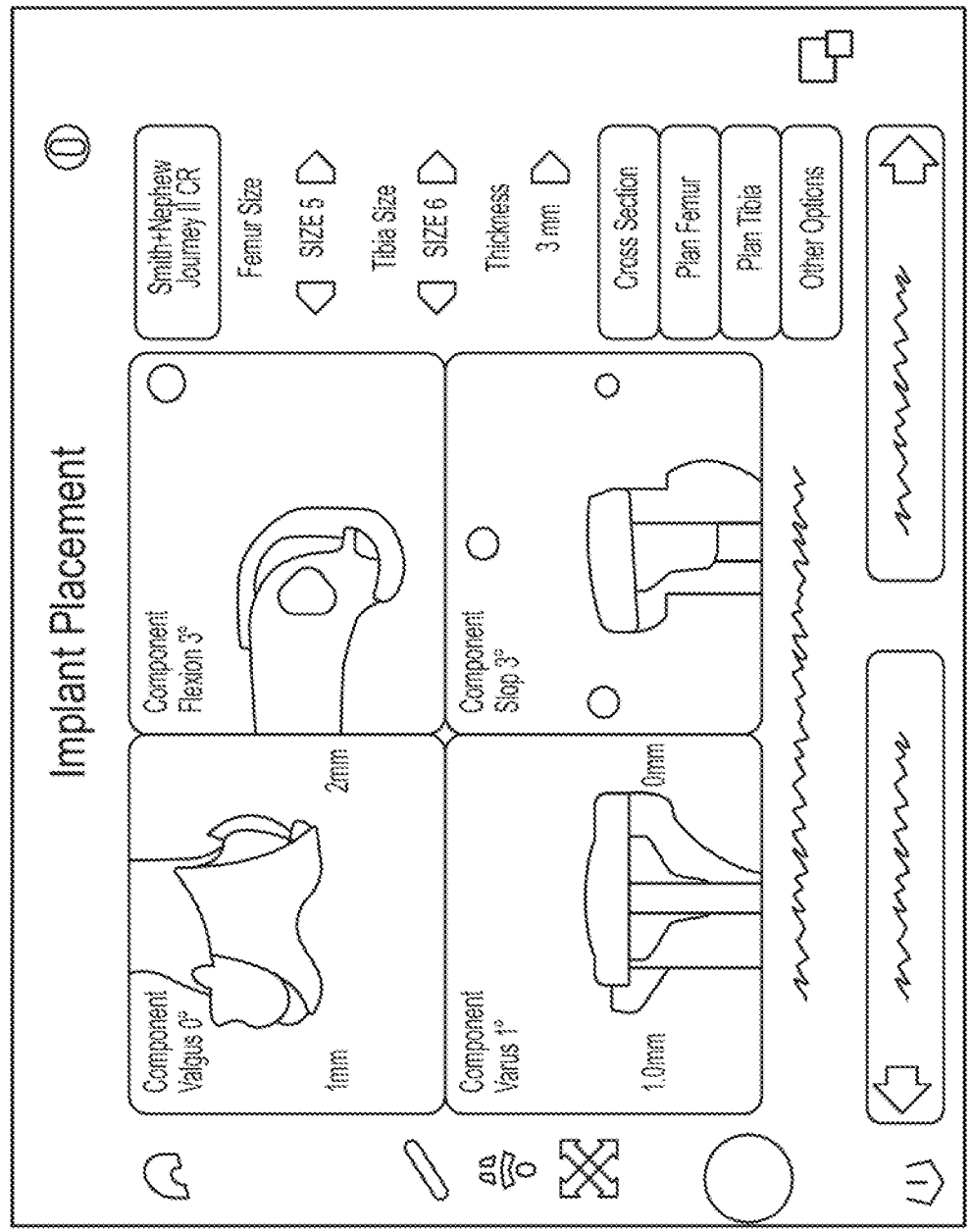

In some embodiments, predictions or recommendations made by the aforementioned machine learning models can be directly integrated into the surgical workflow. For example, in some embodiments, the Surgical Computer 150 may execute the machine learning model in the background making predictions or recommendations for upcoming actions or surgical conditions. A plurality of states can thus be predicted or recommended for each period. For example, the Surgical Computer 150 may predict or recommend the state for the next 5 minutes in 30 second increments. Using this information, the surgeon can utilize a "process display" view of the surgery that allows visualization of the future state. For example, FIG. 7C depicts a series of images that may be displayed to the surgeon depicting the implant placement interface. The surgeon can cycle through these images, for example, by entering a particular time into the display 125 of the CASS 100 or instructing the system to advance or rewind the display in a specific time increment using a tactile, oral, or other instruction. In one embodiment, the process display can be presented in the upper portion of the surgeon's field of view in the AR HMD. In some embodiments, the process display can be updated in real-time. For example, as the surgeon moves resection tools around the planned resection area, the process display can be updated so that the surgeon can see how his or her actions are affecting the other factors of the surgery.

In some embodiments, rather than simply using the current state of the CASS 100 as an input to the machine learning model, the inputs to the model may include a planned future state. For example, the surgeon may indicate that he or she is planning to make a particular bone resection of the knee joint. This indication may be entered manually into the Surgical Computer 150 or the surgeon may verbally provide the indication. The Surgical Computer 150 can then produce a film strip showing the predicted effect of the cut on the surgery. Such a film strip can depict over specific time increments how the surgery will be affected, including, for example, changes in the patient's anatomy, changes to implant position and orientation, and changes regarding surgical intervention and instrumentation, if the contemplated course of action were to be performed. A surgeon or medical professional can invoke or request this type of film strip at any point in the surgery to preview how a contemplated course of action would affect the surgical plan if the contemplated action were to be carried out.

It should be further noted that, with a sufficiently trained machine learning model and robotic CASS, various elements of the surgery can be automated such that the surgeon only needs to be minimally involved, for example, by only providing approval for various steps of the surgery. For example, robotic control using arms or other means can be gradually integrated into the surgical workflow over time with the surgeon slowly becoming less and less involved with manual interaction versus robot operation. The machine learning model in this case can learn what robotic commands are required to achieve certain states of the CASS-implemented plan. Eventually, the machine learning model may be used to produce a film strip or similar view or display that predicts and can preview the entire surgery from an initial state. For example, an initial state may be defined that includes the patient information, the surgical plan, implant characteristics, and surgeon preferences. Based on this information, the surgeon could preview an entire surgery to confirm that the CASS-recommended plan meets the surgeon's expectations and/or requirements. Moreover, because the output of the machine learning model is the state of the CASS 100 itself, commands can be derived to control the components of the CASS to achieve each predicted state. In the extreme case, the entire surgery could thus be automated based on just the initial state information.

Using the Point Probe to Acquire High-Resolution of Key Areas during Hip Surgeries Use of the point probe is described in U.S. patent application Ser. No. 14/955,742 entitled "Systems and Methods for Planning and Performing Image Free Implant Revision Surgery," the entirety of which is incorporated herein by reference. Briefly, an optically tracked point probe may be used to map the actual surface of the target bone that needs a new implant. Mapping is performed after removal of the defective or worn-out implant, as well as after removal of any diseased or otherwise unwanted bone. A plurality of points is collected on the bone surfaces by brushing or scraping the entirety of the remaining bone with the tip of the point probe. This is referred to as tracing or "painting" the bone. The collected points are used to create a three-dimensional model or surface map of the bone surfaces in the computerized planning system. The created 3D model of the remaining bone is then used as the basis for planning the procedure and necessary implant sizes. An alternative technique that uses X-rays to determine a 3D model is described in U.S. patent application Ser. No. 16/387,151, filed Apr. 17, 2019 and entitled "Three-Dimensional Selective Bone Matching" and U.S. patent application Ser. No. 16/789,930, filed Feb. 13, 2020 and entitled "Three-Dimensional Selective Bone Matching," the entirety of each of which is incorporated herein by reference.

For hip applications, the point probe painting can be used to acquire high resolution data in key areas such as the acetabular rim and acetabular fossa. This can allow a surgeon to obtain a detailed view before beginning to ream. For example, in one embodiment, the point probe may be used to identify the floor (fossa) of the acetabulum. As is well understood in the art, in hip surgeries, it is important to ensure that the floor of the acetabulum is not compromised during reaming so as to avoid destruction of the medial wall. If the medial wall were inadvertently destroyed, the surgery would require the additional step of bone grafting. With this in mind, the information from the point probe can be used to provide operating guidelines to the acetabular reamer during surgical procedures. For example, the acetabular reamer may be configured to provide haptic feedback to the surgeon when he or she reaches the floor or otherwise deviates from the surgical plan. Alternatively, the CASS 100 may automatically stop the reamer when the floor is reached or when the reamer is within a threshold distance.

As an additional safeguard, the thickness of the area between the acetabulum and the medial wall could be estimated. For example, once the acetabular rim and acetabular fossa has been painted and registered to the pre-operative 3D model, the thickness can readily be estimated by comparing the location of the surface of the acetabulum to the location of the medial wall. Using this knowledge, the CASS 100 may provide alerts or other responses in the event that any surgical activity is predicted to protrude through the acetabular wall while reaming.

The point probe may also be used to collect high resolution data of common reference points used in orienting the 3D model to the patient. For example, for pelvic plane landmarks like the ASIS and the pubic symphysis, the surgeon may use the point probe to paint the bone to represent a true pelvic plane. Given a more complete view of these landmarks, the registration software has more information to orient the 3D model.

The point probe may also be used to collect high-resolution data describing the proximal femoral reference point that could be used to increase the accuracy of implant placement. For example, the relationship between the tip of the Greater Trochanter (GT) and the center of the femoral head is commonly used as reference point to align the femoral component during hip arthroplasty. The alignment is highly dependent on proper location of the GT; thus, in some embodiments, the point probe is used to paint the GT to provide a high resolution view of the area. Similarly, in some embodiments, it may be useful to have a high-resolution view of the Lesser Trochanter (LT). For example, during hip arthroplasty, the Don Classification helps to select a stem that will maximize the ability of achieving a press-fit during surgery to prevent micromotion of femoral components post-surgery and ensure optimal bony ingrowth. As is generated understood in the art, the Dorr Classification measures the ratio between the canal width at the LT and the canal width 10 cm below the LT. The accuracy of the classification is highly dependent on the correct location of the relevant anatomy. Thus, it may be advantageous to paint the LT to provide a high-resolution view of the area.

In some embodiments, the point probe is used to paint the femoral neck to provide high-resolution data that allows the surgeon to better understand where to make the neck cut. The navigation system can then guide the surgeon as they perform the neck cut. For example, as understood in the art, the femoral neck angle is measured by placing one line down the center of the femoral shaft and a second line down the center of the femoral neck. Thus, a high-resolution view of the femoral neck (and possibly the femoral shaft as well) would provide a more accurate calculation of the femoral neck angle.

High-resolution femoral head neck data could also be used for a navigated resurfacing procedure where the software/hardware aids the surgeon in preparing the proximal femur and placing the femoral component. As is generally understood in the art, during hip resurfacing, the femoral head and neck are not removed; rather, the head is trimmed and capped with a smooth metal covering. In this case, it would be advantageous for the surgeon to paint the femoral head and cap so that an accurate assessment of their respective geometries can be understood and used to guide trimming and placement of the femoral component.

Registration of Pre-Operative Data to Patient Anatomy using the Point Probe

As noted above, in some embodiments, a 3D model is developed during the pre-operative stage based on 2D or 3D images of the anatomical area of interest. In such embodiments, registration between the 3D model and the surgical site is performed prior to the surgical procedure. The registered 3D model may be used to track and measure the patient's anatomy and surgical tools intraoperatively.

During the surgical procedure, landmarks are acquired to facilitate registration of this pre-operative 3D model to the patient's anatomy. For knee procedures, these points could comprise the femoral head center, distal femoral axis point, medial and lateral epicondyles, medial and lateral malleolus, proximal tibial mechanical axis point, and tibial A/P direction. For hip procedures these points could comprise the anterior superior iliac spine (ASIS), the pubic symphysis, points along the acetabular rim and within the hemisphere, the greater trochanter (GT), and the lesser trochanter (LT).

In a revision surgery, the surgeon may paint certain areas that contain anatomical defects to allow for better visualization and navigation of implant insertion. These defects can be identified based on analysis of the pre-operative images. For example, in one embodiment, each pre-operative image is compared to a library of images showing "healthy" anatomy (i.e., without defects). Any significant deviations between the patient's images and the healthy images can be flagged as a potential defect. Then, during surgery, the surgeon can be warned of the possible defect via a visual alert on the display 125 of the CASS 100. The surgeon can then paint the area to provide further detail regarding the potential defect to the Surgical Computer 150.

In some embodiments, the surgeon may use a non-contact method for registration of bony anatomy intra-incision. For example, in one embodiment, laser scanning is employed for registration. A laser stripe is projected over the anatomical area of interest and the height variations of the area are detected as changes in the line. Other non-contact optical methods, such as white light interferometry or ultrasound, may alternatively be used for surface height measurement or to register the anatomy. For example, ultrasound technology may be beneficial where there is soft tissue between the registration point and the bone being registered (e.g., ASIS, pubic symphysis in hip surgeries), thereby providing for a more accurate definition of anatomic planes.

Markerless Navigation System

Disclosed herein are various embodiments of surgical systems that are configured to intraoperatively register and track a patient's anatomy without the use of bone-fixed markers. The systems described herein could include endoscopic surgical systems suitable for closed surgical procedures and surgical systems suitable for open surgical procedures, such as shoulder procedures. The various embodiments described herein can be configured to obtain 3D depth data of an anatomical structure from a structured light system or a depth sensor (which could be positioned on an endoscope or otherwise positioned within the operating room), register the anatomical structure depth data with a model (e.g., a preoperative model or intraoperatively obtained three-dimensional shape information of the anatomical structure), update the surgical plan as necessary according to any changes in the pose or state of the anatomical structure, and track the anatomical structure throughout the surgical procedure. Accordingly, the systems and methods described herein use image recognition techniques (e.g., image segmentation and registration) to intraoperatively identify and track anatomical structures in during the surgical procedures, as opposed to surgical systems and methods that use markers that are rigidly affixed to the patient's bones to intraoperatively track the patient's anatomy.

Figure 8:
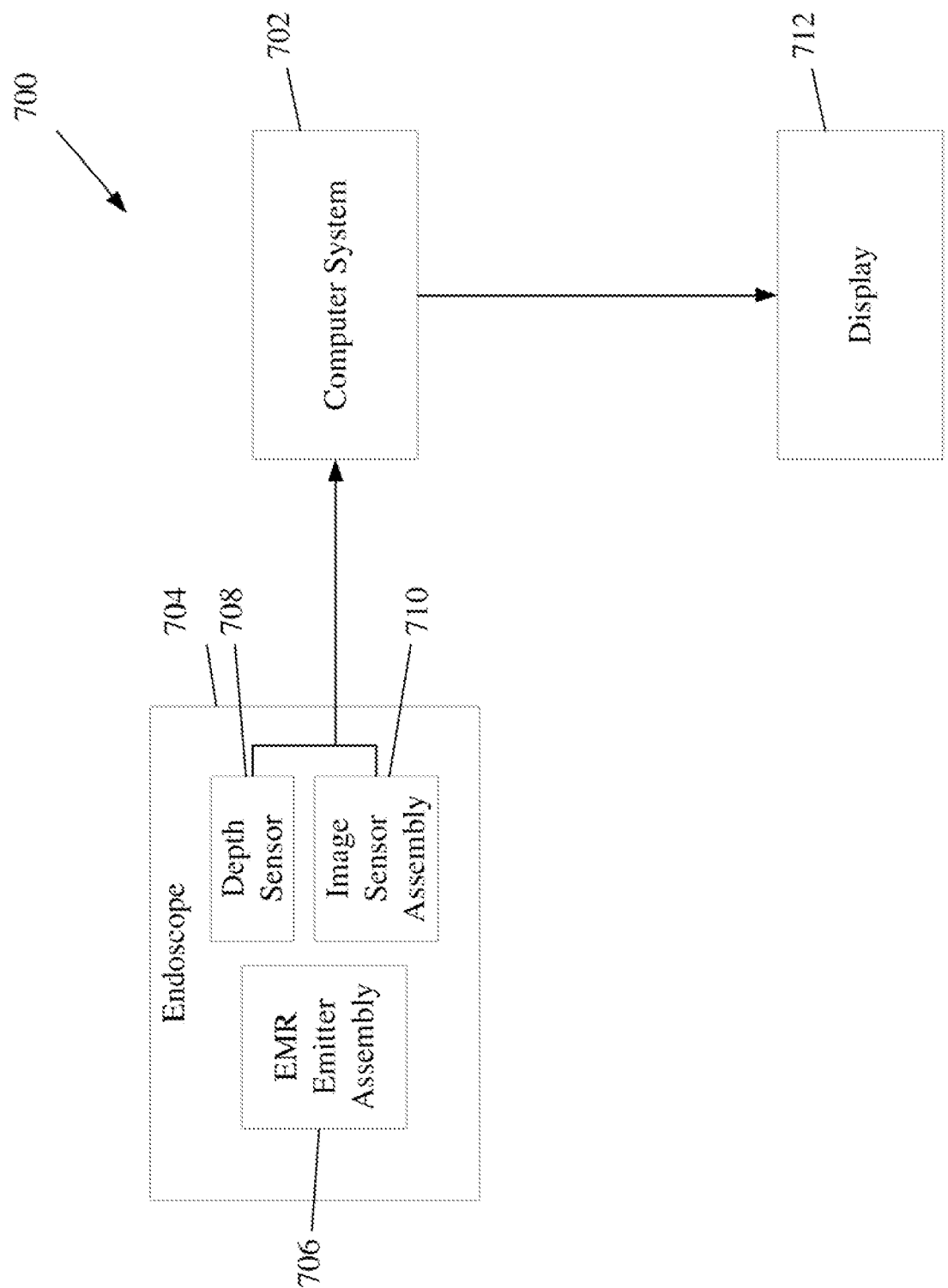
FIG. 8 depicts a markerless endoscopic visualization system in accordance with an embodiment.
Figure 9:
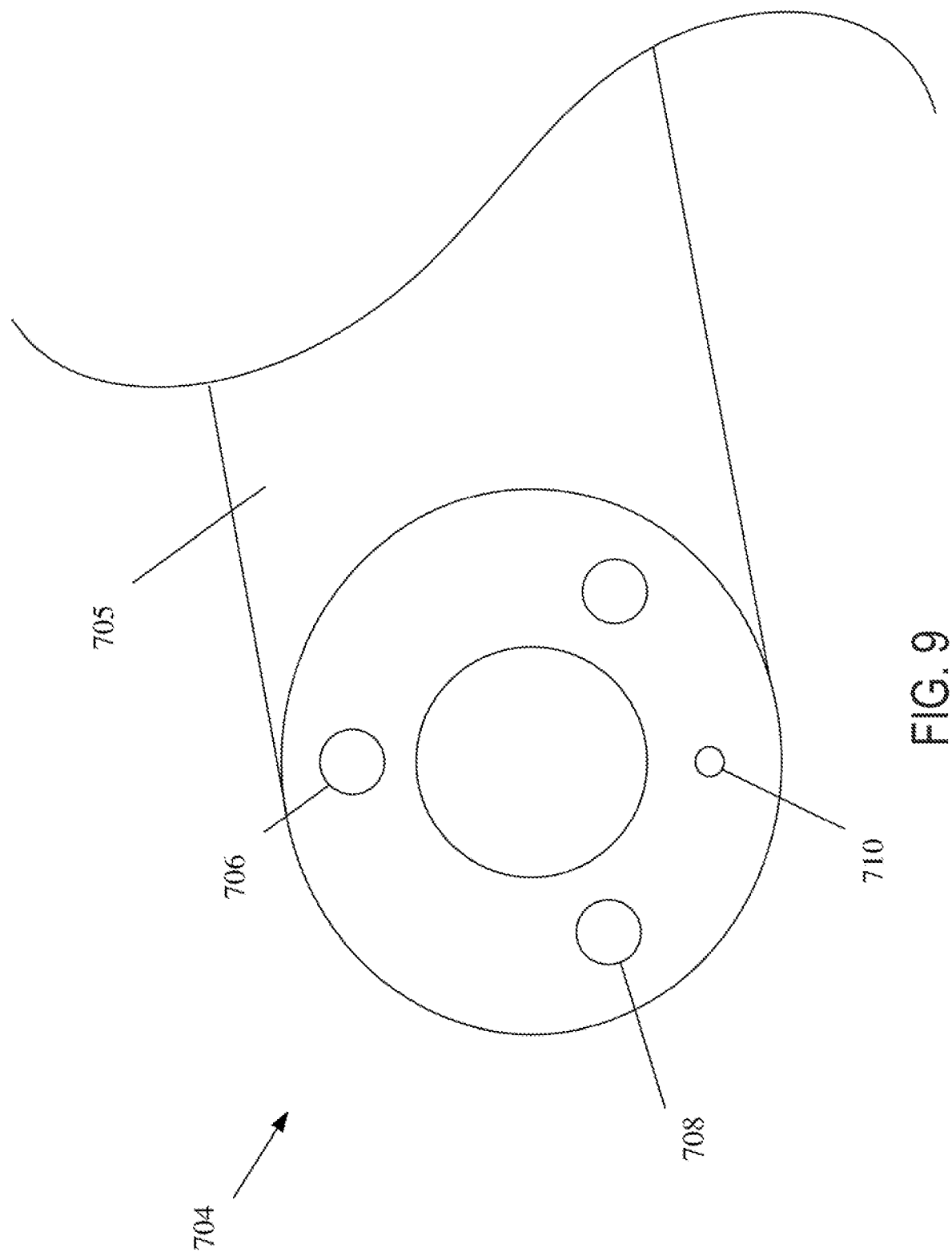
FIG. 9 depicts an endoscope of the markerless endoscopic visualization system shown in FIG. 8 in accordance with an embodiment.

Referring now to FIGS. 8 and 9, there are shown an endoscopic visualization system 700 and a distal end of an endoscope 704 thereof. The endoscopic visualization system 700 can be configured for use in a variety of different endoscopic surgical procedures, including arthroscopic procedures. The endoscopic visualization system 700 can include a computer system 702 (e.g., the surgical computer 150 shown in FIGS. 1, 5A, and 5B) that is operably coupled to an endoscope 704, and a display 712. The display 712 can be configured to display, for example, a video feed captured by the endoscope 704, 3D models of anatomical structures, and/or a surgical plan to be executed by the surgeon during the surgical procedure. In one embodiment, the endoscopic visualization system 700 can include a single endoscope 704, as depicted in FIG. 8. In another embodiment, the endoscopic visualization system 700 can include more than one endoscope 704. In this embodiment, the multiple endoscopes 704 can be used, for example, as a stereoscopic visualization system.

The endoscope 704 can include an arthroscope, a cystoscope, a nephroscope, a bronchoscope, a colonoscope, a laparoscope, or any other type of surgical scope that is configured to be inserted within a patient's body and/or used in conjunction with an endoscopic surgical procedure. The endoscope 704 can include a shaft 705 of sufficient length to access a patient's anatomy and an image sensor assembly 710 disposed at the distal end of the shaft. In one embodiment, the endoscope 704 can further include an electromagnetic radiation (EMR) emitter assembly 706. The EMR emitter assembly 706 and the image sensor assembly 710 can be embodied as, for example, a structured light system (which is described in further detail below) that can be used to generate a depth image of the surgical site. In some embodiments, the surgical system can be configured to determine or generate three-dimensional information associated with the surgical site using the structured light system, as described in further detail below. In other embodiments, the endoscope 704 can be embodied without the EMR emitter assembly 706 or the computer system can otherwise be configured to determine or generate three-dimensional information associated with the surgical site using techniques other than structured light. For example, a computer system could be configured to receive a video feed of the surgical site via the endoscope 704 and process the video feed (or images thereof) using a shape-from-shading algorithm, a shape-from-video algorithm (e.g., a shape-from-movement algorithm), and/or other image processing algorithms to obtain three-dimensional information associated with the surgical site. Many of the examples herein are described in the context of using a structured light system to obtain three-dimensional information associated with a surgical site, but this is merely for illustrative purposes and other systems, techniques, and algorithms could be used to obtain the three-dimensional surgical site information.

In one embodiment, the endoscope 704 can further include a depth sensor 708 disposed at the distal end of the shaft. The depth sensor 708 can be configured to obtain depth or distance measurements between the endoscope 704 and the surface of the surgical site. The depth sensor 708 can be used in addition to or in lieu of the structured light system to generate a depth image of the surgical site. The depth sensor 708 can include, for example, a time-of-flight sensor, a laser scanning device, and other such devices or combinations thereof. In another embodiment, the endoscope 704 can include the EMR emitter assembly 706 and the image sensor assembly 710, whereas the depth sensor 708 can be omitted.

The EMR emitter assembly 706 can be configured to generate visible light or EMR in the non-visible portion of the electromagnetic spectrum (e.g., infrared, near-infrared, or ultraviolet EMR). In one embodiment, the EMR emitter assembly 706 can include an emitter that is configured to emit EMR at a particular wavelength or within a particular wavelength band. In another embodiment, the EMR emitter assembly 706 can include a plurality of emitters that are configured to emit EMR at the same or different wavelengths or within the same, different, or overlapping wavelength bands. In one embodiment, the EMR emitter assembly 706 (or an emitter thereof) can be configured to project EMR in the form of one or multiple defined patterns as part of a structured light system for determining the surface geometry of the surgical site or an anatomical structure located at or within the surgical site. In a structured light system, the pattern or patterns projected by the EMR emitter assembly 706 can be known by the computer system 702. Accordingly, the patterns can be identified by the computer system 702 and distortions in the patterns can be used to ascertain the surface geometry of the structures on which the patterns are projected. EMR projected by the EMR emitter assembly 706 in a defined pattern for use in determining the geometry of the surface on which the EMR is projected can be referred to as "structured light," "structured EMR," "structured IR," and so on. As one illustrative embodiment, the EMR emitter assembly 706 can include a first emitter configured to emit visible light and a second emitter configured to emit structured IR for determining surface geometry of structures at the surgical site. Visible light can be defined as EMR having a wavelength from 400 to 700 nm. IR can be defined as EMR having a wavelength from 700 nm to 1 mm.

The image sensor assembly 710 can be a component of a camera disposed on or integrated into the endoscope 704. In one embodiment, the image sensor assembly 710 can include a single camera (e.g., a monocular camera) disposed on or integrated into the endoscope 702. In another embodiment, the image sensor assembly 710 can include or be part of an assembly of multiple cameras (e.g., binocular or stereo cameras) disposed or integrated into one or more endoscopes 702. The image sensor assembly 710 can be configured to generate an image (e.g., as a single image or a video feed) of the surgical site. The image sensor assembly 710 can include a charge-coupled device (CCD) or an active-pixel sensor (CMOS sensor), for example. In one embodiment, the image sensor assembly 710 could include a prism-based multi-sensor chip or camera (e.g., a three-CCD camera). The multi-sensor chip can be configured to receive and filter EMR across multiple different EMR wavelength bands (e.g., visible light and IR) to allow for simultaneous video processing in multiple different imaging modalities (e.g., in visible light and IR). As one illustrative embodiment, the image sensor assembly 710 can include a multi-sensor chip, wherein a first sensor is configured to resolve visible light for providing a video feed of the surgical site and a second sensor is configured to resolve structured IR for determining the surface geometry of the surgical site.

In various embodiments, the EMR emitter assembly 706 can be configured to project structured EMR in a variety of different patterns and using a variety of different structured light techniques. In one embodiment, the EMR emitter assembly 706 can be configured to function as a part of a single-shot structured light system. For example, the EMR emitter assembly 706 can be configured to project a continuous varying pattern, a stripe-indexed pattern, or a grid-indexed pattern of EMR that can be resolved by the image sensor assembly 710. In another embodiment, the EMR emitter assembly 706 can be configured to function as part of a multi-shot structured light system. For example, the EMR emitter assembly 706 can be configured to project a sequential set of patterns, such as a binary-coded pattern, a gray-coded pattern, or a phase-shifted pattern of EMR that can be resolved by the image sensor assembly 710. Embodiments of the endoscopic visualization system 700 using a multi-shot structured light system can be particularly beneficial. In particular, single-shot structured light systems may require the use of multiple image sensor assemblies 710 that are positioned or oriented differently to successfully obtain the surface geometry of the surgical site at the desired spatial resolution. This can be difficult under endoscopic conditions because this requires that the image sensor assemblies 710 either all be disposed on a single endoscope 704 (which is difficult due to space constraints inherent to endoscopic systems) or multiple separate endoscopes be used (which would in turn require that the surgical staff make additional incisions, take additional steps to insert the additional endoscopes, juggle additional devices during the surgical procedure, and so on). Accordingly, some or all of these issues with single-shot structured light systems can be addressed by using a multi-shot structured light system.

Accordingly, the endoscope 704 can be configured to obtain both images/video and depth information of a surgical site. The images/video can be provided to a surgeon (e.g., via the display 712) for intraoperatively visualizing the surgical site, and the depth information can be used to register and track anatomical structures at the surgical site without the need to use markers that are affixed to the patient's bone(s) and tracked by a tracking system 115 (FIGS. 1, 5A, and 5B). The depth images can be generated by the computer system 702 coupled to the endoscope 704 via a structured light system (i.e., an EMR emitter assembly 706 configured to emit structured EMR and an image sensor configured to resolve the structured EMR), a depth sensor 708, or a combination thereof.

The display 712 can include a display screen located within the sterile or non-sterile portions of the operating theater, a virtual reality HMD, or an AR HMD, for example. The display 712 can be configured to simultaneously or separately display a video feed obtained by the endoscope 704, data associated with the surgical procedure (e.g., elapsed time or implant/anatomical structure data as shown in FIG. 7C), and/or models of the anatomical structure. For example, the display 712 could display a preoperative model of an anatomical structure registered to the patient's anatomy overlaid on a video feed of the surgical site.

Figure 10:
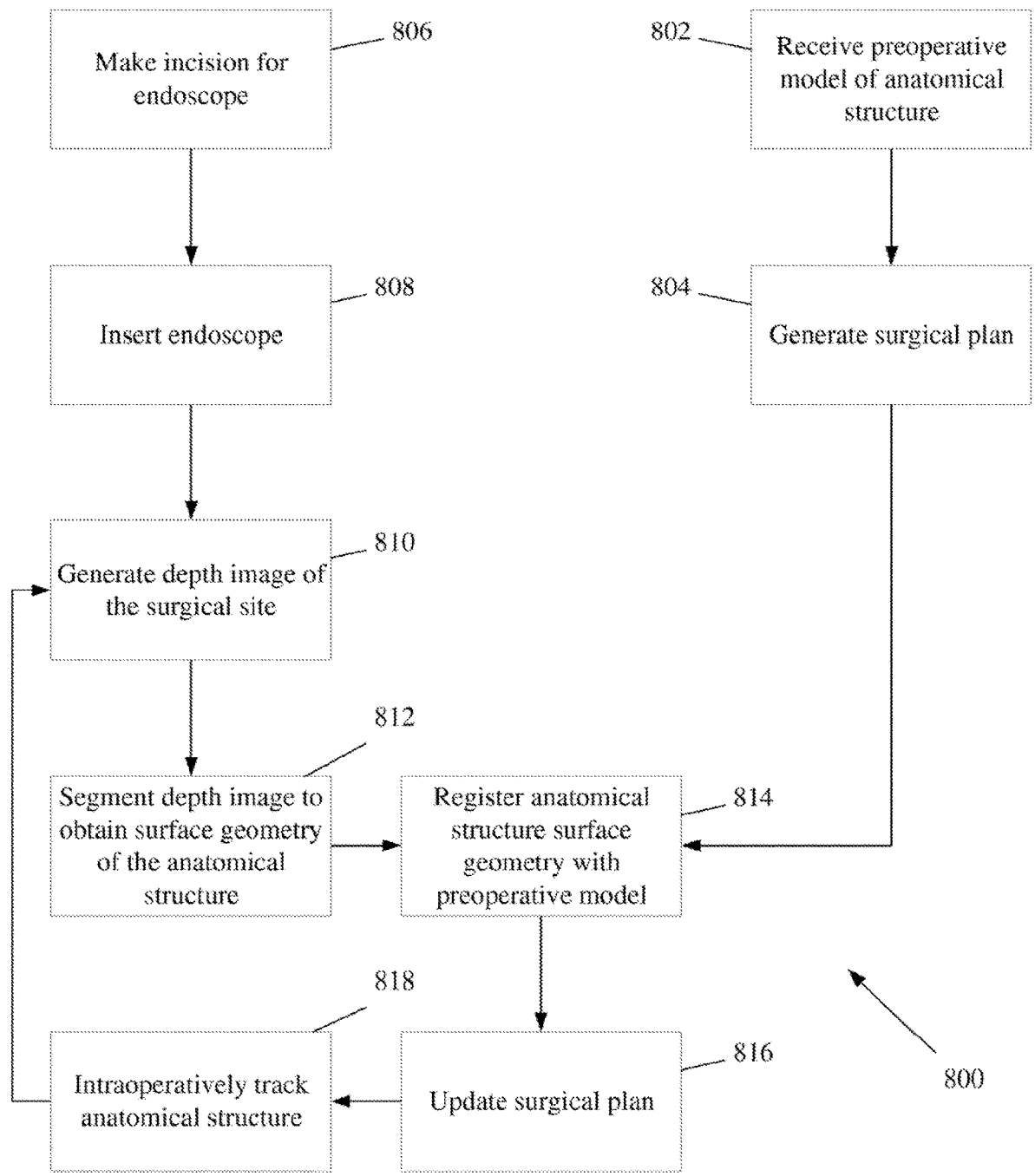
FIG. 10 depicts a flow diagram of a process for performing an endoscopic surgical procedure in accordance with an embodiment.

The endoscopic visualization system 700 can be used to intraoperatively register and track the position of an anatomical structure during an endoscopic surgical procedure based, at least in part, on depth image data obtained by a structured light system or the depth sensor 708. This is highly advantageous because, as noted above, placing and tracking markers within a surgical site during an endoscopic procedure can be difficult and reduces the already minimal amount of joint space within which the surgeon must operate. For example, FIG. 10 depicts a process 800 of performing an endoscopic surgical procedure using a surgical system including a depth-sensing endoscope, such as the endoscopic visualization system 700 described above. In the following description of the process 800, it should be understood that some of the described steps can be executed by a computer system, such as the computer system 702 illustrated in FIG. 8 and/or the surgical computer illustrated in FIGS. 1, 5A, and 5B. The steps executed by the computer system can be embodied as software, hardware, firmware, or combinations thereof. In one embodiment, the steps executed by the computer system can be embodied as instructions stored in a memory of the computer system that, when executed by a processor coupled to the memory, cause the computer system to perform the one or more steps of the process 800.

Accordingly, in one embodiment, a computer system can receive 802 a preoperative model of an anatomical structure that is the subject of the surgical procedure and generate 804 a surgical plan based on the received preoperative model. The preoperative model of the anatomical structure can be received from preoperative medical image data (e.g., sliced CT or MRI images). In another embodiment, in lieu of or in addition to receiving 802 a preoperative model of the anatomical structure, the process 800 could include intraoperatively generating a model of the anatomical structure or otherwise intraoperatively determining three-dimensional shape information (e.g., an anatomy map) associated with the anatomical structure. For example, the process could include generating an intraoperative model of the anatomical structure. In various embodiments, the intraoperative model could be generated using simultaneous localization and mapping (SLAM) and other such techniques. The three-dimensional shape information could be determined during the course of the surgical procedure based on any relevant three-dimensional shape or geometry information obtained during the course of the surgical procedure. In yet another embodiment, the process 800 could include augmenting any intraoperatively determined three-dimensional shape information associated with the anatomical structure with additional information received or determined from a preoperative model of the anatomical structure. Accordingly, the process 800 can be configured to generate the surgical plan based on preoperative or intraoperative shape or geometry information associated with the anatomical structure. Further, the generated surgical plan can be based on the type of surgical procedure being performed and the type of anatomical structure being visualized and/or modeled. The generated surgical plan can include one or more surgical tasks or steps that are to be performed by a surgeon during the course of a surgical procedure. In various embodiments, the generated surgical plan can include, for example, an anchor location for a rotator cuff repair procedure, a location and an orientation for a tibial bone tunnel for an ACL reconstruction procedure, tibial and/or femoral resurfacing geometries for a TKA procedure, or femoral and/or acetabular resurfacing geometries for a femoroacetabular impingement (FAI) procedure. The aforementioned steps can be performed by the computer system preoperatively or intraoperatively (i.e., prior to, before, or after the steps performed by the surgeon described below).

Figure 11:
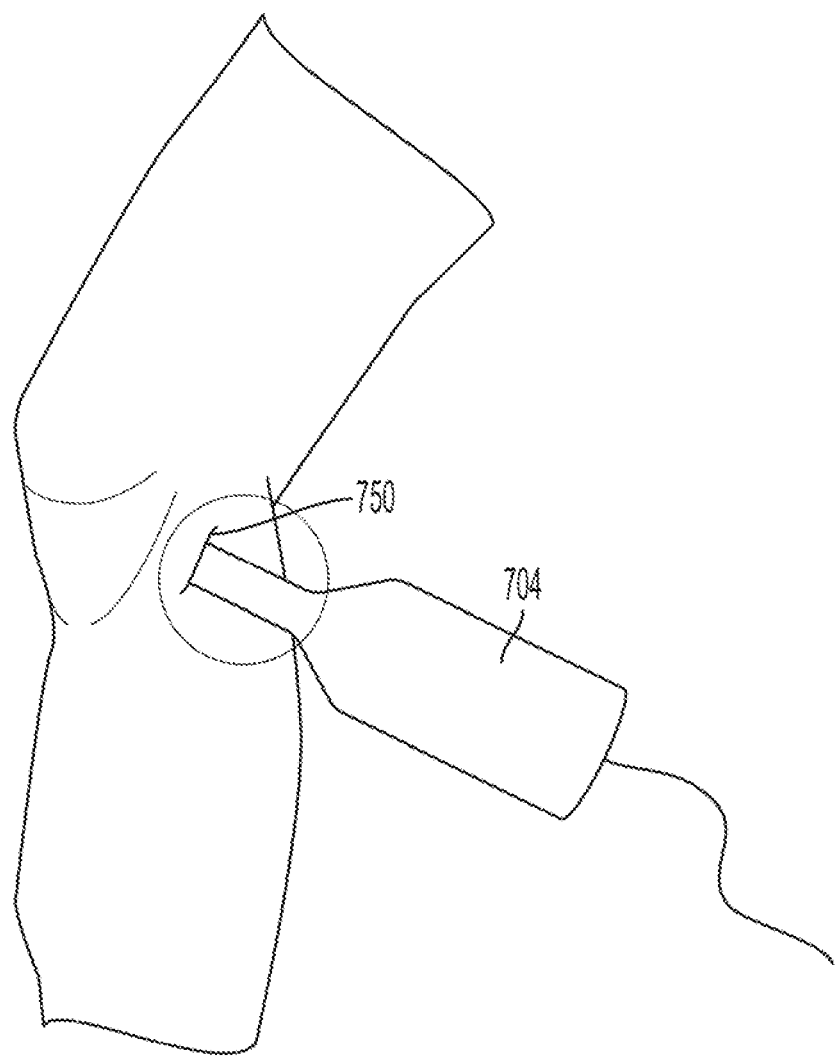
FIG. 11 depicts the endoscope of FIG. 9 in use during an endoscopic surgical procedure in accordance with an embodiment.

Accordingly, a surgeon can initiate the surgical procedure by making 806 an incision 750 in the patient's anatomy external to the surgical site (e.g., at or adjacent to the patient's knee for a TKA procedure) and inserting 808 an endoscope through the incision, as shown in FIG. 11. In some implementations, the endoscope can be inserted through a cannula and/or portal to access the surgical site. Depending upon the type of surgical procedure being performed and the surgeon's approach, the surgeon can make additional incisions for providing access to the surgical site for other surgical instruments or access the surgical site via the same incision 750.

Figure 12:
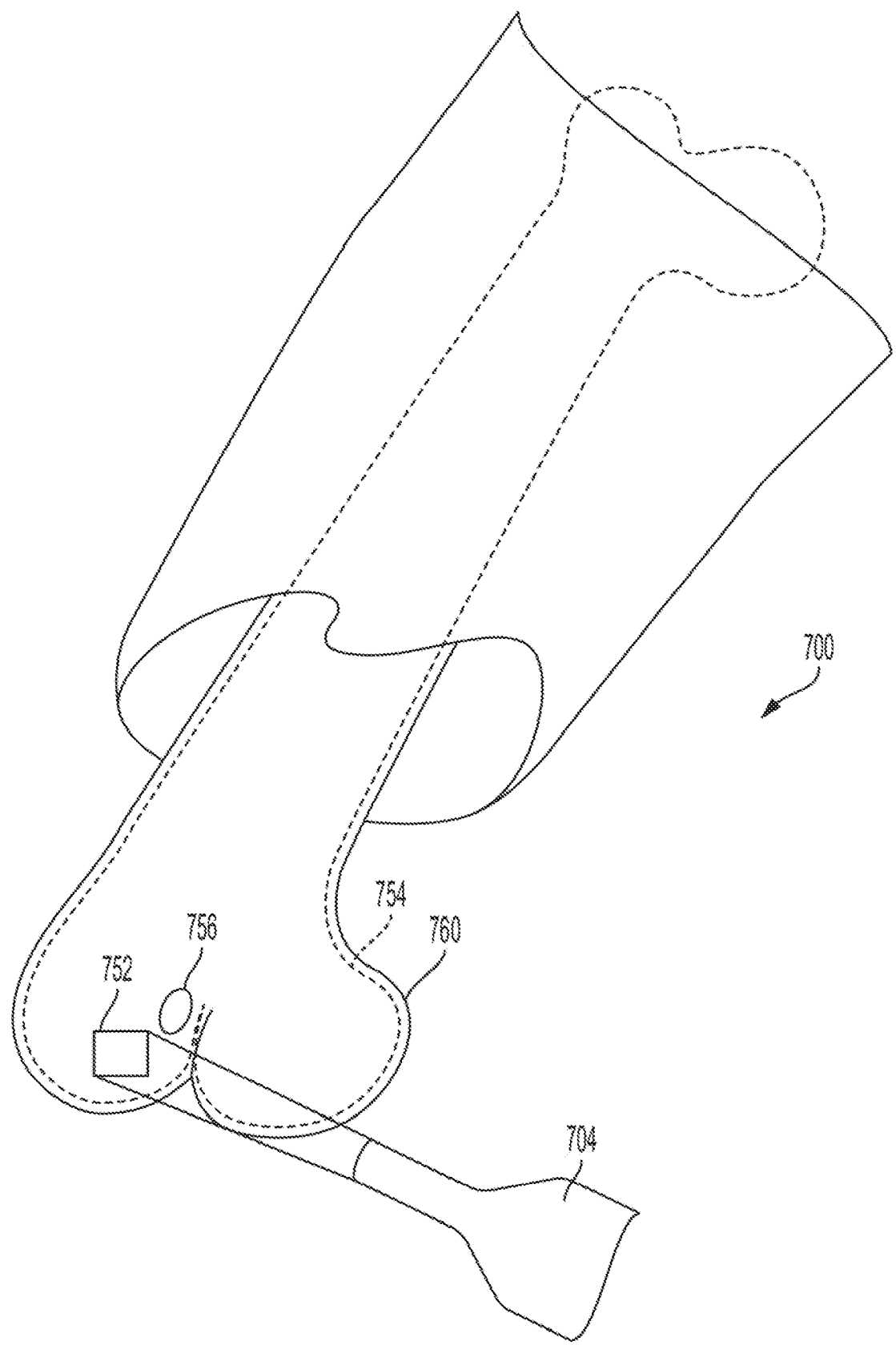
FIG. 12 depicts a diagram of a registered visualization of an anatomical structure relative to a model of the anatomical structure in accordance with an embodiment.

Once the endoscope has accessed the surgical site, the computer system coupled to the endoscope can generate 810 a depth image of the surgical site. In one embodiment, the computer system can generate 810 the depth image by processing an image or video feed (e.g., received from the image sensor assembly 710) of the surgical site on which a structure light pattern or set of patterns has been projected (e.g., by the EMR emitter assembly 706) to determine the surface geometry or three-dimensional shape of the surgical site. In another embodiment, the computer system can generate 810 the depth image based on distance or depth data from the depth sensor 708. If an anatomical structure (e.g., a femur 760) is within the field of view 752 of the depth sensor 708, as shown in FIG. 12, the depth image received by the computer system can include the anatomical structure or a portion thereof. Accordingly, the computer system can segment 812 the depth image to obtain a surface geometry of the anatomical structure and register 814 the surface geometry with the received model 754 of the anatomical structure, as shown in FIG. 12. In various embodiments, the model 754 can include a preoperative model received by the computer system or a model generated intraoperatively by the computer system. In various embodiments, the computer system can segment 812 the depth image to obtain the anatomical structure surface geometry using a variety of different image segmentation techniques, either alone or in combination with each other. For example, the computer system could segment 812 the depth image using, at least in part, a Canny edge detector algorithm. As another example, the computer system could segment 812 the depth image using, at least in part, a neural network that has been trained to segment a depth image of one or more types of anatomical structures. In one illustrative implementation, a neural network could be trained on a training data set including images of cadaver femoral surfaces to segment a femoral surface from a received depth image. The trained neural network can thus be configured to segment intraoperatively received depth images to obtain the surface geometry of the anatomical structure located therein. Techniques for training such neural networks are disclosed in Liu, H., & Baena, F. R. Y. (2020), "Automatic Markerless Registration and Tracking of the Bone for Computer-Assisted Orthopaedic Surgery," IEEE Access, 8, 42010-42020, which is hereby incorporated by reference herein. In various embodiments, the computer system can register 814 the anatomical structure surface geometry obtained from the depth sensor 708 with the model (e.g., a preoperative model or intraoperative shape information associated with the anatomical structure) using an iterative closest point (ICP) algorithm or a data aligned rigidity constrained exhaustive search (DARCES), for example.

Accordingly, the computer system can update 816 the generated surgical plan based on any changes in the pose or configuration of the anatomical structure from the model associated with the anatomical structure. For example, the computer system could update an anchor location in a rotator cuff repair procedure from a first position to a second position. As another example, the computer system could update a tibial resection geometry from a first configuration to a second configuration. As yet another example, the computer system could update an ACL tunnel location 756 (FIG. 12) in an ACL reconstruction procedure from a first location to a second location.

The computer system can intraoperatively track 818 the anatomical structure by continuously or periodically generating 810 a depth image of the anatomical structure, segmenting 812 the depth image, registering 814 the segmented anatomical structure surface geometry with the preoperative model or intraoperative shape information associated with the anatomical structure, and updating 816 the surgical plan accordingly. In various embodiments, the computer system can further display the updated surgical plan, registered anatomical structure surface geometry, the segmented depth image, and/or other images or data to the user (e.g., via a display screen 712). In one embodiment, the computer system and/or depth sensor 708 can be configured to obtain a depth image of the surgical site at a defined rate or frequency, such as at 5-6 Hz. This defined rate or frequency can be suitable for intraoperatively tracking an anatomical structure that is the subject of a surgical procedure.

Figure 13:
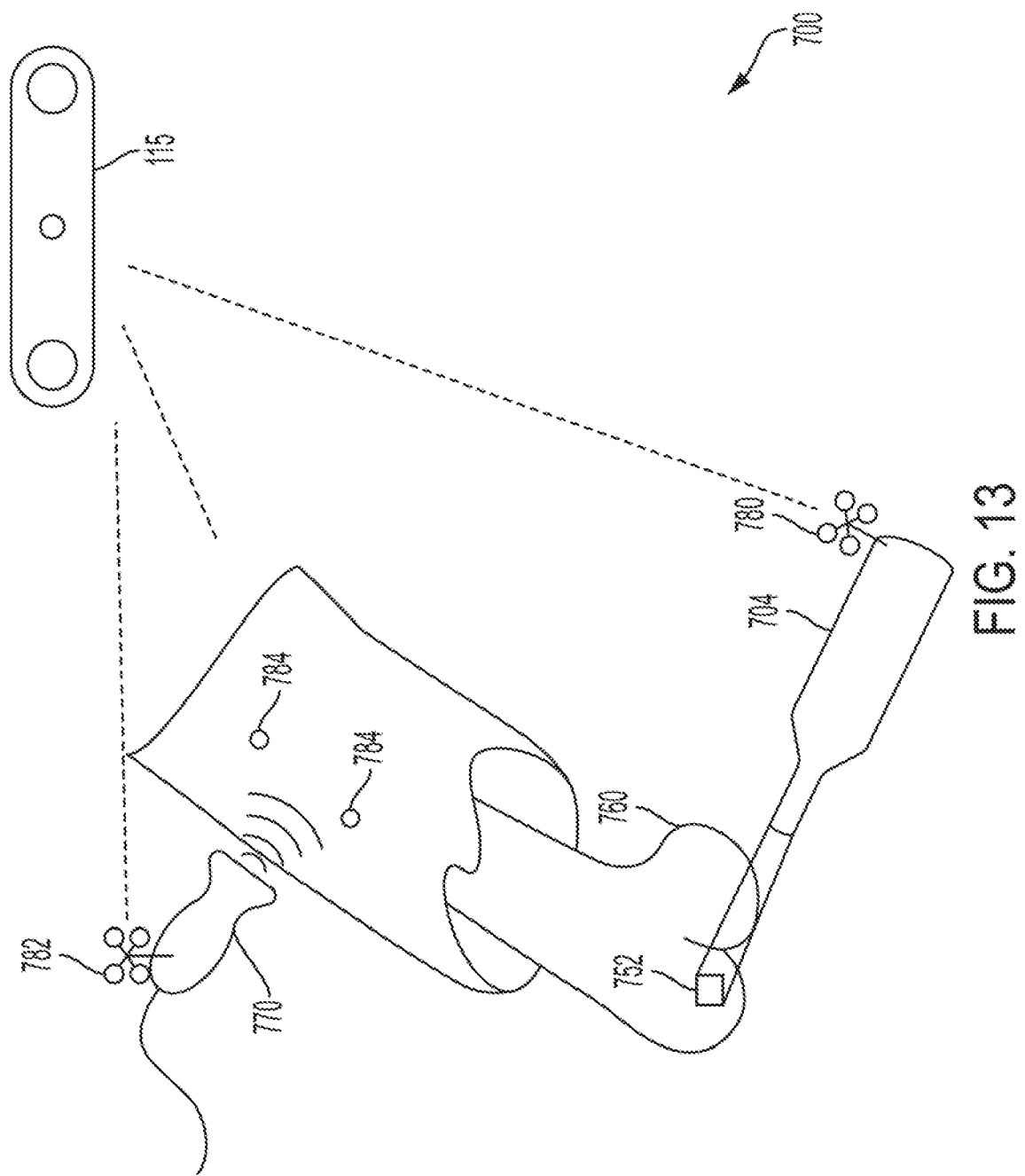
FIG. 13 depicts an endoscopic visualization system comprising tracked surgical instruments in accordance with an embodiment.

Referring now to FIG. 13, the endoscopic visualization system 700 can further use various tracking systems and/or devices for supplementing and/or assisting the vision-based endoscopic tracking systems described above. For example, the endoscopic visualization system 700 can track the pose of the endoscope 704 using a variety of different navigation technologies (or combinations thereof), including optical/IR tracking, electromagnetic tracking, inertial measurement units associated with the endoscope, video-based tracking, and/or fiber optic tracking. In one embodiment, a marker array 780 (e.g., an optical or IR tracking array) that is capable of being detected by a tracking system 115 (e.g., as described above in connection with FIGS. 5A and 5B) can be affixed to the endoscope 704. The tracking system 115 can be operably coupled to a computer system 702. By detecting and tracking the marker array 780 via the tracking system 115, the computer system 702 can be configured to determine the pose of the endoscope 704. By tracking the pose of the endoscope 704, the computer system 702 can define the pose of the endoscope relative to the patient, which can in turn aid the computer system in registering the received depth images with the models of the anatomical structures by allowing the computer system to match the pose of the anatomical structure model with the pose of the received depth images.

In some embodiments, the endoscopic visualization system 700 can additionally use one or more detection devices, other than an endoscope 704, for visualizing or obtaining data associated with the patient's anatomy, such as an ultrasound probe 770. These detection devices can each include a marker array 782 affixed thereto that is capable of being detected by a tracking system 115 for determining the poses of the devices, as described above. Further, in some embodiments, the endoscopic visualization system 700 can use markers 784 that can be affixed to the patient (e.g., bone-mounted or percutaneous markers or skin-based adhesive markers) that are capable of being detected by a tracking system 115 for determining the pose of the patient's anatomy. As in the other embodiments noted above, the tracking system 115 in these embodiments can likewise be operably coupled to the computer system 702. Accordingly, the patient anatomy pose data obtained via the detection devices and/or the patient-affixed markers 784 through the tracking system 115 can aid the computer system 702 in registering the received depth images with the models of the anatomical structures. In particular, a detection device (e.g., an ultrasound probe 770) that is operated outside of the surgical site (in the case of an arthroscopic procedure, outside of the joint space) can be used to locate key anatomical landmarks, which can be used by the computer system 702 to register the pose of the patient's anatomy. This would allow for additional tracking of instruments such as saws, drills, and burring instruments with respect to the patient's anatomy.

In one embodiment, the endoscopic visualization system 700 can be embodied as a robotic surgical system. In this embodiment, the endoscope 704 can be held, positioned, and/or controlled by the robotic arm 105A of a robotic surgical system, such as is shown in FIGS. 1, 5A, and 5B. In this embodiment, the pose of the endoscope 704 could be provided by the robotic arm 105A, which can be operably coupled to the computer system 702. As discussed above in the context of other embodiments, the computer system 702 can define the pose of the endoscope relative to the patient to aid in registering the received depth images with the models of the anatomical structures.

As noted above, the confined space of the surgical site in an endoscopic procedure is generally viewed as a negative or a challenge that endoscopic visualization systems must overcome. However, because an endoscope conventionally provides the only source of light within the surgical site during an endoscopic procedure, the confined spatial dimensions of the surgical site can be beneficial. For example, the visual characteristics of the surgical site are more easily predicted in an endoscopic procedure than in open procedures with several light sources that are each positioned differently. Accordingly, an endoscopic visualization system can be configured to leverage the predictability of the visual characteristics of the surgical site to precisely identify the locations of various landmarks, such as anatomical structures or surgical tools, by matching simulated visual characteristics with the actual, visualized visual characteristics of the surgical site.

Figure 14:
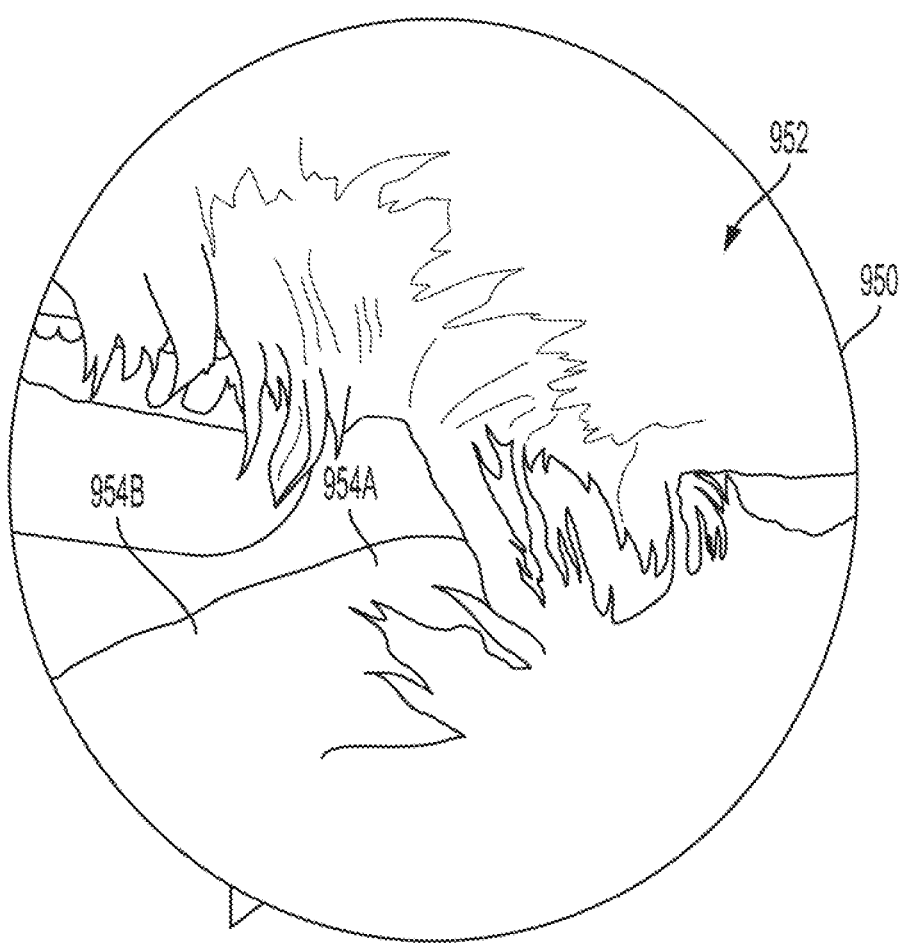
FIG. 14 depicts an illustrative field of view of an endoscope visualizing a surgical site in accordance with an embodiment.

FIG. 14 depicts an illustrative field of view 950 of an endoscope (e.g., the endoscope 704) visualizing a surgical site 952 in accordance with an embodiment. In this illustrative embodiment, the surgical site 952 can include a knee joint that is being visualized during an arthroscopic knee procedure. As will be discussed in greater detail below, the surgeon can define or select one or more landmarks for which visual characteristics can be intraoperatively compared (e.g., by the computer system 702) to predicted visual characteristics of those one or more landmarks. Based on the results of the comparison between the actual and predicted visual characteristics, the positions of the landmarks can be more precisely determined (e.g., by the computer system 702) than with conventional endoscopic visualization systems. The visual characteristics can include, for example, the shadows and/or shading of the landmarks. In this illustrative example, the surgeon can define a first landmark 954A and a second landmark 954B on the tibia that the surgeon wants the endoscopic visualization system 700 to track. However, in other embodiments, a single landmark or more than two landmarks can be defined or selected by the surgeon, without limitation. Further, the techniques described below can be used in addition to or in lieu of a depth-sensing endoscope 704 and the associated techniques described above for registering and tracking a three-dimensional geometry of the surgical site 952.

Figure 15:
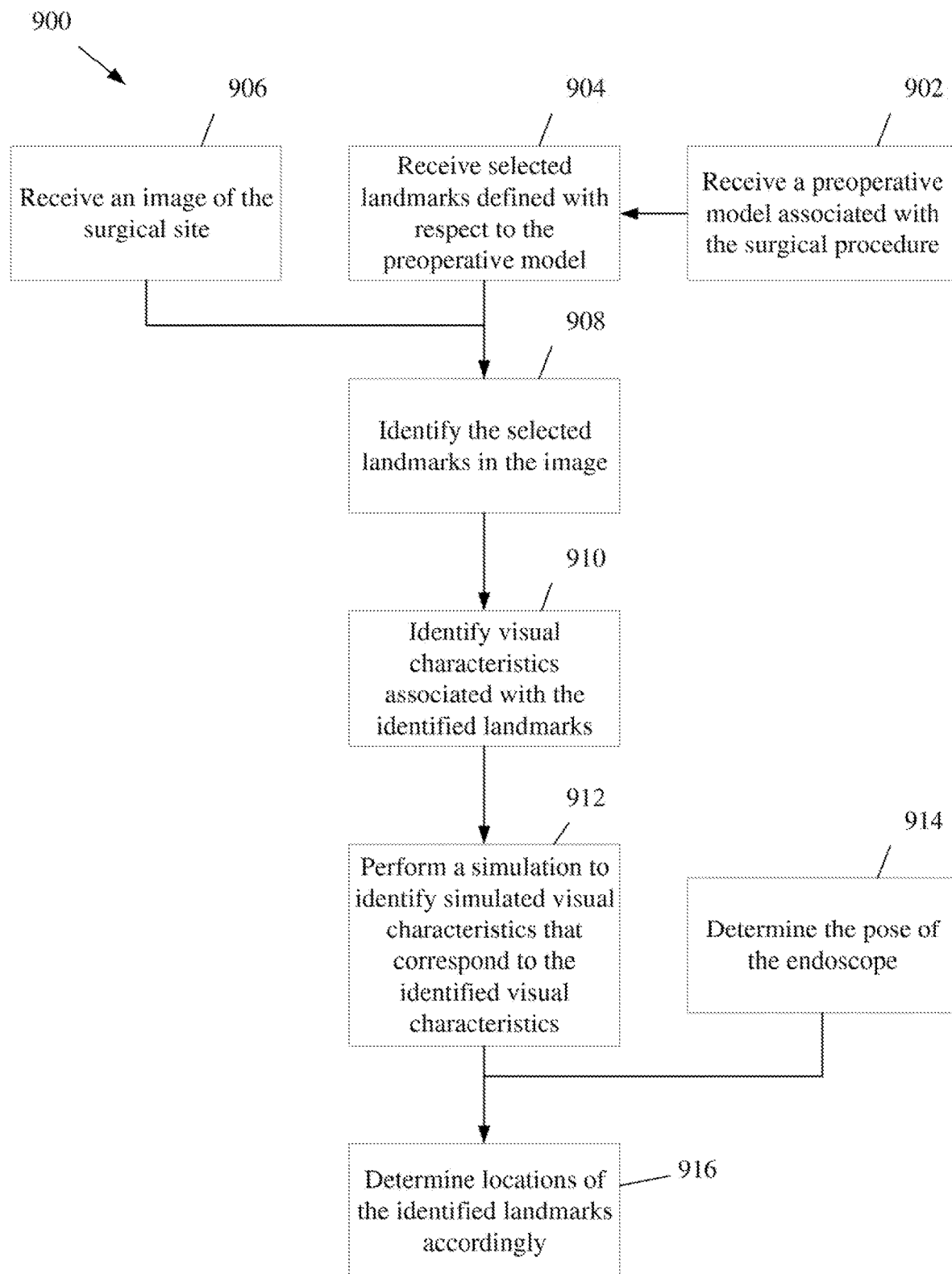
FIG. 15 depicts a flow diagram of a process for intraoperatively identifying locations of landmarks using an endoscopic visualization system in accordance with an embodiment.

In some embodiments, processes can be used to leverage the relative predictability of the intraoperative visual characteristics of a surgical site in an endoscopic surgical procedure. For example, FIG. 15 depicts a process 900 for intraoperatively identifying locations of landmarks using an endoscopic visualization system, such as the endoscopic visualization system 700 described above. In the following description of the process 900, it should be understood that some of the described steps can be executed by a computer system, such as the computer system 702 illustrated in FIG. 8 and/or the surgical computer 150 illustrated in FIGS. 1, 5A, and 5B. The steps executed by the computer system can be embodied as software, hardware, firmware, or combinations thereof. In one embodiment, the steps executed by the computer system can be embodied as instructions stored in a memory of the computer system that, when executed by a processor coupled to the memory, cause the computer system to perform the one or more steps of the process 900.

Accordingly, a computer system can receive 902 a preoperative model associated with the surgical procedure. The preoperative model could include, for example and without limitation, a CAD model or any other three-dimensional model. The preoperative model could be received from a variety of different sources or generated using a variety of different processes. In various embodiments, the preoperative model could be, for example and without limitation, generated by a surgeon as part of the surgical planning processes, generated from a preoperative image of a patient's anatomy (e.g., an X-ray image), or retrieved from a database. In one illustrative embodiment, the preoperative model could be generated from a CT scan or a combination of a series of 2D images (e.g., MRI images). Further, the preoperative model could represent a number of different objects or structures associated with a surgical procedure. For example, the preoperative model could be, for example and without limitation, an anatomical structure (e.g., as shown in FIG. 14), a surgical site including one or more anatomical structures, or a surgical tool or a portion thereof (e.g., an endoscope). In one embodiment, the received 902 preoperative model could include color, shading, and/or texture based on the tissue and/or ligament properties of an anatomical structure represented by the preoperative model. In another embodiment, the computer system can be configured to apply color, shading, and/or texture to the received 902 preoperative model based on the tissue and/or ligament properties of an anatomical structure represented by the preoperative model. In one illustrative embodiment, the tissue and/or ligament properties could be determined by the computer system based on a statistical atlas or by a machine learning model trained to apply the color, shading, and/or texture to the anatomical structure models based on the type of anatomical structure represented by the model. In various embodiments, in addition to or in lieu of receiving 902 a preoperative model of the anatomical structure, the process 900 could include intraoperatively generating a model of the anatomical structure using, for example, the techniques described above.

Accordingly, the computer system can receive 904 one or more selected landmarks that are defined with respect to the model. The selected landmarks could include, for example and without limitation, an anatomical landmark or a portion or component of a surgical tool. In one embodiment, the selected landmarks can include landmarks associated with the rigid anatomy of the patient (e.g., the medial or lateral condyles of the tibia). In another embodiment, the selected landmarks can include surgical points of interest on the anatomy (e.g., ligament attachment points). In another embodiment, the selected landmarks can include any arbitrary position on the model that is selected by the surgeon. For example, the surgeon could elect geometric features on the model that could or are expected to cast unique shadows that would assist in intraoperatively registering the object represented by the model. In another embodiment, the computer system can be configured to avoid using particular regions or locations on the model that are predefined (e.g., in a database coupled to the computer system) as not being desirable landmarks. For example, the avoided regions or locations could include regions that are predefined as including or being adjacent to soft tissue elements that could interfere with the machine vision-based tracking techniques described herein. In one embodiment, the landmarks could be automatically identified by the computer system on the model based on the type of object represented by the model. In some embodiments, the computer system could be configured to provide the user with a list of the pre-identified landmarks. In some embodiments, the computer system could be configured to allow the user to select which landmarks he or she wished to use in the surgical procedure from the pre-identified landmarks. In one illustrative embodiment, the model could include an upper extremity of a tibia, and the selected landmarks could include the medial and lateral condyles of the tibia. In another illustrative embodiment, the model could include an endoscopic surgical instrument (e.g., an endoscopic blade) and the selected landmarks could include the distal end of the surgical instrument.

In one embodiment, the computer system may include or be communicably coupled to a user interface (e.g., a GUI provided by the display 712 described in connection with FIG. 8 or the display 125 described above in connection with FIGS. 5A and 5B) that is configured to allow the surgeon to define or select the landmarks on the model. In various embodiments, the landmarks could be, for example and without limitation, generated by a surgeon as part of the surgical planning processes, automatically determined by the computer system (e.g., using object recognition techniques to automatically identify the landmarks from a preoperative image), or retrieved from a database. In one illustrative embodiment, the computer system may include a touchscreen providing a GUI that displays the model and allows the surgeon to select the landmarks on the displayed model. In another illustrative embodiment, the computer system may be communicably coupled to a virtual reality or AR HMD that displays the model and an input device (e.g., a stylus or gloves configured to interact with the HMD) that allows the surgeon to selected the landmarks on the displayed model. In another illustrative embodiment, the landmarks can be predefined or otherwise pre-associated with the model. For example, in embodiments where a preoperative model is retrieved from a database, a particular set of predefined landmarks can be stored in association with the preoperative model.

Accordingly, the computer system can receive 906 an image of the surgical site (e.g., from the endoscope 704 described in connection with FIGS. 8 and 9). The image can be received 906 intraoperatively, for example. In various embodiments, the image can be received 906 as either a discrete image or as part of a video feed. An illustrative example of a received 906 image is shown in FIG. 14 and described above. In one embodiment, the computer system can be further configured to adjust the received 906 image according to the optical angle of refraction of any substances at the surgical site. As an illustrative example, the computer system could be configured to determine that an arthroscopic knee procedure was being performed and adjust the received 906 image according to the optical angle of refraction of saline (which is conventionally pumped in the knee during such procedures). Therefore, the computer system can compensate for differences between the optical angles of refraction at which different images of the surgical site are captured.

Accordingly, the computer system can identify 908 the selected landmarks in the image. In one embodiment, the computer system can identify 908 the selected landmarks using object recognition techniques, including edge detection algorithms (e.g., a Canny edge detection algorithm), edge matching algorithms, gradient matching algorithms, scale-invariant feature transformation algorithms, other object recognition algorithms or models, or combinations thereof. In an alternative embodiment, the surgeon can intraoperatively place optical trackers on the selected landmarks and the computer system can identify 908 the selected landmarks by identifying the optical trackers.

Accordingly, the computer system can identify 910 visual characteristics associated with the identified 908 landmarks in the received 906 image. As above, the computer system can identify 910 the visual characteristics using a variety of different object recognition techniques or combinations thereof. In one embodiment, the identified 910 visual characteristics can include shadows cast by the identified 908 landmarks or characteristics associated with the shadows cast by the identified 908 landmarks, including the lengths of the shadows, shading patterns in the received 906 image, brightness or color gradients in the received 906 image, and so on.

Accordingly, the computer system can perform 912 a simulation using the preoperative model to determine a pose of a virtual light source that generates simulated visual characteristics on or by the selected landmarks that correspond to the identified visual characteristics. In one embodiment, the computer system can be configured to simulate the shadows generated by the selected landmarks on the preoperative model by simulating the movement of a virtual light source through a predetermined bounded area with respect to the preoperative model until the shadows and/or shading of the selected landmarks best fits the actual shadows of the landmarks visible in the image. Stated differently, the computer system can be configured to simulate a virtual light source being applied to the preoperative model and identify a pose of the virtual light source that causes the selected landmarks of the preoperative model to have visual characteristics that match (or sufficiently match) the actual visual characteristics of those same landmarks identified in the image. The computer system can be configured to use one or more of a variety of different lighting techniques in simulating and moving the virtual light source, including ray tracing. The computer system can also be configured to use one or more of a variety of different software tools for simulating and rendering the light effects of the virtual light source, such as OpenGL. In one embodiment, the computer system can be configured to execute a particular number of iterations of the simulation and then select the iteration where the simulated visual characteristics best fit the identified visual characteristics. In another embodiment, the computer system can be configured to continue executing iterations of the simulation until an iteration satisfying particular threshold criteria has been identified. The computer system can be configured to use object recognition techniques for matching the simulated visual characteristics with the visual characteristics of the landmarks that are identified in the image, as described above.

In one embodiment, the process of performing 912 the best fit simulation can further include estimating a starting point at which to begin the simulation process. For example, the computer system can assume that the topography of the object (e.g., a bone) around an identified landmark is flat and use a trigonometric algorithm to identify a starting pose for the virtual light source based on this assumption. The computer system can then iteratively move the pose of the virtual light source from the starting pose until the simulated visual characteristics of the landmarks sufficiently correspond to the identified visual characteristics of the landmarks.

Accordingly, the computer system can determine 914 the locations and/or orientations (i.e., poses) of one or more surgical tools that are in use in the surgical procedure. The computer system can be configured to determine 914 the poses of the surgical tools using, for example, a tracking system 115, as described above. In one embodiment, the computer system can be configured to determine 914 the pose of an endoscope, such as the endoscope 704 described in connection with FIGS. 8, 9, and 11-13, based on a marker array 780 affixed to the endoscope. In another embodiment, the computer system can be configured to determine 914 the pose of a light source that is separate from the endoscope using a marker array similar to the marker array 780 described above. In another embodiment, the computer system can be configured to determine 914 the pose of other surgical tools, such as an ultrasound probe 770 (which can include a marker array 782), that are configured to gather data related to the surgical procedure for visualizing and/or navigating the surgical site. The data from the other surgical tools can be used in lieu of or in conjunction with the image or video feed provided by the endoscope 704 to visualize and/or navigate the surgical site, for example.

Because the preoperative model is defined in a particular reference frame, the poses of the selected landmarks are likewise known with respect to the preoperative model reference frame. Further, the pose of the virtual light source is also known because it is defined with respect to the known reference frame of the preoperative model. Still further, the "real world" position of the light source (e.g., the endoscope 704) can be determined using, for example, a tracking system 115 as described above. Therefore, the virtual pose of the virtual light source can be translated into the "real world" reference frame in which the "real world" position of the light source is defined, which allows the computer system to correspondingly define a transfer function to determine the "real world" positions of the landmarks identified in the image. Stated differently, the process 900 can manipulate a virtual light source with respect to a preoperative model until the simulated visual characteristics (e.g., shadows and shading) of one or more landmarks match the actual visual characteristics of the one or more landmarks as visualized by the endoscope 704. Notably, the virtual positions of the one or more landmarks and the virtual light source are known because they are defined in a common reference frame. Because the actual position of the light source is known (e.g., using a tracking system 115), the computer system can use the known position of the light source to precisely translate the virtual positions of the one or more landmarks into a "real world" reference frame. Accordingly, the computer system can determine 916 the locations of the identified landmarks with a degree of precision that exceeds conventional intraoperative object tracking and image recognition techniques.

In one embodiment, the determined 916 locations of the identified landmarks can be used in connection with the process 800 described above and shown in FIG. 10. In particular, the determined 916 locations of the identified landmarks can be used to intraoperatively track 818 an anatomical structure, as described above. In another embodiment, the determined 916 locations of the identified landmarks can be displayed or otherwise provided to the surgeon as data during the surgical procedure. In various embodiments, the determined 916 locations of the identified landmarks can be provided in an absolute reference frame or a relative reference frame (e.g., as a distance between the endoscope 704 and the particular landmark).

The process 900 described above is beneficial because conventional endoscopic visualization systems cannot intraoperatively track bones or other visualized objects with six DOF because conventional imaging techniques lack the ability to match visualized objects with their associated models with sufficient precision. The process 900 described herein can be used in conjunction with or incorporated into a variety of different surgical platforms, including Smith & Nephew's NAVIO surgical system, MAKO Surgical's surgical systems, and a variety of other computer-assisted or robotic surgical systems that incorporate tracking systems.

Figure 16:
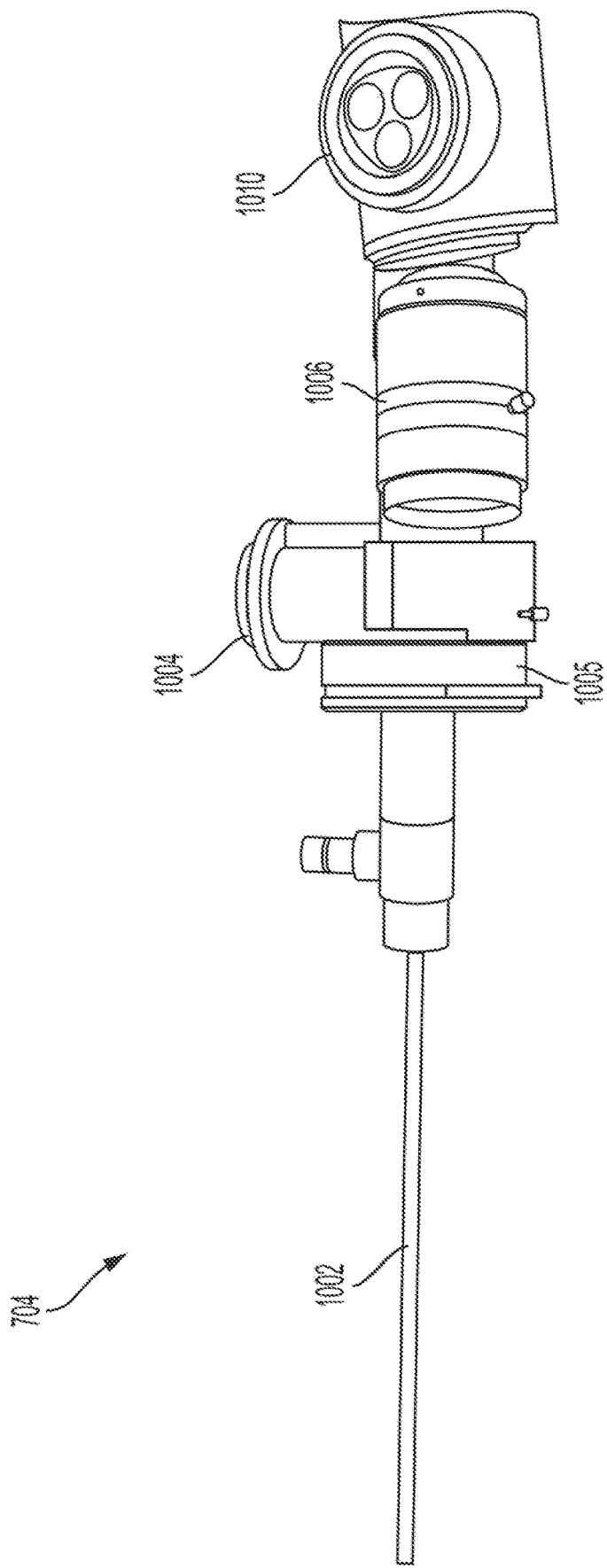
FIG. 16 depicts an endoscope for use in a markerless endoscopic visualization system in accordance with an embodiment.
Figure 17A:
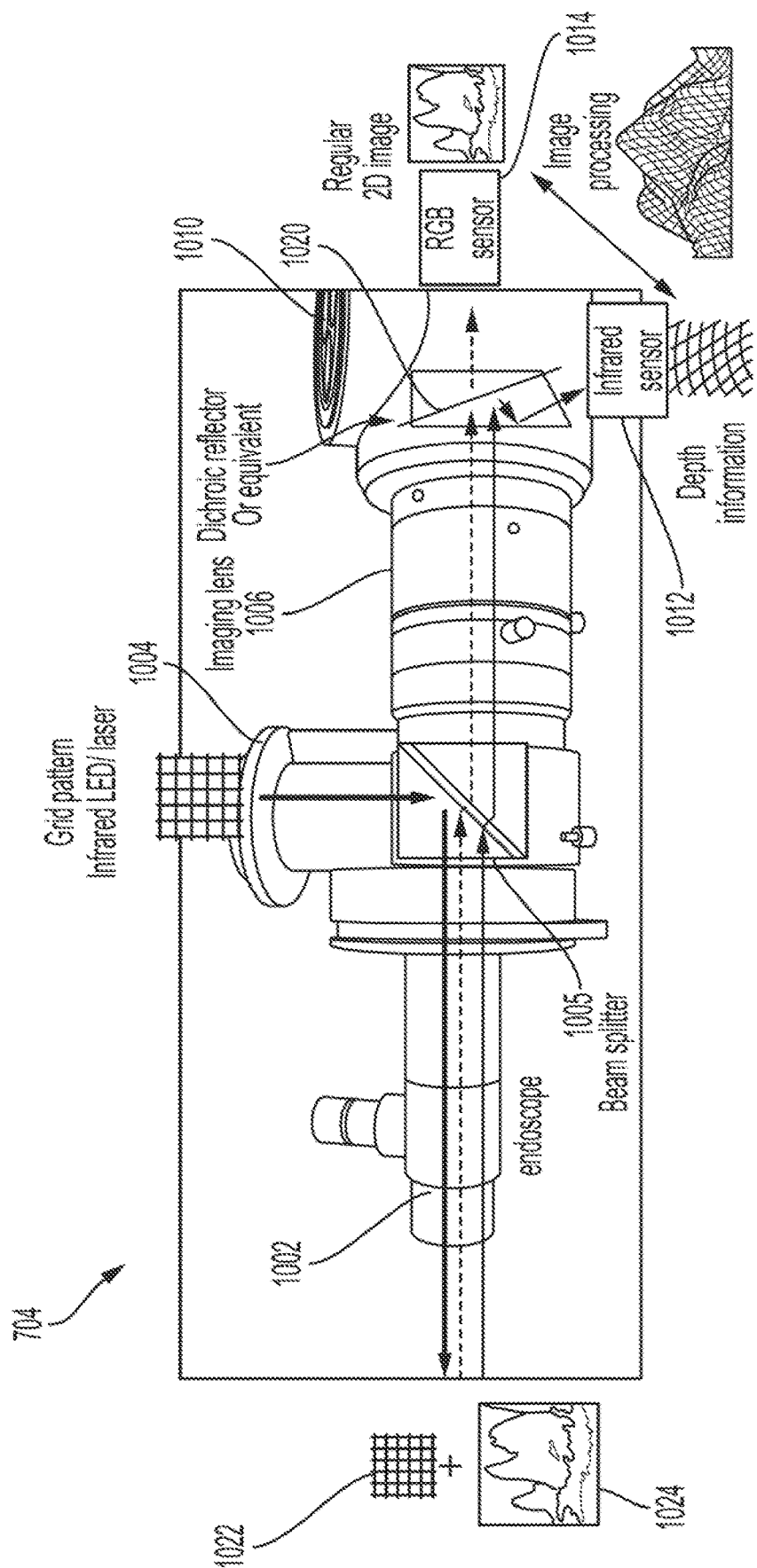
FIG. 17A depicts a block diagram of a first embodiment of the endoscope of FIG. 16 in accordance with an embodiment.
Figure 17B:
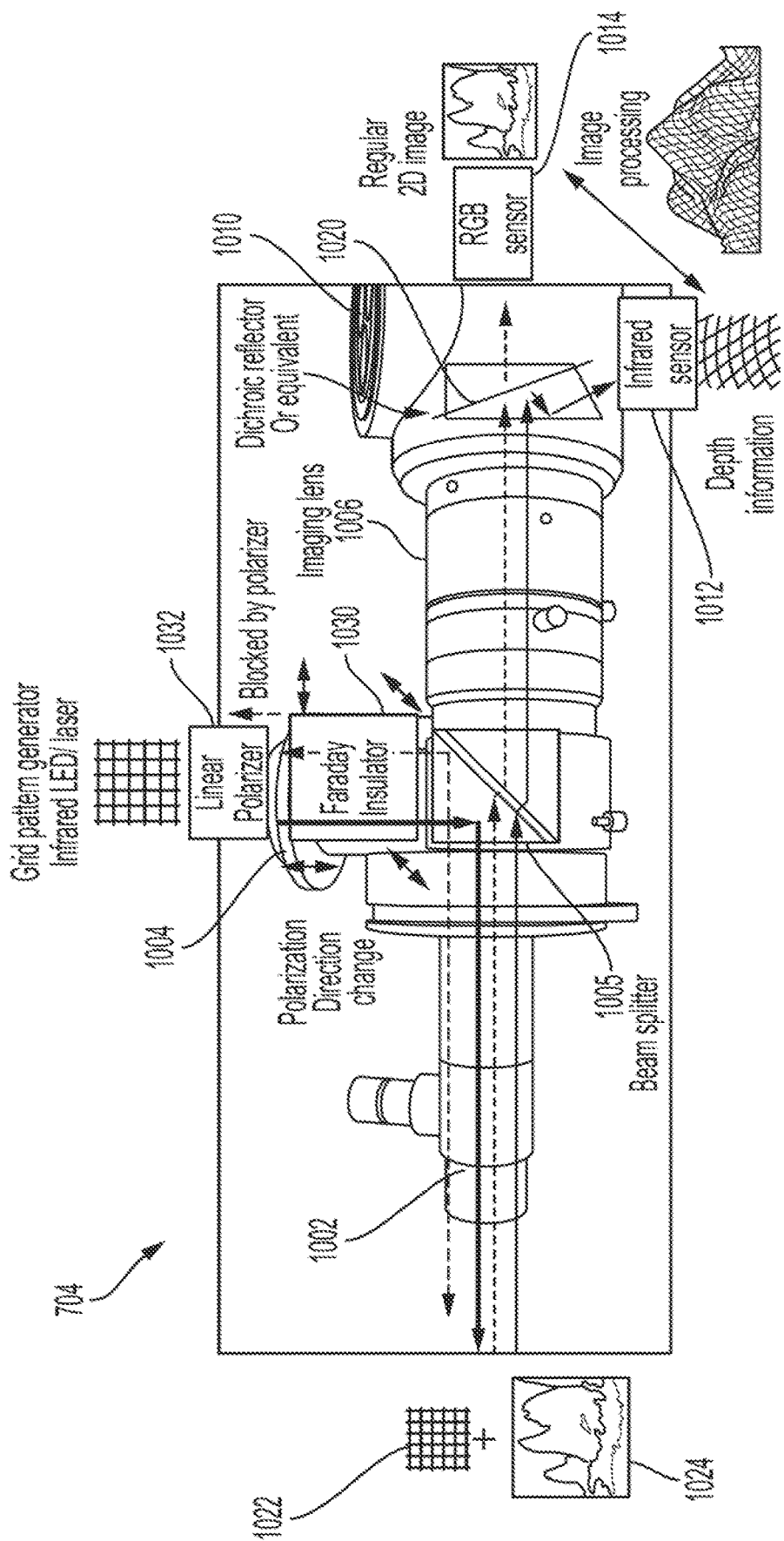
FIG. 17B depicts a block diagram of a second embodiment of the endoscope of FIG. 16 in accordance with an embodiment.

The various processes described above in connection with FIGS. 10-15 can be implemented using an endoscopic visualization system 700 (FIG. 8), which can include an endoscope 704 that is configured to emit structured light or is otherwise configured to sense or determine 3D (i.e., depth) information associated with a surgical site being imaged by the endoscope. Various embodiments of such an endoscope 704 are depicted in FIGS. 16-17B. These embodiments of an endoscope 704 can be configured to obtain depth information associated with the surgical site based on the distortion of the grid pattern of the structured light. Based on the depth information associated with the surgical site, the endoscopic visualization system 700 can perform optical 3D imaging analyses (e.g., as described above in FIGS. 10-15), in addition to or in lieu of providing conventional 2D image or video to the surgical staff during a surgical procedure.

In one embodiment, the endoscope 704 can include a shaft 1002 configured to be inserted into a patient. In various embodiments, the shaft 1002 can be rigid (e.g., as with a laparoscope) or flexible (e.g., as with a bronchoscope). As noted above, the endoscope 704 can include an EMR emitter assembly 706 that is configured to generate EMR in the visible and/or non-visible portions of the electromagnetic spectrum, including as patterned or non-patterned EMR. In one embodiment, the EMR emitter assembly 706 can include a structured light generator 1004 that is optically coupled to a beam splitter 1005. The structured light generator 1004 is configured to emit a various different patterns (e.g., a grid pattern) of EMR (i.e., structured light) in the visible and/or non-visible portions of the electromagnetic spectrum. In one embodiment, the structured light generator 1004 could include one or more LEDs or a laser array configured to generate a pattern of EMR. In one embodiment, the structured light generator 1004 could include a micro-mirror array configured to generate a pattern of EMR. In one embodiment, the EMR emitted by the structured light generator 1004 can include infrared light. Accordingly, in one illustrative embodiment, the structured light generator 1004 could be configured to emit various structured light patterns in infrared regime. In the illustrated embodiment, a grid pattern 1022 is used to represent one such applicable structured light pattern. In another embodiment, the EMR emitter assembly 706 can include other EMR sources, in addition to the structured light generator 1004, that are configured to generate visible light or non-visible EMR. The beam splitter 1005 can be configured to direct the structured light generated by the structured light generator 1004 along the shaft 1002. As the structured light exits the shaft 102, it is directed at the surgical site. The structured light can then be visualized to obtain depth information associated with the surgical site. Further, the beam splitter 1005 can be configured to receive EMR from the surgical site and direct the received EMR at an imaging lens 1006 that is optically coupled to the beam splitter 1005. The received EMR can include the generated pattern reflected from the surgical site and other EMR, such as visible light provided by a separate light source positioned at the surgical site.

The imaging lens 1006 can be configured to direct the EMR received from the surgical site to a sensor assembly of a camera 1010. In one embodiment, the imaging lens 1006 could include an endo coupler. The sensor assembly of the camera 1010 can include a variety of different image sensors, including an infrared sensor 1012 and an RGB color sensor 1014. In one embodiment, the camera 1010 can include a dichroic reflector 1020 (i.e., a cold mirror) or other corresponding filters or reflectors that are configured to selectively allow EMR of a particular wavelength range to pass, while filtering or reflecting EMR of other wavelengths. In one embodiment, the dichroic reflector 1020 can be configured to reflect the received infrared light onto the infrared sensor 1012 and allow the visible light to pass therethrough to the RGB color sensor 1014. In some of the embodiments described above, the structured light generated by the structured light generator 1004 can be infrared light. Accordingly, the infrared light received by the infrared sensor 1012 can be used by the endoscopic visualization system 700 to visualize the pattern 1022 of the structured light, which can in turn be used to obtain depth information associated with the surgical site (i.e., the surface geometry of the tissues and/or other structures located at the surgical site) based upon the distortions in the visualized grid pattern. Further, the visible light received by the RGB color sensor 1014 can be used by the endoscopic visualization system 700 to visualize the visual spectrum of the object field 1024 (i.e., the surgical site) as an image or feed that can, for example, be provided to the surgeon. In other embodiments, various other sensors and filters/reflectors can be used to visualize other types of EMR wavelength bands.

In one embodiment, the endoscope 704 can be further configured to eliminate reflection back into the structured light generator 1004. For example, FIG. 17B illustrates an embodiment of the endoscope 704 that includes a Faraday insulator 1030 and a polarizer 1032 optically coupled between the structured light generator 1004 and the beam splitter 1005. In this embodiment, the structured light generated by the structured light generator 1004 passes through the polarizer 1032, which polarizes the structured light. In one embodiment, the polarizer 1032 can include a linear polarizer. The polarized structured light passes through the Faraday insulator 1030, which is configured to apply a magnetic field with appropriate intensity and channel length (depending on the wavelength of the structured light generated by the structured light generator 1004) to rotate the polarization angle of the polarized structured light by a defined angle (e.g., 45 degrees). Accordingly, any EMR reflected from the object field (i.e., the surgical site) that returns to the Faraday insulator 1030 would be rotated again by the defined angle, which causes the reflected EMR to be blocked by the polarizer 1032. In one embodiment, the polarizer 1032 can include a linear polarizer, and the defined angle can be 45 degrees, which will result in the reflected EMR being rotated by the Faraday insulator 1030 to be perpendicular to the polarization angle of the structured light originally generated by the structured light generator 1004 (i.e., the reflected EMR would be rotated by 90 degrees in total relative to the originally generated structured light). Thus, the reflected EMR would be blocked by the polarizer 1032, thereby preventing the EMR from the surgical site from being reflected back into the structured light generator 1004.

Accordingly, the endoscope 704 can be used to visualize both the pattern 1022 generated by the structured light generator 1004 and an image or video of the visible spectrum of the object field 1024 (i.e., the surgical site) via a single-channel endoscope 704. The image or video of the surgical site 1014 can be presented to the surgical staff via a display 712, for example. The endoscopic visualization system 700 can be configured to obtain depth information based on distortions in the pattern 1022 as visualized by the endoscope 704. In one embodiment, the depth information could be used, for example, to register 814 the anatomical structure surface geometry with a (e.g., preoperative or intraoperative) model of the anatomical structure and accordingly update 816 a surgical plan, as described above in the context of the process 800 illustrated in FIG. 10. In another embodiment, the depth information could be used, for example, to identify 908 the selected landmarks at a surgical site based on the 3D surface geometry of the structures being visualized by the endoscope 704, as described above in the context of the process 900 illustrated in FIG. 15.

In one embodiment, the endoscope 704 can include a handheld endoscope usable by a surgeon. In this embodiment, the pose of the endoscope 704 could be determined by a tracking system 115 by visualizing a tracking assembly/array coupled to the endoscope. In another embodiment, the endoscope 704 can be incorporated into a robotic surgical system. For example, the endoscope 704 can be held, positioned, and/or controlled by the robotic arm 105A of a robotic surgical system, such as is shown in FIGS. 1, 5A, and 5B. In this embodiment, the pose of the endoscope 704 could be provided by the robotic arm 105A, which can be operably coupled to the computer system 702. The pose data associated with the endoscope 704 could be used by the processes 800, 900 described in FIG. 10 and FIG. 15 in order to assist in registering (e.g., preoperative or intraoperative) models of anatomical structures with the depth information associated with the surgical site obtained by the endoscope and/or facilitate object recognition algorithms executed by the endoscopic visualization system 700.

The various embodiments of the endoscope 704 described in connection with and illustrated in FIGS. 16-17B is beneficial because it is configured for 3D imaging and 3D depth and directional measurement without any additional modification to the endoscope's optical channel. Prior solutions to endoscopic 3D imaging and 3D depth and direction measurement would either require that the endoscope 704 have additional channels or force the endoscopic visualization system 700 to make use of 2D image processing, which would negatively impact the reliability of the depth information. The presently described solution allows for the endoscope 704 to both use a single channel and make use of 3D image processing.

In other embodiments, the processes 800, 900 described in FIG. 10 and FIG. 15 can be configured to obtain or generate models or other three-dimensional information associated with models (e.g., of anatomical structures or medical devices) using techniques/systems other than structured light-based systems. For example, a computer system could be configured to receive a video feed from an endoscope and utilize shape-from-shading and other such techniques to determine three-dimensional information associated with the surgical site.

Figure 18:
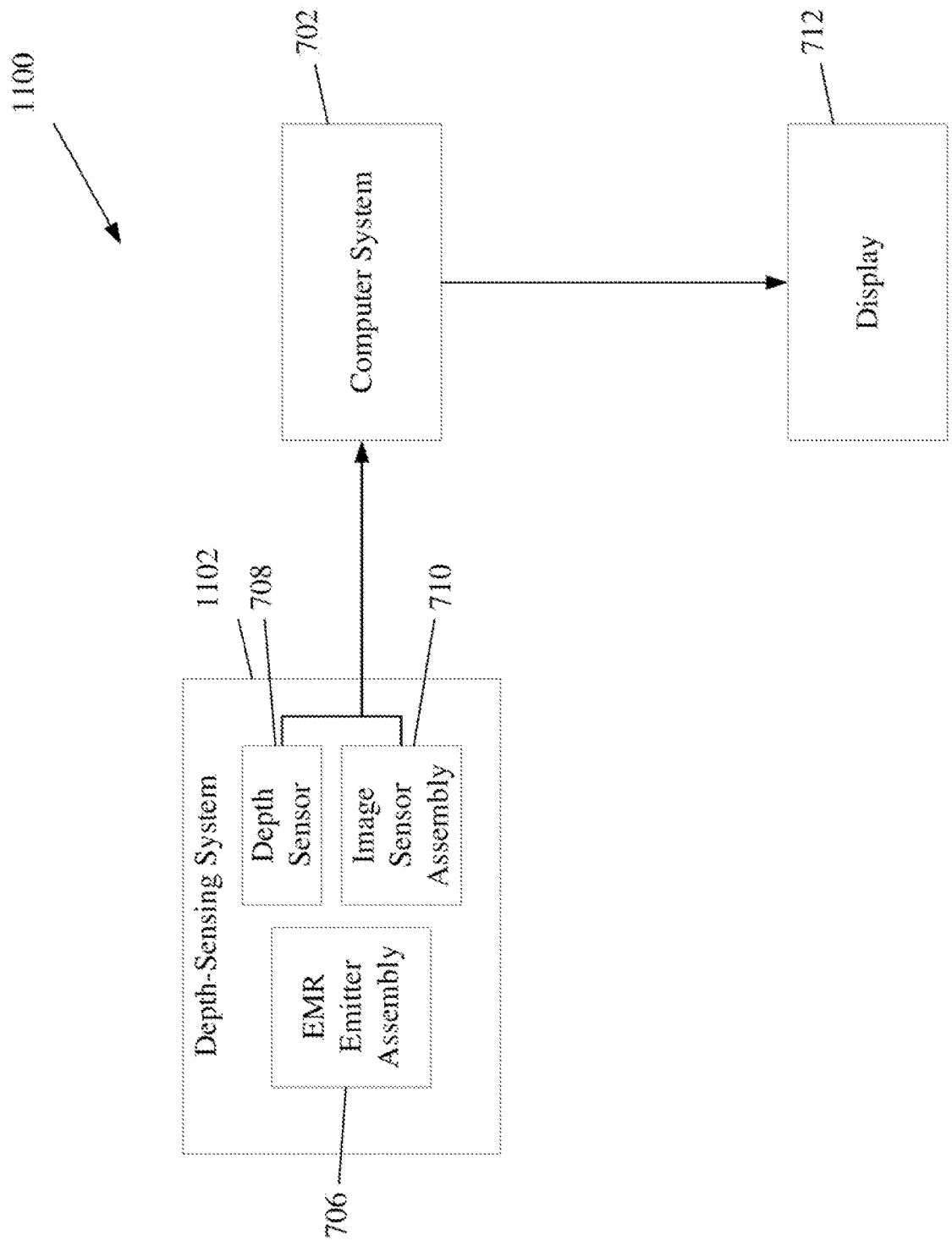
FIG. 18 depicts a block diagram of a markerless navigation system configured for open surgical procedures in accordance with an embodiment.

Although markerless endoscopic navigation systems are primarily described above, markerless navigation systems could also include embodiments configured for open surgical procedures, i.e., embodiments not using endoscopes. Referring now to FIG. 18, there is shown a block diagram of a visualization system 1100 configured for open surgical procedures, such as shoulder procedures. In this embodiment, the visualization system 1100 can include a computer system 702 (e.g., the surgical computer 150 shown in FIGS. 1, 5A, and 5B) that is operably coupled to a depth-sensing system 1102 and a display 712. The depth-sensing system 1102 can include an EMR emitter assembly 706, a depth sensor 708, and/or an image sensor assembly 710, as generally described above with respect to the endoscopic visualization system 700 shown in FIG. 8. In one embodiment, the depth-sensing system 1102 could be configured to serve as a free-standing assembly that is repositionable within the operating room. For example, the depth-sensing system 1102 could include or be mounted upon a stand. In another embodiment, the depth-sensing system 1102 could be affixed to another structure (e.g., an overheard light) within the operating room. In yet another embodiment, the depth-sensing system 1102 could be mounted on or worn by a surgeon or another member of the surgical staff. For example, the depth-sensing system 1102 could be incorporated into a HMD. As another example, the depth-sensing system 1102 could be incorporated into a device that can be clipped or otherwise attached to an individual or an individual's clothing. In general, the depth-sensing system 1102 could include a variety of different configurations that would allow the EMR emitter assembly 706, depth sensor 708, and/or image sensor assembly 710 to be oriented towards the patient's anatomy (e.g., shoulder) in order to intraoperatively visualize the patient's anatomy.

Although the depth-sensing system 1102 may be associated with an endoscope as in the endoscopic visualization system 700 described above, the visualization system 1100 shown in FIG. 18 can otherwise function similarly to the endoscopic visualization system. In particular, the EMR emitter assembly 706, a depth sensor 708, and/or an image sensor assembly 710 can function as described above to intraoperatively obtain three-dimensional surface geometry, depth images, and/or other three-dimensional data associated with anatomical structures. Further, the computer system 702 of the visualization system 1100 can be used to perform the process 800 shown in FIG. 10 and described above, without requiring the steps of making 806 an incision and inserting 808 the endoscope 704. In particular, the computer system 702 could be configured to generate 810 a depth image of the surgical site via the depth-sensing system 1102, segment 812 the depth image to obtain surface geometry of the anatomical structure, register 814 anatomical structure surface geometry with preoperative model, update 816 the surgical plan as appropriate based on the registered anatomical structure, and intraoperatively track 818 the anatomical structure, as generally described above.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A surgical system for an endoscopic surgical procedure, the surgical system comprising:
    a depth-sensing system comprising:
        an emitter configured to project structured electromagnetic radiation (EMR) onto a surface, and
        an image sensor configured to obtain a depth image of the surface based on the structured EMR; and
    a computer system coupled to the depth-sensing system, the computer system configured to:
        receive a surgical plan associated with the endoscopic surgical procedure,
        receive a model of an anatomical structure associated with the endoscopic surgical procedure,
        generate, via the image sensor, the depth image based on the structured EMR,
        segment the depth image to obtain surface geometry data of the anatomical structure embodied within the depth image,
        register the surface geometry data of the anatomical structure to the model, and
        update the surgical plan according to the registered surface geometry data.

2. The surgical system of claim 1, wherein the computer system is configured to register depth data of the anatomical structure to the model using at least one of an iterative closest point algorithm or a data aligned rigidity constrained exhaustive search algorithm.

3. The surgical system of claim 1, wherein the structured EMR comprises at least one of visible light or infrared.

4. The surgical system of claim 1, wherein the depth-sensing system is mounted to a movable stand.

5. The surgical system of claim 1, wherein the depth-sensing system is mounted to a light.

6. A method of performing an endoscopic surgical procedure, the method comprising:
    receiving, by a computer system coupled to an endoscope, a surgical plan associated with the endoscopic surgical procedure, wherein the endoscope may comprise an emitter configured to project structured EMR onto a surface and an image sensor configured to obtain a depth image of the surface based on the structured EMR;
    receiving, by the computer system, a preoperative model of an anatomical structure associated with the endoscopic surgical procedure;
    generating, by the computer system, the depth image based on the structured EMR using the image sensor;
    segmenting, by the computer system, the depth image to obtain surface geometry data of the anatomical structure embodied within the depth image;
    registering, by the computer system, the surface geometry data of the anatomical structure to the preoperative model; and
    updating, by the computer system, the surgical plan according to the registered surface geometry data.

7. The method of claim 6, wherein depth data of the anatomical structure is registered to the model using at least one of an iterative closest point algorithm or a data aligned rigidity constrained exhaustive search algorithm.

8. The method of claim 6, wherein the endoscope comprises an arthroscope.

9. The method of claim 6, wherein the endoscope further comprises an image sensor, the method further comprising:
    displaying a video feed obtained via the image sensor.

10. The method of claim 9, further comprising:
    displaying at least one of the updated surgical plan or the registered surface geometry data in association with the video feed.

11. The method of claim 9, further comprising:
    displaying the registered surface geometry data overlaid on the anatomical structure in the video feed.

12. The method of claim 6, wherein the endoscope further comprises a depth sensor selected from the group consisting of a time-of-flight sensor, a laser scanning device, and a combination thereof.

13. A surgical system for an endoscopic surgical procedure, the surgical system comprising:
- an endoscope comprising:
  - an emitter configured to project structured electromagnetic radiation (EMR) onto a surface, and
  - an image sensor configured to obtain a depth image of the surface based on the structured EMR; and
- a computer system coupled to the endoscope, the computer system configured to:
  - receive a surgical plan associated with the endoscopic surgical procedure,
  - receive a model of an anatomical structure associated with the endoscopic surgical procedure,
  - generate, via the image sensor, the depth image based on the structured EMR,
  - segment the depth image to obtain surface geometry data of the anatomical structure embodied within the depth image,
  - register the surface geometry data of the anatomical structure to the model, and
  - update the surgical plan according to the registered surface geometry data.

14. The surgical system of claim 13, wherein the computer system is configured to register depth data of the anatomical structure to the model using at least one of an iterative closest point algorithm or a data aligned rigidity constrained exhaustive search algorithm.

15. The surgical system of claim 13, wherein the endoscope comprises an arthroscope.

16. The surgical system of claim 13, wherein the surgical system further comprises a display coupled to the computer system, wherein the endoscope further comprises an image sensor, wherein the computer system is further configured to cause the display to display a video feed obtained via the image sensor.

17. The surgical system of claim 16, wherein the computer system is configured to cause the display to display at least one of the updated surgical plan or the registered surface geometry data in association with the video feed.

18. The surgical system of claim 16, wherein the computer system is configured to cause the display to display the registered surface geometry data overlaid on the anatomical structure in the video feed.

19. The surgical system of claim 13, wherein the endoscope further comprises a depth sensor selected from the group consisting of a time-of-flight sensor, a laser scanning device, and a combination thereof.

20. The surgical system of claim 13, wherein the structured EMR comprises at least one of visible light or infrared.

* * * * *